Nov. 22, 1955

T. M. EDISON 2,724,183

REMOTELY CONTROLLED PRECISION DRIVE AND CALCULATING SYSTEMS

Filed Dec. 27, 1945

INVENTOR:
Theodore M. Edison

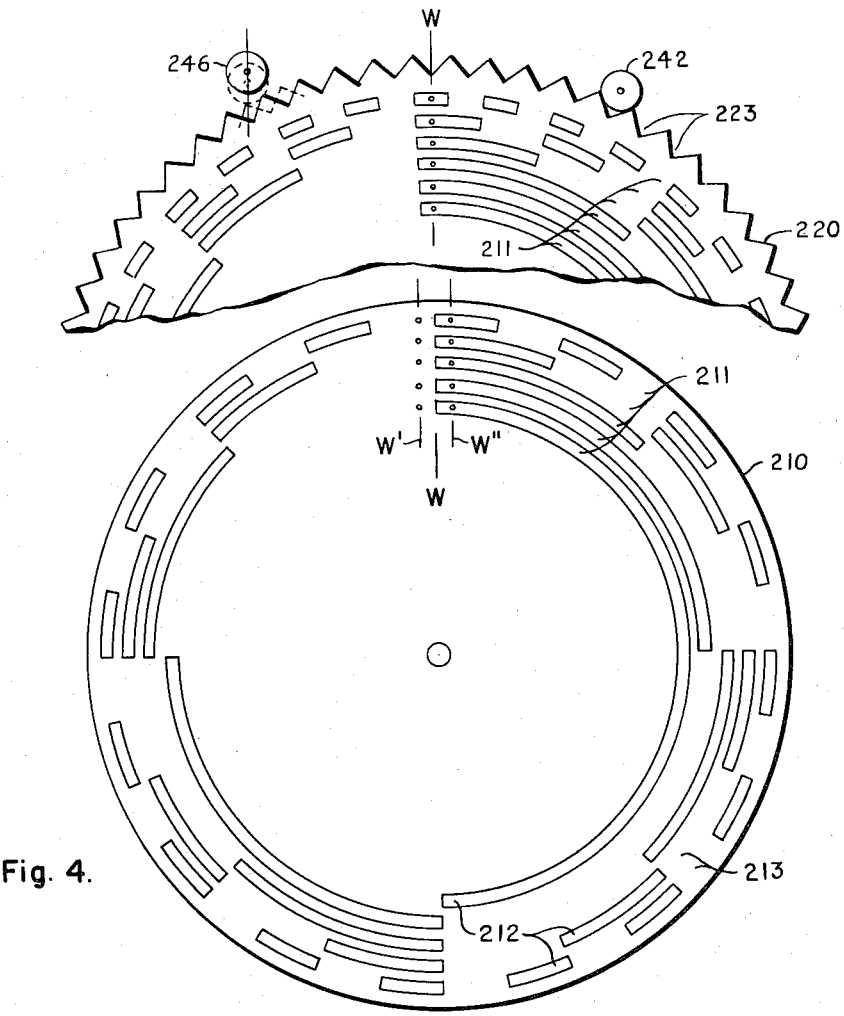
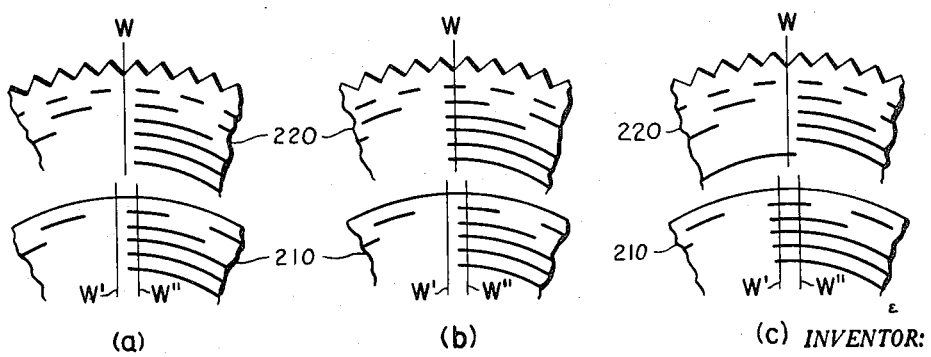
Fig. 4.
(a)     (b)     (c)
Fig. 5.

INVENTOR:
Theodore M. Edison

INVENTOR:
Theodore M. Edison

INVENTOR:
Theodore M. Edison

Nov. 22, 1955

T. M. EDISON 2,724,183

REMOTELY CONTROLLED PRECISION DRIVE
AND CALCULATING SYSTEMS

Filed Dec. 27, 1945

INVENTOR:
Theodore M. Edison

INVENTOR:
Theodore M. Edison

INVENTOR:
Theodore M. Edison

INVENTOR:
*Theodore M. Edison*

INVENTOR:
Theodore M. Edison

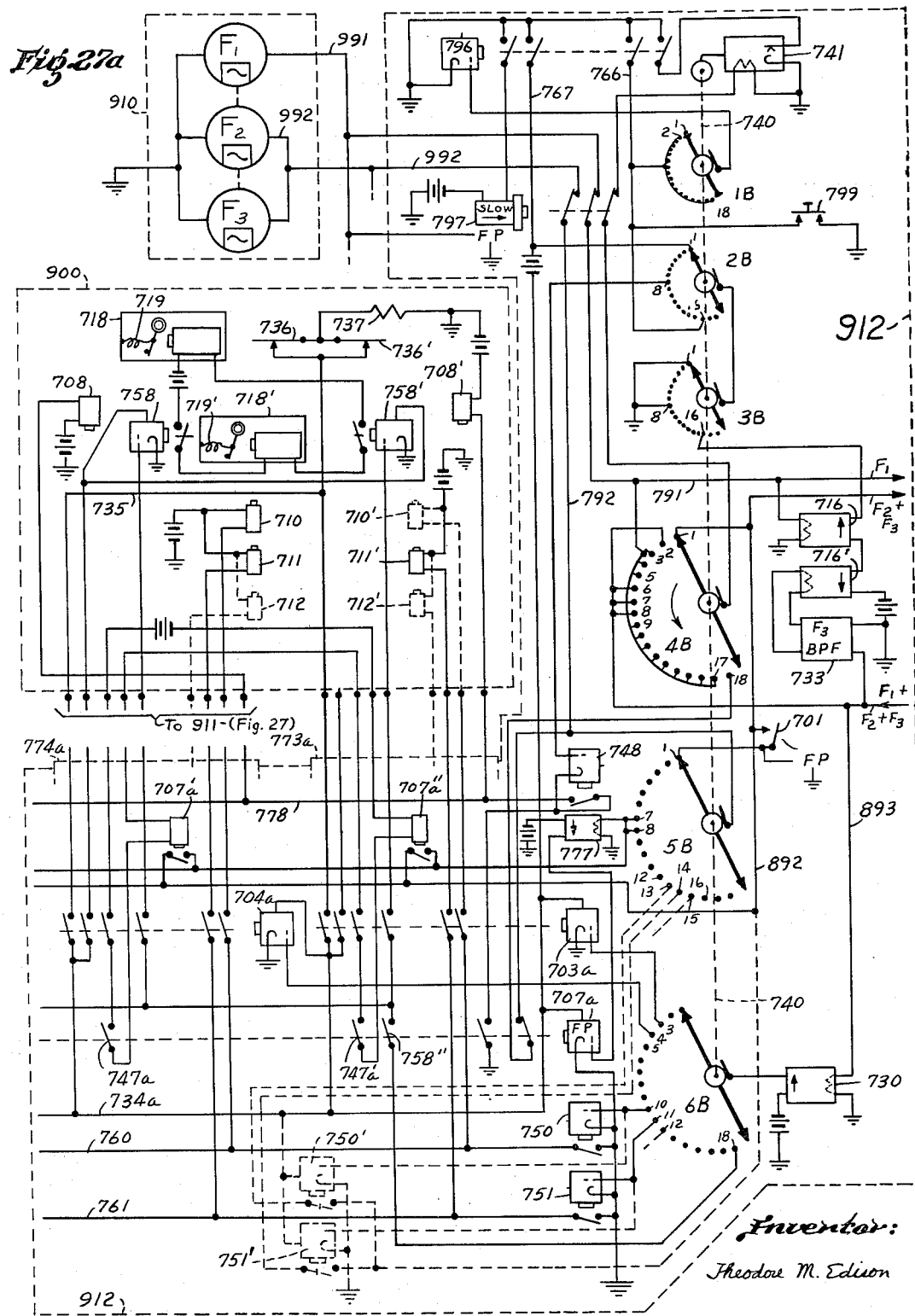

INVENTOR:
Theodore M. Edison

Inventor:
Theodore M. Edison

Nov. 22, 1955　　　　T. M. EDISON　　　　2,724,183
REMOTELY CONTROLLED PRECISION DRIVE
AND CALCULATING SYSTEMS
Filed Dec. 27, 1945　　　　　　　　　　15 Sheets-Sheet 15

INVENTOR:
Theodore M. Edison

United States Patent Office 2,724,183
Patented Nov. 22, 1955

2,724,183

REMOTELY CONTROLLED PRECISION DRIVE AND CALCULATING SYSTEMS

Theodore M. Edison, West Orange, N. J., assignor to Calibron Products, Incorporated, West Orange, N. J., a corporation of New Jersey Application December 27, 1945, Serial No. 637,413

29 Claims. (Cl. 33—1)

Objectives

The general objects of my invention are:

(1) To indicate automatically on a chart at a home station the positions of selected remote targets—the position of each target being established from position-determining "measurements" made at one or more stations remote from the home station, and all necessary data being capable of automatic transmission to the home station over ordinary telephone lines in a few sections in such a way as to insure accurate and reliable results. [In the most complete form of my invention disclosed herein, each target position is determined from automatic "readings" of angular bearing settings of direction-finding means at a pair of remote stations. Simpler embodiments of my invention can be employed to obtain position indications from other forms of initial data (e. g., by finding the position of a target relative to a single remote station by means of polar-coordinate angle and distance measurements).]

(2) To provide means whereby each direction-finding unit, of a group of units, may be made to cooperate with several other direction-finding units, one at a time, and cyclically, in accordance with an arbitrary, preselected schedule, and to provide automatic means for successively connecting the several pairs of direction-finding units thus formed to appropriate home-station indicating units in such a way that, in each (independent) case, an indicating unit will operate only if the temporarily associated direction-finding units are properly paired and synchronized to fix the position of the target assigned to the particular indicating unit.

The more detailed objects of my invention are:

(3) To provide means whereby very accurate directional "readings" can be made, simultaneously, at cooperating direction-finding stations, remote from each other, while the direction finders are actively following a moving target—no stoppage of the motions of the direction finders being required.

(4) To provide means whereby readings made at a remote station can be transmitted with high precision to a home station over ordinary telephone lines (that may pass through repeater stations, and that need not have especially good transmission characteristics) through the use of pulsating, audio frequency "signals" that can have wide tolerances with respect to frequency, strength, phase shift, and pulse duration.

(5) To avoid uncertainty in signal transmission through the use of circuits which permit the passage of full signal pulses only, even though certain signal-controlling switches and relays may be operated at arbitrary points in the pulse cycles.

(6) To reduce the chance of false indication through the inclusion of "check circuits" that lead two stepping switches, at cooperating remote and home stations, respectively, to return [in effect] to their starting positions without actuating the home-station indicating unit in the event that line interruptions, or extraneous pulses, cause these stepping switches to reach check points out of synchronism, or in the event that there has been an error in data transmission.

(7) To arrange the system in such a way that the audio frequency pulse generators, and substantially all portions of the apparatus that require high precision workmanship, can be located at the home station—the units at the remote stations being relatively light and compact, and requiring comparatively little power to operate.

(8) To provide means whereby signals received over telephone lines may be made to control the settings of a mechanism with high precision, even when large forces must be employed to operate the mechanism, and even though the mechanism is required to reach its final position in a short space of time.

(9) To provide means whereby apparatus characterized by comparatively large inertia can be moved quickly to a precisely determined position, smoothly, and without excessive shocks at the ends of the motion.

Other objectives will be mentioned in the course of the description which follows.

A system that will meet all of the foregoing conditions is necessarily complex, but if requirements are made less stringent, great simplifications can be effected. Advantage will be taken of such simplifying modifications from time to time to bring out clearly the features of my invention.

While several different components must cooperate to obtain the overall results desired, it will become apparent that some of the units have independent utility, and description of the apparatus as adapted to position indicating is not intended to restrict my invention to that specific application.

It is assumed that the initial "data" required to define the position of a "target," or arbitrary "point," is obtained through the use of means that does not come within the scope of my invention. This means may comprise anything from fully automatic apparatus to mere visual observations and manually settable devices, and the means used to introduce the data into my apparatus may also range from fully automatic to manual.

Drawings

In the drawings accompanying and forming part of this specification:

Fig. 4 is a schematic layout of the coding tracks and patterns carried by the main disks shown in front elevation in Fig. 8.

Fig. 5 comprises three schematic views showing how readings would be made with the Fig. 4 disks in three different relative positions, and illustrating one way in which ambiguity in readings made near the change-over points in coding tracks is avoided.

Figure 6:
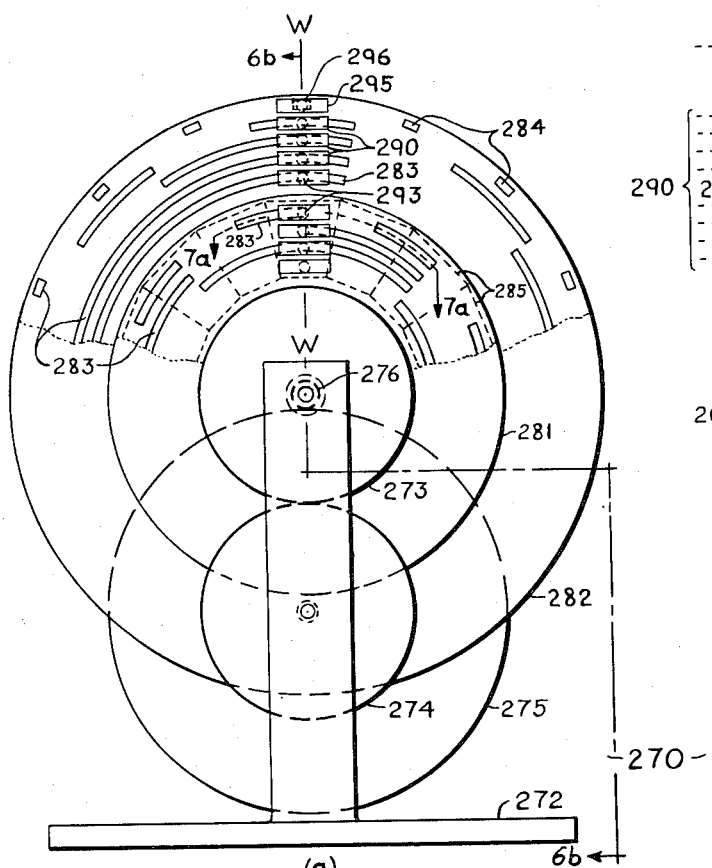
Figure 6:
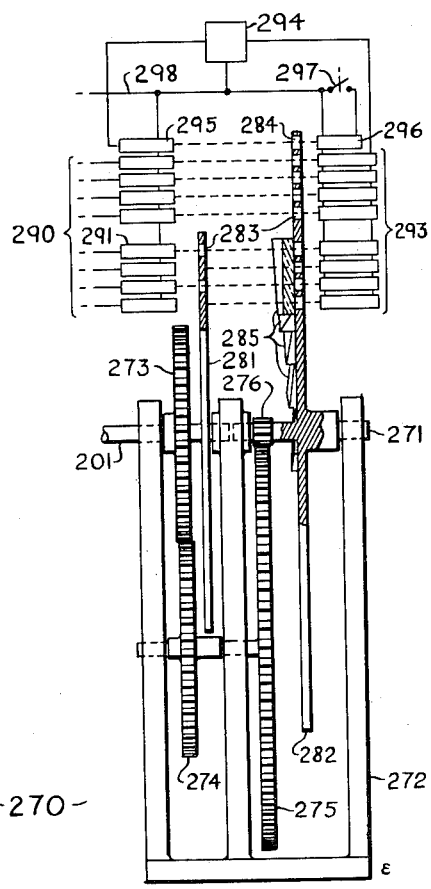
Figure 7:
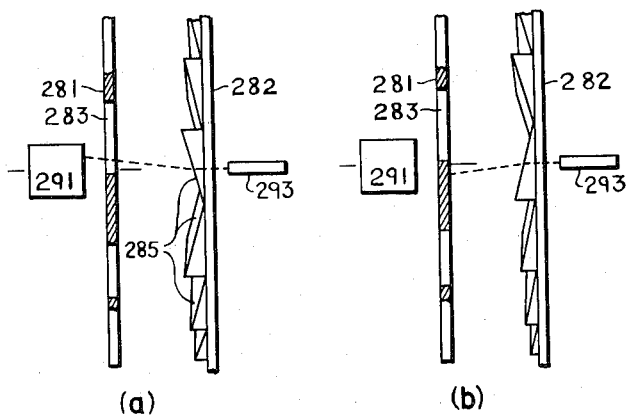

Figs. 6a, 6b, and 7 are, respectively, partial front elevation, side elevation, and plan views, including schematic portions, of an optical-type reader unit—as distinguished from the mechanical-contact-type reader unit shown in other figures. Figs. 7a and 7b show how readings would be made at two different positions of the rotatable disks of the optical reader unit, and illustrate an optical means for avoiding ambiguity in readings made near the change-over points in coding tracks.

Figure 8:
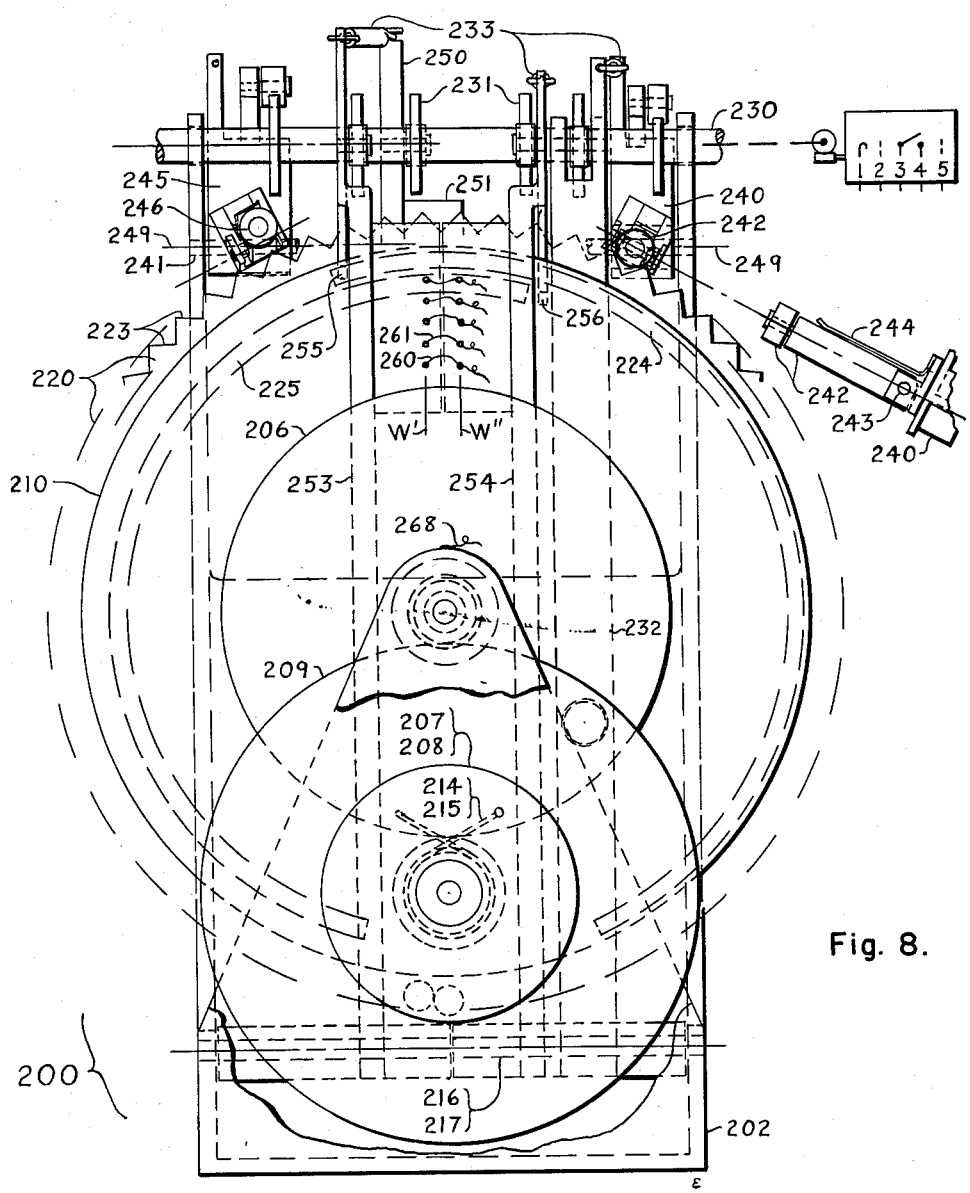

Fig. 8 is a partial schematic front elevation of a reader unit, with some of the front drive elements removed, and showing an oblique detail elevation of one of the detent arms.

Figures 9, 10:
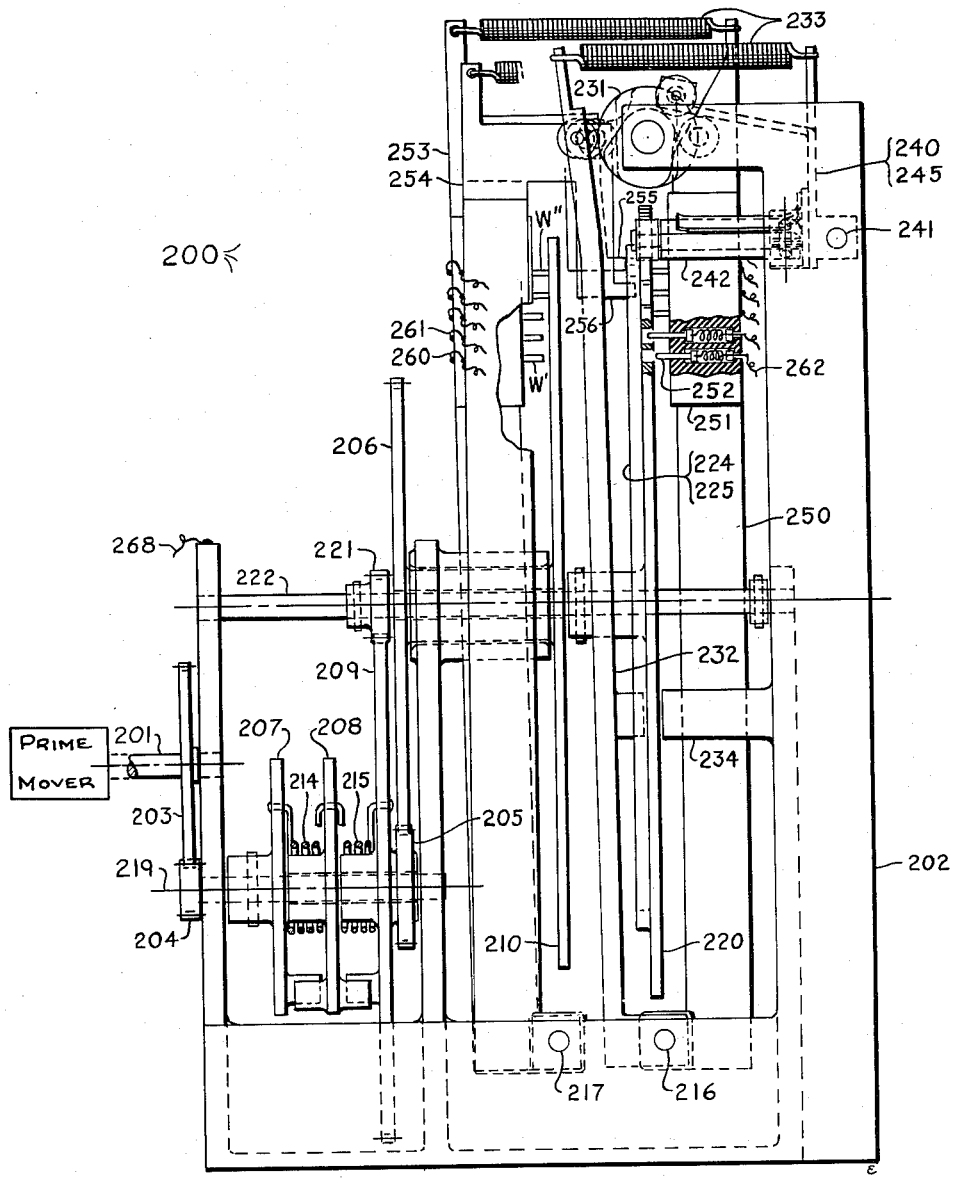

Fig. 9 is a partial side elevation of the reader unit shown in Fig. 8.

Fig. 10 is a schematic diagram illustrating the sequence of reader-unit operations, obtained through the use of cams, as the cam shaft makes one complete revolution.

Figure 11:
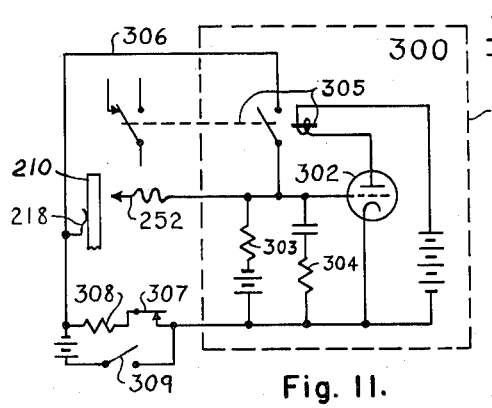

Fig. 11 is a schematic view and wiring diagram of another group of electrical elements that has been given a special symbol for use in other figures, the group as a whole being designated as a "U2 unit" in the description. The figure also shows how the unit operates in connection with certain external elements.

Figure 12:
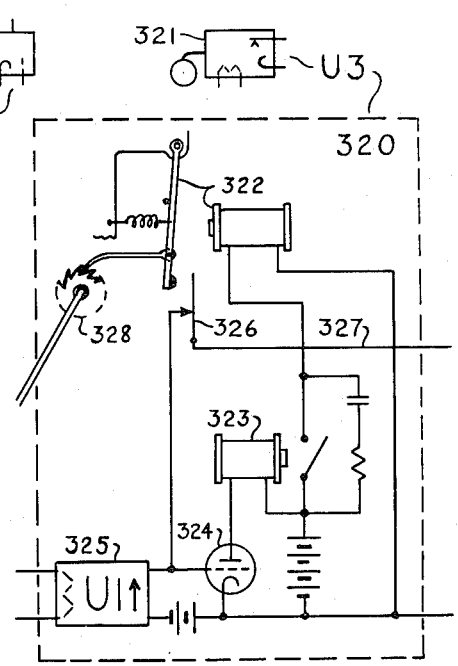

Fig. 12 is a schematic view and wiring diagram of a group of elements associated with the drive of stepping switches shown in Figs. 16, 27, 28, and 29. The elements form another group which has been given a special symbol, and which is designated as a "U3 unit" in the description.

Figure 13:
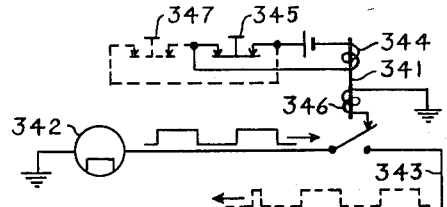

Fig. 13 is a schematic wiring diagram of an elementary "full-pulse" circuit.

Figure 14:
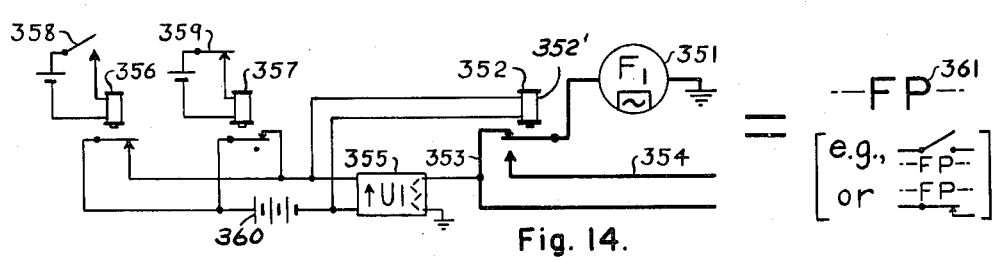

Fig. 14 is a schematic wiring diagram of a more complex "full-pulse" circuit, for the pulsing audio frequency case. The figure also illustrates a symbolical representation of circuits of this kind for use in the figures.

Figure 15:
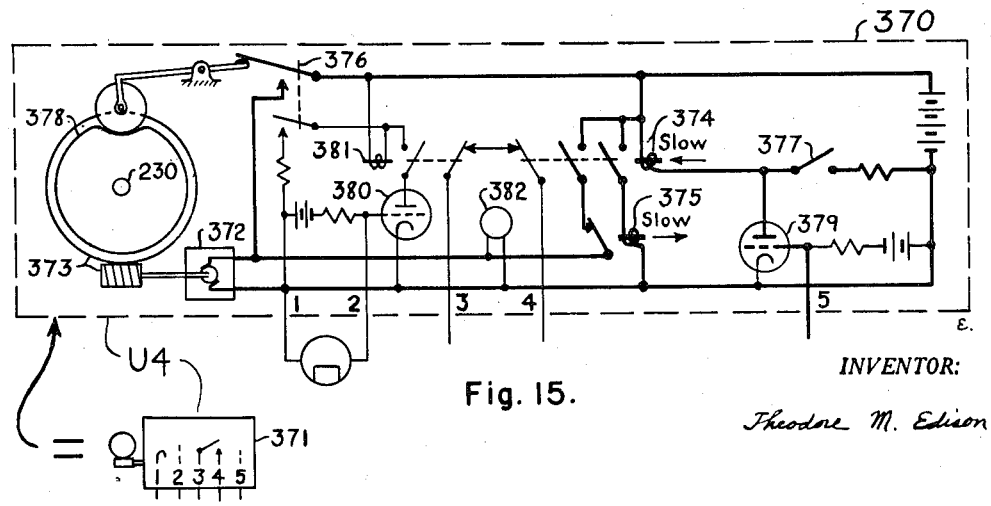

Fig. 15 is a schematic view and wiring diagram of still another group of elements which has been given a special symbol for use in the figures, and which is designated as a "U4 unit" in the description. This group of elements starts and stops the reading cycle of the reader unit, and opens and closes certain external circuits in sequence during said cycle.

Figure 16:
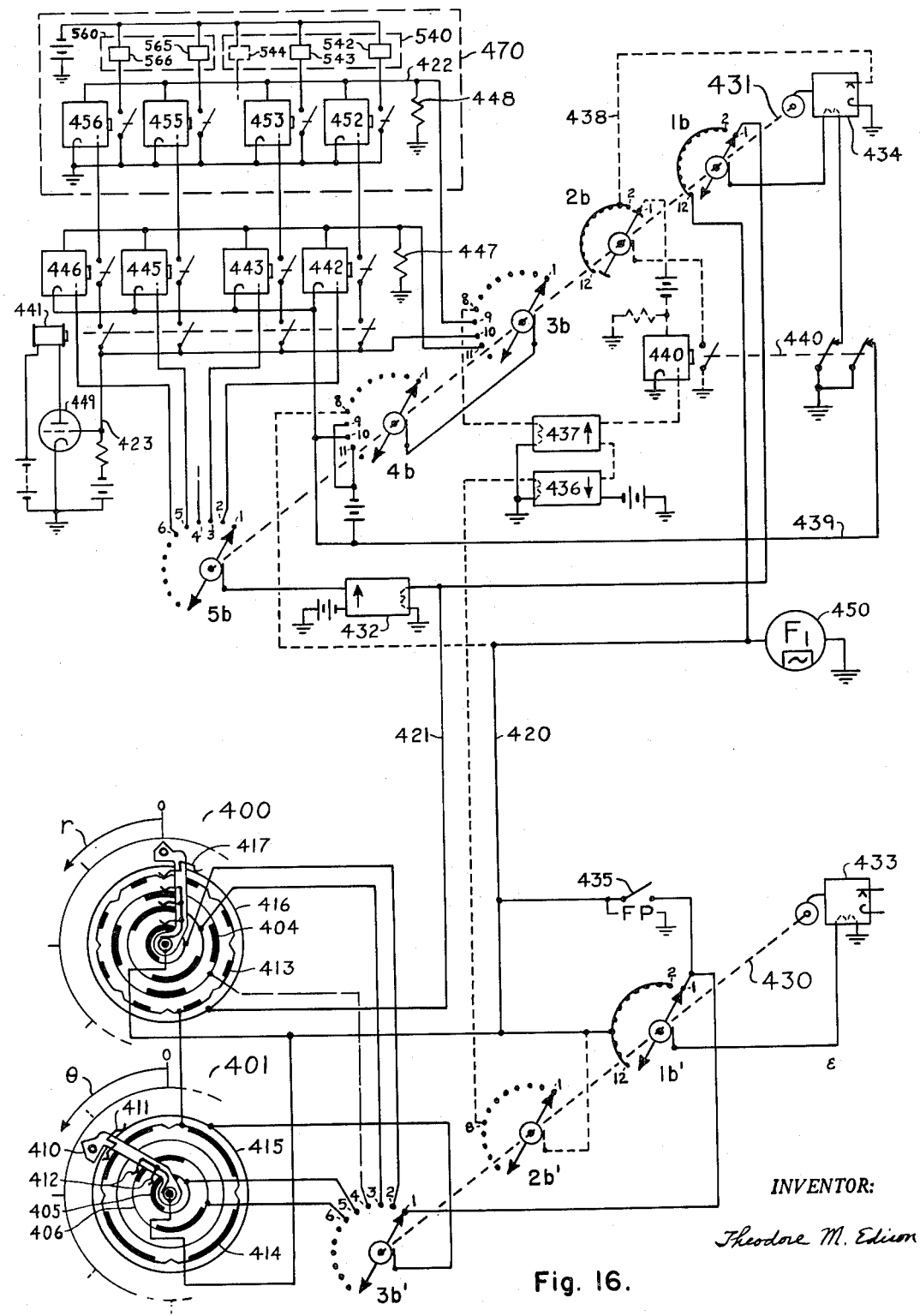
Figure 18:
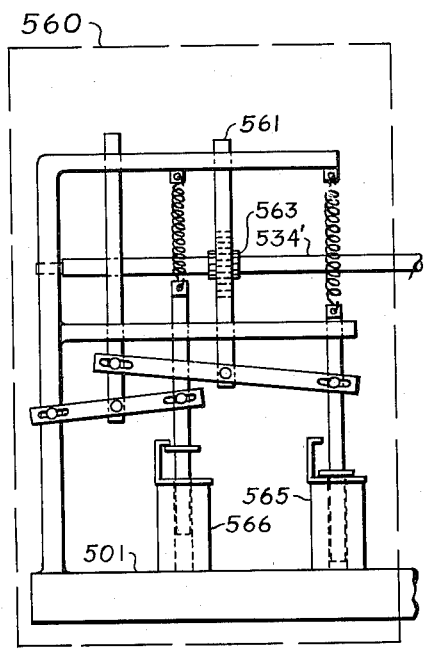
Figure 19:
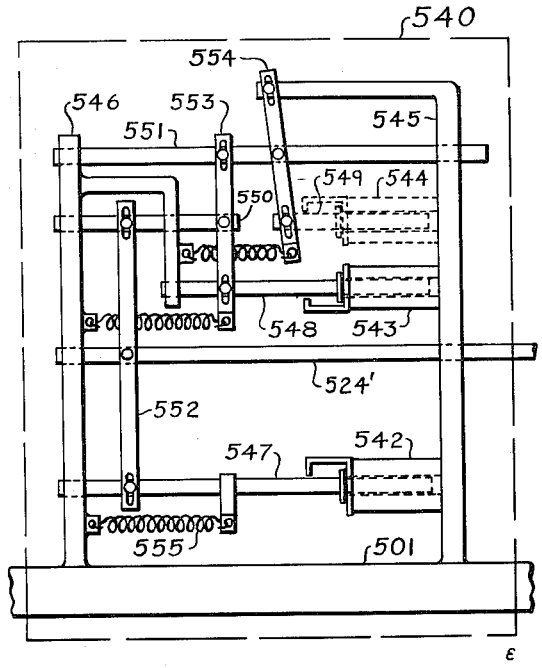

Fig. 16 is an abridged schematic view and wiring diagram in which the lower portion comprises an adumbration of two elementary reader units, together with an associated stepping-switch transmitter unit, and the upper portion is a schematic wiring diagram of a home-station receiving unit, together with a partial showing of electrical units adapted to control calculator-drive units such as those shown in Figs. 18 and 19.

Figure 17:
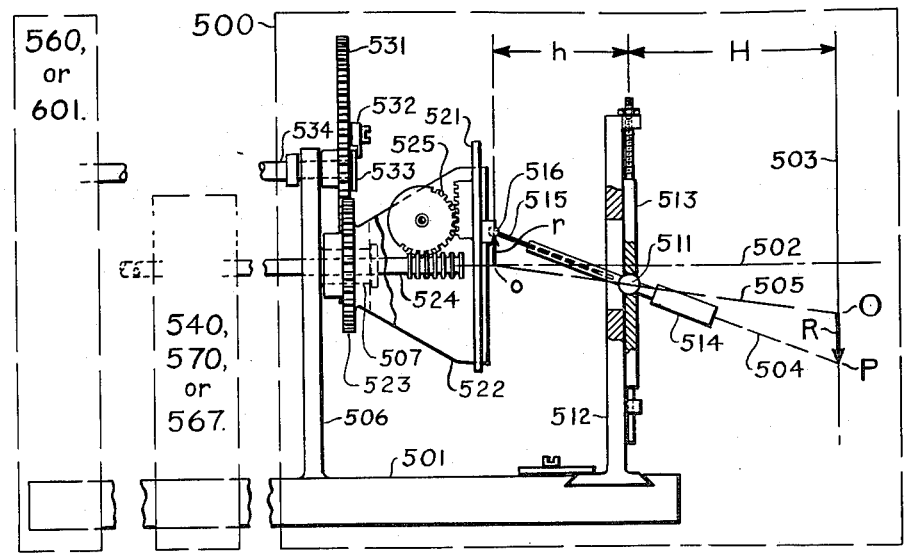

Fig. 17 is a partial side elevation and schematic view, partly broken away, and partly in section along a vertical plane through the center line, of a polar-coordinate type "calculator" unit, with projector, and including an indication of the projection screen and the geometrical properties of the projection system. Fig. 17 also indicates how preceding units of the system actuate projection system.

Figs. 18 and 19 are the respective side elevations of two rudimentary calculator-drive units, activatable by the system shown in Fig. 16, which may be used in conjunction with the mechanism of Fig. 17.

Figure 20:
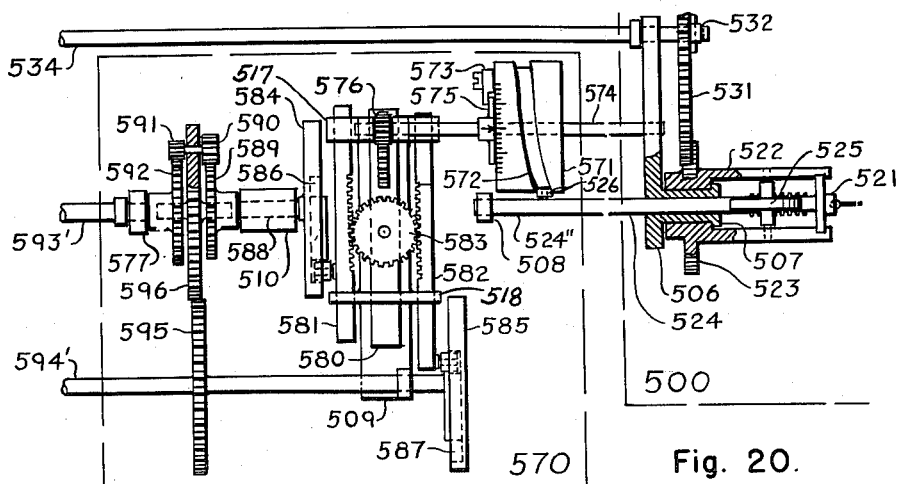
Figure 24:
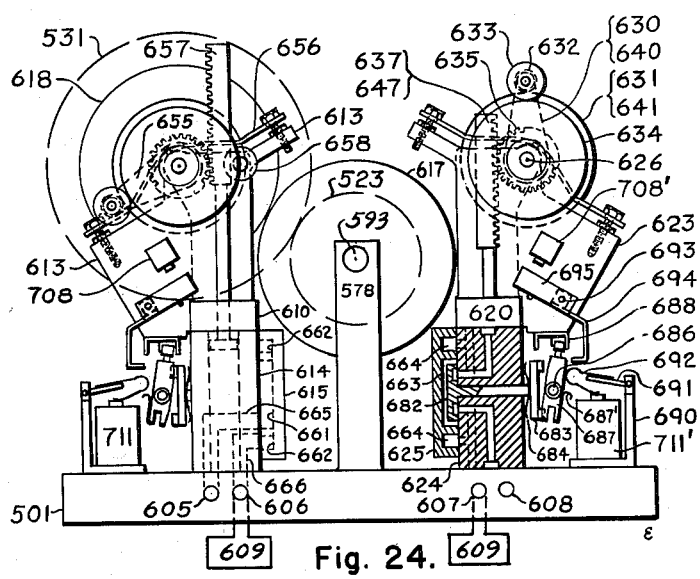
Figure 25:
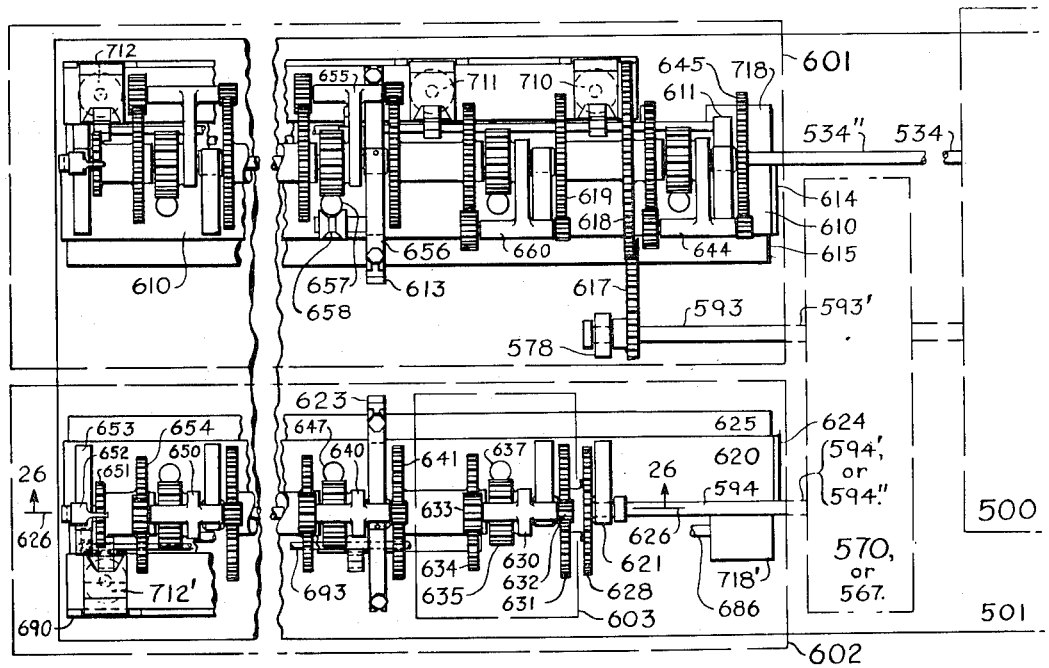
Figure 26:
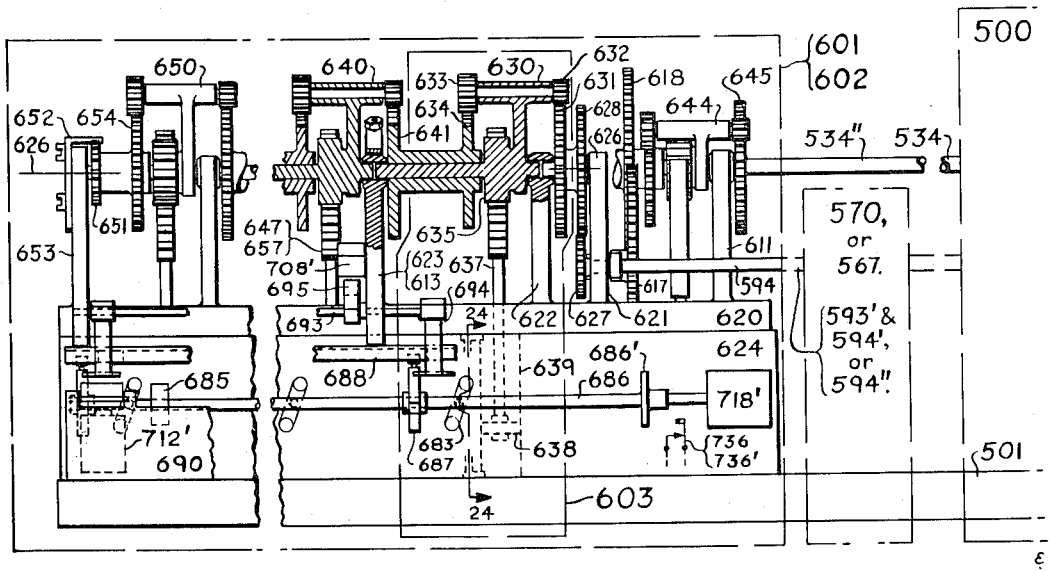

Fig. 20 is primarily a partial plan view of an auxiliary calculator unit 570, for use with mechanism 500 of Fig. 17 [in a system alternative to that shown in Figs. 16, 18, and 19], said unit being actuatable by the mechanisms shown in Figs. 24, 25, and 26. Some of the mechanism in Fig. 20 [which includes a plan view of part of mechanism 500 of Fig. 17] has been broken away to reveal a partial section along a horizontal plane passing through the principal axis 502 seen in Fig. 17.

Figure 21:
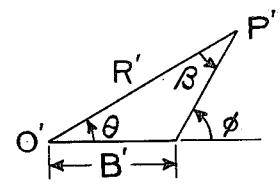

Fig. 21 is a geometrical diagram used in describing the properties of the base-and-two-bearing-angle calculator and projection system.

Figure 22:
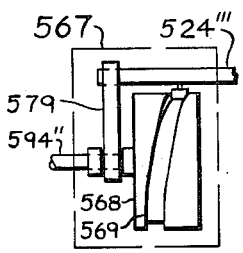

Fig. 22 is a plan view [not drawn to scale] of a unit which can be substituted for the unit 570 of Fig. 20 in converting the apparatus from a base-and-two-bearing-angle system to a radius-and-angle system.

Figure 23:
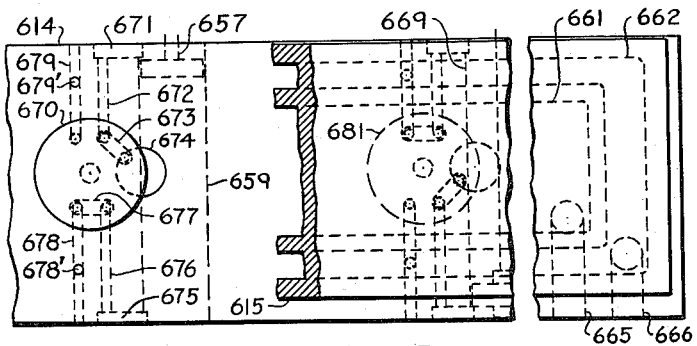

Fig. 23 is an enlarged fragmentary side elevation, partly cut away, of some of the elements shown in Fig. 24, illustrating hydraulic passageways and valving members in a calculator-drive unit.

Figs. 24, 25, and 26 are, respectively, partial end, plan, and side views of a pair of hydraulic calculator-drive units. Fig 24 is in partial section along the line 24—24 of Fig. 26. Fig. 26 is in partial section along the line 26—26 of Fig. 25. The mechanisms shown in Figs. 24, 25, and 26 are designed to be used with the mechanisms 500 and 570, or 500 and 567, shown in Figs. 17, 20, and 22, the relationships between units being indicated schematically in the figures.

Figure 27:
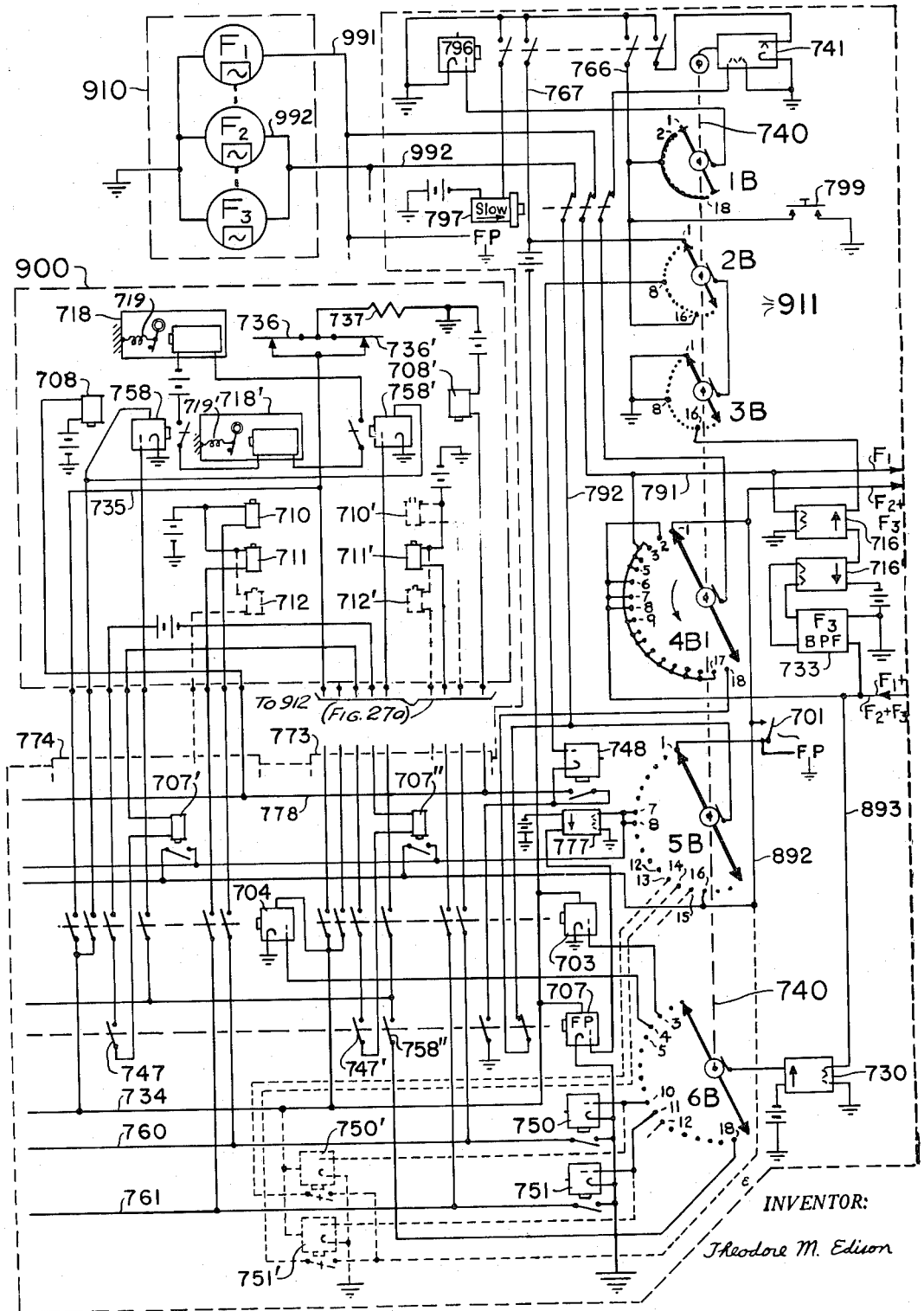
Figure 28:
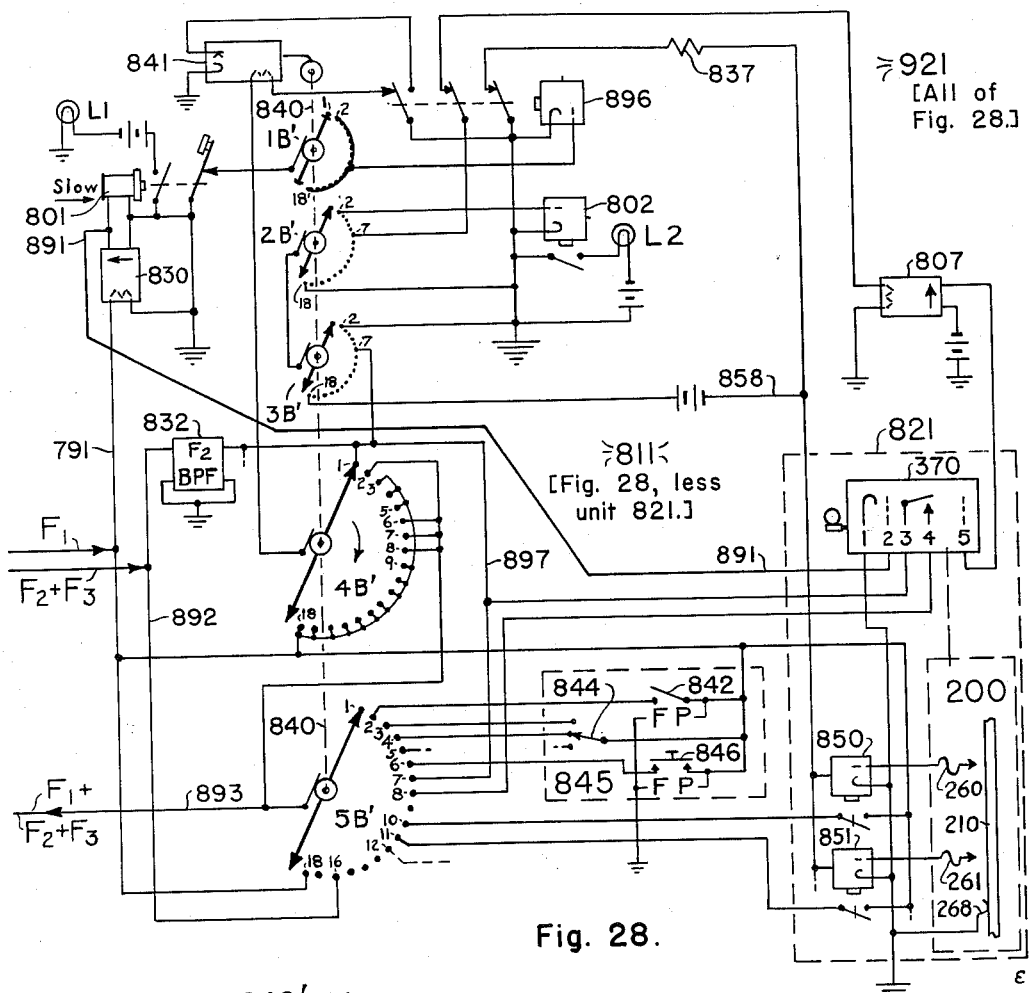

Figs. 27 and 28 together form an abridged schematic view and wiring diagram of a selector-reader-transmitter-receiver-calculator-drive-control system, including an indication of the means used to interconnect said system with a similar cooperating system: Fig. 27 showing the home station receiver and calculator-drive-control elements, together with the pulsing-audio-frequency generators for the entire combined system; and Fig. 28 showing a selector-reader-transmitter portion of the first named system.

Figure 28A:
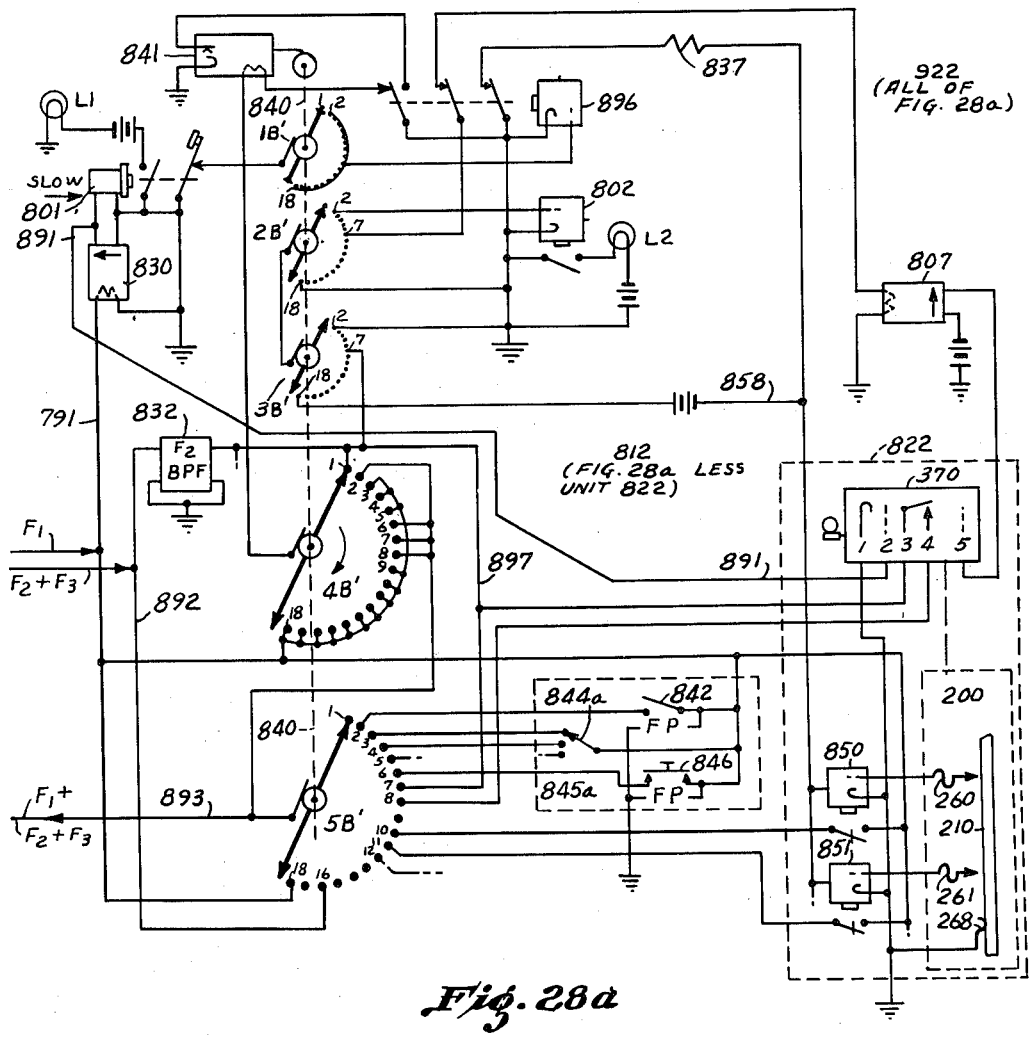

Figs. 27a and 28a are substantially equivalent, respectively, to Figs. 27 and 28, but show receiver and selector-reader-transmitter portions made up of units which duplicate (but are distinct from) corresponding units in Figs. 27 and 28, together with generator and calculator-drive-control elements that are common in Figs. 27 and 27a. Differences in the interconnections and settings of the two cooperating systems are illustrated. Figs. 27, 27a, 28, and 28a group together to form a wiring diagram for the interconnected units illustrated schematically in Fig. 31.

Figure 29:
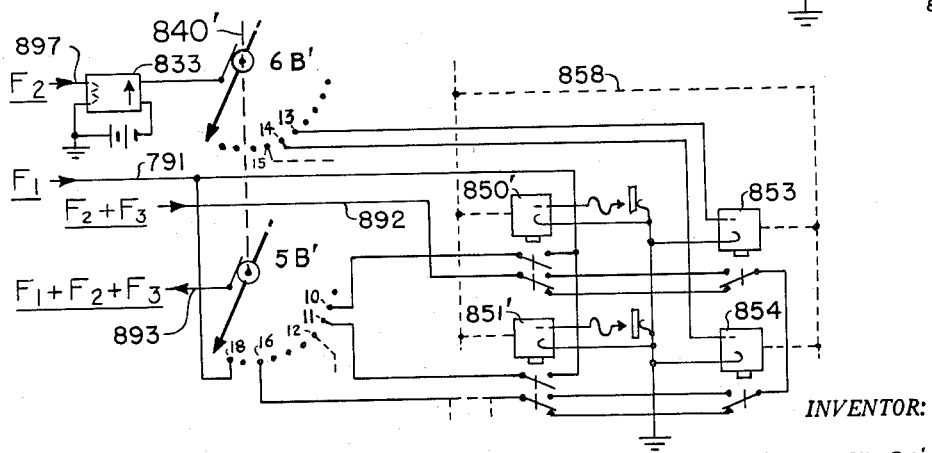

Fig. 29 is an abridged schematic view and wiring diagram, constituting a modification and extension of Fig. 28, which shows how certain check-back features are included in an alternative form of the system.

Figure 30:
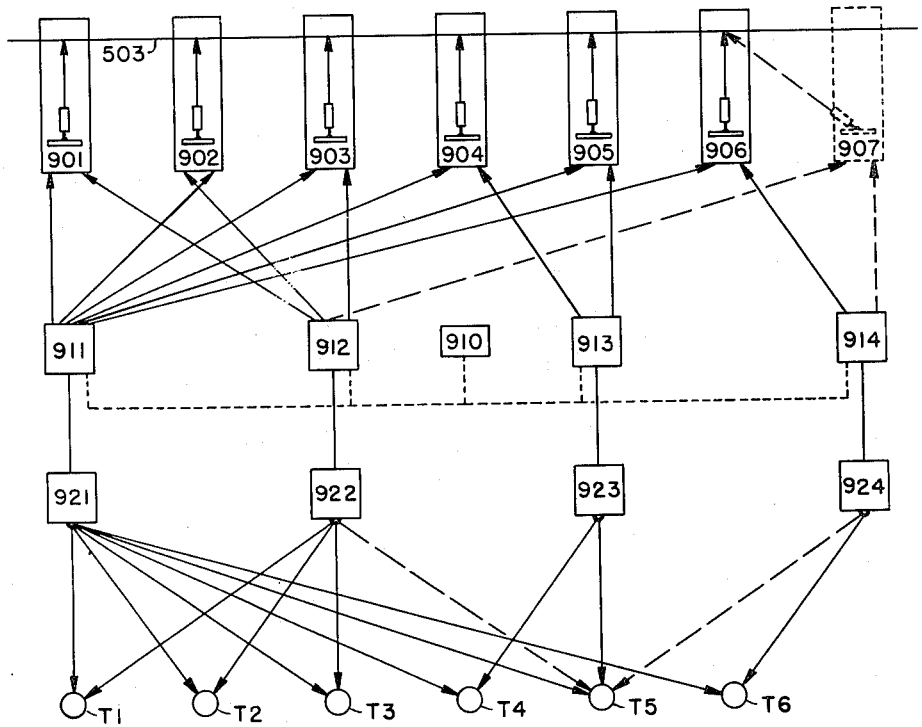

Fig. 30 is a schematic key diagram, showing how units are related in a multiple-station embodiment of my invention.

Figure 31:
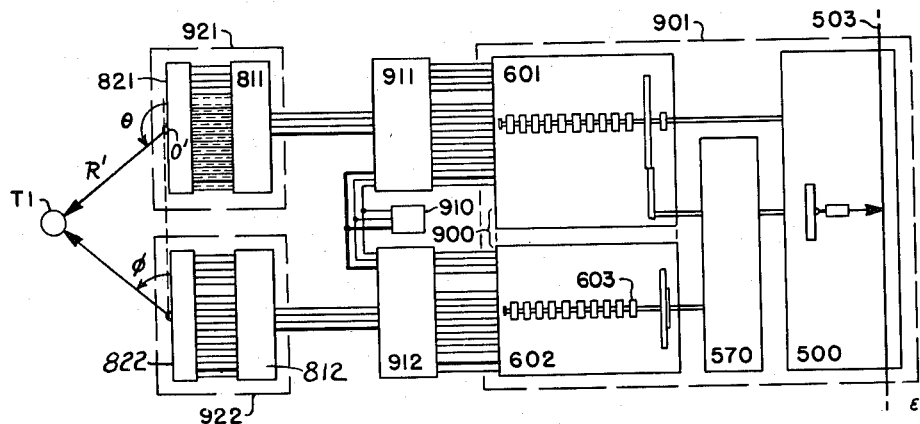

Fig. 31 is a schematic key diagram, showing in more detail than Fig. 30 the types of relationships established between cooperating units each time a pair of associated readings is transmitted for final projection. The system shown in Fig. 31 could function as an independent two-reader-unit system, but it can also be considered to be a detail of a portion of the Fig. 30 system under selected conditions.

Outline of principal features

Broadly, the means I employ to obtain the objectives previously mentioned comprise:

(1) "Coding" units, each comprising a "reader" unit and associated components, normally situated at points remote from a "home station," where the magnitudes of certain primary measurable quantities (determined by means external to my apparatus) are converted into respective "code numbers"—each code number representing a particular combination of opened and closed circuits (as "set up" in the coding unit), within a group of circuits, which combination is capable of specifying, uniquely, a particular value of the specified primary quantity.

(2) "Selected-and-control" units, in each of which is "set up," by an external agency, by code-number means similar to that just described, or otherwise, a selection of the particular "combination" unit which is ultimately to receive each quantity-representing code number.

(3) "Transmitter" units (one for each reader unit), which transmit the code numbers set up in the respective selector and coding units to respective "receiver" units at the home station. The transmitter and receiver units are really two-way devices, so that the title distinction between the units is rather arbitrary. Transmitter units are normally situated at remote stations, with their respectively associated coding units.

(4) "Receiver" units, at the home station (one for each transmitter), in each of which certain circuits are opened (or left open), and certain circuits are closed (or left closed), in conformity with the code numbers received from the respectively associated transmitters. Each receiver is adapted to decode the code number (or setting) set up in the associated selector unit, and to close, or open (or leave closed, or open), certain circuits that connect, in effect, the primary-quantity code-number circuits (and certain other circuits) in the receiver to corresponding circuits in the particular "drive" unit(s) [see next paragraph] "defined" by the selector code number (or setting), while leaving non-selected drive units effectively disconnected.

(5) "Combination" units, at the home station, each of which comprises two of said "drive" units, "calculating" means driven by said drive units, and a light-spot projector positioned by said calculating means. Ordinarily, each drive unit is controlled (indirectly, via coded "signals") by a specific, prechosen coding unit, each drive unit being adapted to decode the code number representing the primary quantity initially introduced into the associated coding unit and to establish in the appropriate calculating means a "quantity" corresponding to said primary quantity. The calculating means in each combination unit operates to combine the effects of the "quantities" received from the associated pair of drive units in such a way as to set the associated light-spot projector (of substantially conventional optical design) in such a position that a light spot falls on the particular point on a chart "defined" by the two primary quantities originally introduced into the associated coding units.

The foregoing components are not necessarily all present in every form of my invention, and position indicating by means of light-spot projection is not my only ultimate objective. Some of the drive mechanisms which will be described herein are well adapted to control accurately the positioning of members having very substantial weight.

Description: Preliminary comments

In the case of the description which follows, it will become evident that many elements of the system I disclose are subject to arbitrary choice, depending upon requirements, without departing from the basic concepts involved, and consequently, where modifications could be made readily by one skilled in the art, it is not my intention to limit my invention to the particular selections made for purposes of presentation.

Furthermore, the illustrative examples, while disclosing preferred forms of my basic schemes, and while thought to be qualitatively sound in themselves, do not necessarily represent the preferred final forms for a practical, working device. Thus: mechanisms may be displaced, modified, or distorted, for greater visibility, or to avoid confusion in the figures; certain parts shown in one piece might require separation into several pieces for practical assembly; some circuits have been over-simplified to such an extent that they would not be well adapted for use with standard electrical components now available on the market; to avoid confusion, certain electrical units may be shown with individual, local power supplies, whereas, in practice, most of the units at any one location can be adapted to obtain their power from common sources; certain obvious, or conventional safety devices and adjustments have been omitted, where their inclusion would serve merely to prolong the life of the apparatus, or to simplify its construction, without altering its fundamental operation. As a result, most of my drawings should be considered to be at least semi-schematic in character, even when they show definite structure. I believe, however, that, in conformity with Patent Office requirements, my disclosures are sufficiently complete to enable one skilled in the art to construct practical working apparatus in accordance with them.

Notation and symbols

In the figures, angles measured in planes parallel to the plane of the paper are assumed to increase positively (+) in a counterclockwise direction, and the corresponding positive (+) direction of rotation of mechanical parts in such planes is also assumed to be counterclockwise. The figures are so arranged that a positive (+) rotation in any plane perpendicular to the plane of the paper will appear as a counterclockwise rotation if viewed from the left.

As there will be much discussion of stepping switches with multiple banks and many steps, and as certain "circuit levels" will often extend through a large number of components simultaneously, it is felt that clarity will be sacrificed unless some simple notation can be employed to designate such levels, and other general quantities. Hence, in the figures, while reference numbers will be used in the ordinary way to avoid ambiguity, numbers below 100 will be reserved to act as mere scale graduations, or magnitude indicators [e. g., to specify the positions of certain elements, or the particular step reached in a sequence operation].

The most general form of my invention is complex, but since certain groups of elements that appear repeatedly therein perform functions effectively equivalent to the functions performed by certain simpler elements (or groups of elements) in simplified forms of my invention, description can be facilitated by starting with an over-simplified skeleton form and building up gradually—with the aid of symbolical notation developed, from time to time, through demonstrations of the equivalencies mentioned.

Symbols used to represent groups of elements in the figures are qualitative in character, and it is to be understood that quantitative values for the components represented are to be adjusted to meet requirements at the particular points at which the units are inserted.

Standard symbols, such as D. C. for direct current and Ω for ohms, will be used. "Ground" will be represented by its conventional symbol and will be assumed to be at zero potential. All grounds will be assumed to be interconnected.

Stepping switch step and terminal numbers will be the same and will appear as subscripts in a notation in which "$3b_8$" signifies "terminal 8 of bank $3b$, connected at step 8."

"Activate" is used herein to mean "render active," or "put into operation," and "actuate" is similarly used, where physical motions are involved. With respect to the claims, "activate" is intended to be construed broadly enough to include "actuate."

The words "oscillatory cycles" and "waves" are intended to refer to any appropriate type of oscillatory phenomenon (e. g., electro-magnetic wave radiations, or sound waves), without restriction to alternating current alone; and the term "reading" is intended to be construed broadly enough to cover automatic reading and/or reading by a person.

Figure 3:
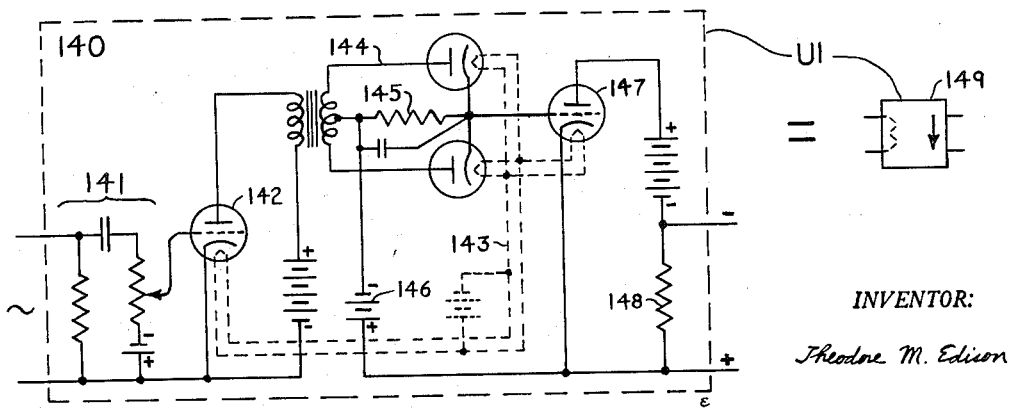
Fig. 3 is a schematic view and wiring diagram of a group of electrical elements given a special symbol for use in other figures, the group as a whole being designated in the specifications as a "U1 unit."

With respect to vacuum tube representations: a triode tube will be assumed to be unblocked [i. e., plate current will be permitted to flow] if the grid is at cathode potential; a grid bias suitable for alternating current [=A. C.] signal transmission will be represented symbolically by one cell below cathode potential; a negative grid bias sufficiently great to cut off plate current will be represented symbolically by two cells below cathode potential. Cathodes will be assumed to be heated indirectly, as indicated in Fig. 3, but the heater circuits will not be shown in the other figures.

Elementary systems and codes

Figure 1:
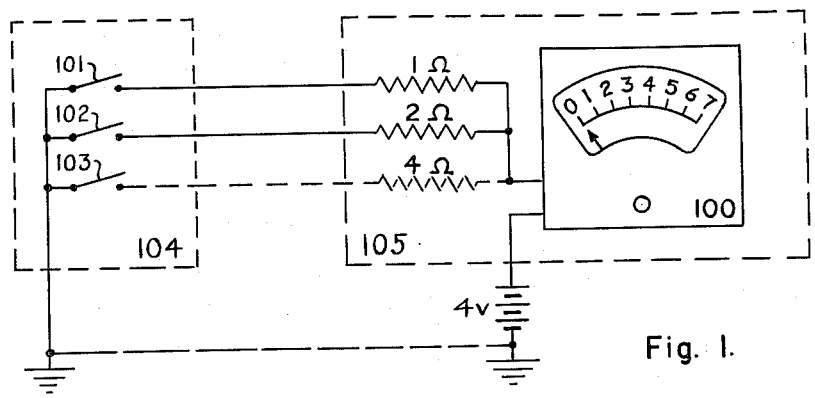
Fig. 1 is an extremely simplified schematic view and wiring diagram, illustrating some of the basic principles underlying my invention.

An extremely rudimentary form of my invention is illustrated in Fig. 1, where the switches 101, 102, and 103 may be considered to constitute a coding unit 104 and the rest of the apparatus a combined drive and calculator unit 105. Selector, transmitter, and receiver units have been omitted, and the calculator is adapted to indicate the effects produced by only one primary quantity.

The drawing shows three circuits in parallel, connected to a 4-volt battery through an ordinary ampere meter 100. The first, or upper, circuit contains switch 101 in series with a 1-ohm resistor; the second contains switch 102 in series with a 2-ohm resistor; the third contains switch 103 in series with a 4-ohm resistor.

For the moment, consider the circuit containing switch 103 to be absent. It can be seen that four possible switch combinations can be made with the two remaining switches, and that each combination defines, uniquely, a specific meter reading, or pointer position: both switches open=0 amperes; switch 101 open and switch 102 closed=2 amperes; switch 101 closed and switch 102 open=4 amperes; both switches closed=6 amperes.

If, now, the third circuit be added, the number of possible combinations is doubled—as all of the previous combinations are still available when switch 103 is open, and the meter currents resulting from each of the previous combinations can be augmented by one ampere (to give a new, uniquely defined, meter reading in each case) by closing switch 103.

The number of such parallel circuits can be increased indefinitely, and provided that the resistance value for each new circuit is so chosen that the current through the particular circuit when the circuit switch is closed does not duplicate the total current available from any switch combination of the other switches, the addition of each new circuit will double the total number of uniquely defined pointer positions obtainable—within practical accuracy limits. This total number may be expressed as $2^n$, where $n$ is the number of "code-number circuits" [i. e., the number of independent circuits available for making combinations of the type described]. The following table shows how very rapidly the total number of defined positions increases as $n$ is increased.

| $n$ | $2^n$ | $n$ | $2^n$ | $n$ | $2^n$ |
|---|---|---|---|---|---|
| 1 | 2 | 5 | 32 | 9 | 512 |
| 2 | 4 | 6 | 64 | 10 | 1024 |
| 3 | 8 | 7 | 128 | 11 | 2048 |
| 4 | 16 | 8 | 256 | 12 | 4096 |

For convenience in presentation, the combinations of opened and closed switches in a coding unit, such as 104, may be expressed as respective code numbers in which each digit place represents a circuit, and at each digit place, "0" stands for an open circuit, and "1" stands for a closed circuit. While it is not necessary to relate the 1's in such code numbers to magnitudes having any specific type of progression, computation and presentation can be simplified by letting the code numbers represent conventional numbers in binary number notation—where the magnitudes assigned to 1's in successive digit places form an orderly geometrical progression, the 1 in each digit place representing a value twice as great as that represented by a 1 in the next digit place to the right. Thus, in Fig. 1, the circuits including switches 101, 102, and 103 may be represented, respectively, by the first three digits of a binary number having a magnitude directly proportional to the meter current. It will be found that this number can be extended and the conditions for unique relationships between switch combinations and respective meter readings fulfilled, if, in adding more circuits, resistance values are increased successively in accordance with the geometrical progression indicated. It will also be found that, by following this procedure, switch combinations are always available to yield meter readings [i. e., total currents] that form a smooth arithmetical progression. Hereinafter in the specifications, unless otherwise indicated, it will be taken for granted that code numbers are at the same time binary numbers with magnitude significance, it being understood that this choice is arbitrary, and that other codes could sometimes be employed to advantage for special purposes, provided that appropriate elements of the system are properly keyed together. With respect to the claims, it is to be understood that "code number" is to be construed broadly enough to cover any assemblage of digits that is associated as a whole with some particular operation and/or bit of information out of a plurality of operations and/or bits of information.

Coding units employing substantial numbers of digit places in their code numbers are described in connection with Figs. 4 through 10, but since the circuits for the several digit places can be grouped into classes, in each of which the circuits making up a class are essentially duplicates of each other (aside from variations in the original elements establishing the code patterns and the magnitudes of the effects ultimately produced in calculator-drive units), and since it is believed that the method by which additional circuits can be incorporated into the system is made evident to one skilled in the art through the disclosures herein, the description will ordinarily be limited to the first two typical circuits in each group. Here, the term "circuit" is used in a sense broad enough to cover all the elements associated specifically with one digit place in the code number, whether said elements are electrical or not.

Figure 2:
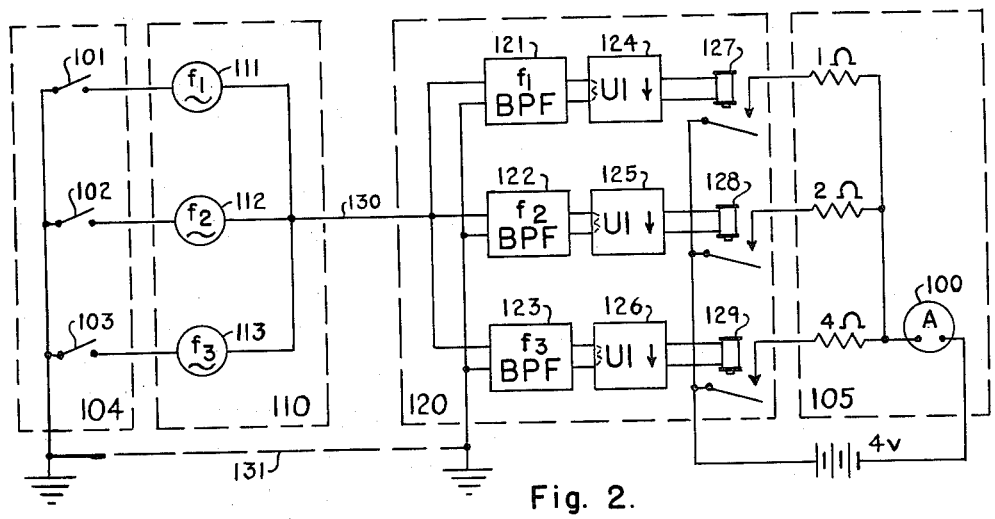
Fig. 2 is another simplified schematic view and wiring diagram showing further basic features, including the use of several audio frequencies to reduce the number of telephone lines required for transmission purposes.

Fig. 2 illustrates a system slightly more complex than that shown in Fig. 1, but having substantially similar characteristics. In this system, the coding unit 104 and the calculator unit 105 are the same as those previously described, but between these two units have been inserted a transmitter unit 110 and a receiver unit 120. The transmitter unit contains three audio frequency generators 111, 112, and 113, generating frequenices $f_1$, $f_2$, and $f_3$, respectively, and said generators are connected in series with the respective switches 101, 102, and 103 in the coding unit. The outputs of the three switch-generator circuits are combined, so that a single wire can carry all three frequencies from the transmitter to the receiver, provided that a return through ground is permissible, as indicated. In the event that a ground return would disturb telephone circuit balances, such ground return could be replaced by a second wire 131 (shown as a dashed line).

On reaching the reeiver, the main transmitting line 130 branches into three band-pass filters 121, 122, and 123, respectively adapted to pass the frequencies $f_1$, $f_2$, and $f_3$ and to exclude the two unpassed frequencies. The outputs of these filters pass through respective U1 units (described later) 124, 125, and 126 to respective relays 127, 128, and 129, which relays, in turn, include switching elements in series, respectively, with the 1-ohm, 2-ohm, and 4-ohm resistors of the calculator unit 105. [In referring to transmission lines or circuits in this description, it will be understood, from now on, that the principal wire, which may be subject to control, is the item of reference, and conventional ground, or return wires, will be assumed to be present, when necessary, in each case, without further comment.] The U1 units mentioned, act as amplifiers and rectifiers, adapted to strengthen possibly weak telephone currents enough to operate the relays. For some purposes, it might be practical to dispense with these units, and feed the band-pass filter outputs directly into the relays.

It will be observed that the closing of which 101 will operate relay 127, since the $f_1$ frequency entering the transmission line 130 will pass through the band-pass filter 121, but the closing of switch 101 will not operate either of the other two relays. In the same way switch 102 will operate relay 128, and switch 103 will operate relay 129, so that the net effect upon the calculator unit 105 of closing the respective switches in coding unit 104 is the same in the Fig. 2 system as it was in the Fig. 1 system. This utilization of multiple frequencies as a means of reducing the number of transmission lines required to interconnect separated units is not novel, but is shown here because of its employment in more complicated circuits later.

The U1 isolating, amplifying, and rectifying unit

Frequent use will be made in this disclosure of "U1 units" like those shown in Fig. 3. Since they are entirely conventional in character, it is assumed that they need not be broken down into all of their separate components, and, therefore, these components will be treated in groups. The first group comprises an interstage isolating, coupling, volume-control, and bias unit 141 adapted to feed into the grid of triode vacuum tube 142 and apply on said grid a bias suitable for transmitting alternating current signals. The cathode of this tube is heated indirectly by means of the circuit 143, shown dotted, which also supplies heater current for the other tubes in this unit, as indicated. The plate current of tube 142 is transformer-coupled to a full-wave rectifier unit 144 of conventional design, adapted to generate a direct current in its resistance element 145 when activated by receipt via the transformer of an A. C. "signal." A bypass condenser in parallel with resistor 145 serves to reduce the amount of alternating current potential between the ends of that resistor.

The grid of a second triode 147 is connected through resistor 145 and a cut-off biasing battery 146 to the cathode of said second triode in such a way that the direct current generated in resistor 145 tends to make the grid go more positive—unblocking the tube, and permitting plate current to flow, when the alternating current entering the rectifier unit is sufficiently strong.

The power supplies for both triodes 142 and 147 are indicated as separate local batteries, to avoid any possible problems of feedback in substituting the unit as a whole into the general system. The plate current of tube 147 flows back to that tube's cathode through resistor 148, and the output of the whole U1 unit 140 is obtained from the leads extending from the ends of resistor 148.

The symbol 149 will be used in other figures to designate a U1 unit, the arrow being located at the direct current [=D. C.] end of the unit, and the arrow pointing toward the more positive terminal of the unit at times when the unit is activated. It is to be understood that the unit, and consequently the symbol, can be turned upside down, or reversed, in order to simplify later wiring diagrams, without changing the character of the unit. The symbol also contains an indication of a resistance across the input, to signify that the unit, when viewed from the input end, appears to be a simple impedance, incapable of sending a power output of its own, either D. C., or A. C., out of the input terminals.

It is to be understood that the elements shown in the unit are purely functional, and that they could be replaced by any other group of elements that would serve to perform the same functions within changing the significance of the operation of the unit as a whole. For very weak signals, additional stages of amplification might be required, whereas at certain points in the system, some of the elements in the unit could be dispensed with entirely. Furthermore, it will be appreciated that the components making up the unit could be rearranged in any final simplification of the complete system, again without changing the significance of the unit operation [e. g., the plate current supplies for the triodes could be made common and obtained from an ordinary power pack, in most cases, after suitable re-grouping of the elements, and possibly making other conventional modifications].

Precision reader unit

A reader unit 200, designed to make a rapid reading of the angular position of its "prime-mover shaft" 201 with an accuracy of about ±.1° in a range of 360°, will now be described in connection with Figs. 4, 5, 8, 9, and 10.

The prime-mover-shaft angle $\theta$ (not shown in the figures) is measured from a predetermined, arbitrarily chosen zero position, and will be assumed to increase positively in a counterclockwise direction. In the form of reader here disclosed, all available coding combinations are included in one revolution of the prime-mover shaft, so that readings of $\theta$ falling outside of a 360° range will duplicate readings within said range. Consequently, if a primary quantity is to be introduced into the general system without ambiguity, a proportionality should be established between $\theta$ and said primary quantity (through external means, not shown) in such a way that the limits of the range of the primary quantity fall within the non-ambiguous 360° range of $\theta$. Note, however, that this characteristic of the apparatus imposes no limitation on angular bearing measurements, since, with a 1:1 coupling, bearing angles and $\theta$ repeat together.

The principal coding members of the reader unit comprise a primary, "low speed," metal disk 210, and a secondary, "high speed," metal disk 220, geared together through a 32:1 gear train made up of the four gears [indicated by their pitch lines] 206, 205, 209, and 221. Disk 210 carries five concentric "code-number tracks" 211, which control the circuits for the first five digit places of the code number, and disk 220 carries six more of these tracks, which control the circuits for six more digit places. Each track may be thought of as a complete annulus (concentric with the center of the disk with which it is associated) divided into conducting and nonconducting circuit-controlling portions.

Attention is now directed to Fig. 4, where the disks 210 and 220 are indicated in their zero positions relative to a vertical line WW passing through the centers of the disks which can be considered to be a kind of "window" through which the tracks are "viewed." The several tracks, which control the code-number circuits through cooperation with contact members (to be described later, but represented in Fig. 4 by dots along the lines W', W'', and WW), are each divided into "0" code-digit portions, such as portions 212 where holes have been punched in the disks, and "1" code-digit portions 213, where the conducting surface of the metal disks is left in place, in accordance with the progressive binary-number code pattern indicated. The pattern for the two disks is the same, except for the addition of an outer sixth track on disk 220.

The formation of the pattern (and binary code number for the prime-mover-shaft angle $\theta$, assuming a 1:1 coupling between the prime-mover shaft and disk 210) may be described as follows: The inner track of disk 210 divides the complete circle into a "0" half and a "1" half, the second track (working outward) divides each of these halves into a "0" quarter and a "1" quarter, the third track divides each of these quarters into a "0" eighth and a "1" eighth—and so on—for the other two tracks on disk 210. This process divides disk 210 into 32 coded sectors, and because of the 32:1 gear ratio in the coupling between disks 210 and 220, disk 220 turns one complete revolution each time that disk 210 advances by the angle represented by one of its smallest track divisions. As a result, the code pattern on disk 220, which divides that disk into 64 coded sectors, serves to sub-divide each of the primary smallest divisions on disk 210 into 64 parts. Thus, assuming an arbitrary setting of the disks (not shown) and reading the code number from bottom to top along the window line WW, an initial "1" would imply that (in that disk position) a conducting portion of the innermost track was under line WW (disregarding contacts for the present), and that, in turn, would indicate the "presence" of 180° in the angle, a second place "1" would show the presence of an additional 90°, a third place "1" would show the presence of an additional 45°, and this progressive process would continue to the last (outer) track on disk 220. For example, a prime mover shaft angle of 299.9° would be expressed by the eleven-digit binary number 11,010,101,010 [$1 \times 180 + 1 \times 90, +0 \times 45 + 1 \times 22.5 + 0 \times 11.25, +1 \times 5.625 + 0 \times 2.813 + 1 \times 1.406, +0 \times .703 + 1 \times .352 + 0 \times .176 = 299.883°$].

Two disks, rather than one, are here employed, because, with an 11-digit system, the angular increment of .176° corresponding to a single binary number unit is so minute that it would be difficult to provide contact means small and accurate enough to distinguish reliably between successive code numbers on a single disk.

[The number of tracks on each of the disks can be altered, if desired, provided that proper speed ratios are maintained in the couplings between the disks, and the number of disks can be increased, or decreased, for special purposes. For example, it appears to be feasible to employ a single disk bearing nine tracks, if an accuracy of ±1° would suffice. In designing a multiple-disk unit, care must be exercised to see that the speed of the final disk never becomes excessive in changing from one angular setting to another.]

With the two-disk system disclosed, the smallest sectors cover substantial angles [5.625°], and consequently, no great precision is required in any of the reader elements except the gear train coupling between the prime mover shaft and the high speed disk. On the other hand, even with this two disk system, since a unit sector advance of the secondary disk still leads to a very small angular shift of the primary disk, special means must be provided to avoid uncertainty in primary-disk code-number readings near the points of transition from one primary-disk code number to the next. It is also necessary to make sure that the appropriate secondary-disk sector is (at least in effect) reasonably well centered under the window line WW at the time of reading. [It will be appreciated that the reading contacts for the several tracks can be displaced angularly from each other without changing the effective pattern, provided that the code patterns in the cooperating tracks are similarly displaced.]

To avoid the uncertainty mentioned, I break the main window line WW into two secondary window lines W' and W'', placed slightly to the left and right of, and parallel to, line WW, respectively, and employ two sets of reading contacts, designated as the W' set and the W'' set, ranged along said secondary window lines, respectively, in making primary-disk readings. These contacts are connected together electrically in pairs (see Figs. 8 and 9), each pair comprising a contact taken from each of said two sets, and one pair being associated with each of the code-number tracks on primary disk 210. The secondary disk 220 is equipped with means (to be described later) which determines whether readings will be made by the W' set of contacts or by the W'' set in each reading position, so that, at points of transition, an advance of one unit sector of the secondary disk could be made to lead to a change in primary disk reading, even if the primary disk remained perfectly stationary.

Figures 5a and 5b illustrate the sequence of events in passing from the code number 11,111,111,111 to the code number 00,000,000,000. The setting for the former number is shown in Fig. 5a, where the reading would be made with the W' set of contacts, together with the set of contacts for the secondary disk (which will hereinafter be designated the W set) that are ranged along the WW line. Advance of the secondary disk to the setting for the latter number (shown in Fig. 5b) leads to the evident change in the reading for the W set of contacts, and at the same time, the means mentioned in the preceding paragraph (associated with the secondary disk) shifts the reading of the primary disk from the W' set to the W'' set of contacts, to give an abrupt change in primary-disk reading despite the insignificance of the motion of the primary disk.

As the secondary disk advances farther in a counterclockwise direction, primary-disk readings continue to be made with the W'' contacts, until the secondary disk has turned approximately half a revolution. At this point, illustrated in Fig. 5c, the primary disk has advanced by an amount equal to half of one of its smallest sectors, and in that position, it is seen that readings made with either the W' or the W'' set of contacts would give the same code number. Consequently, the secondary disk control means can here shift readings from the W'' contacts back to the W' contacts without disturbance, and until the secondary disk has advanced approximately another half revolution to the next transition point, primary-disk readings are made with the W' contacts. [The complete code number in the Fig. 5c position would be 00,000,011,111.]

The means employed to shift readings from one window to the other, and the means used to center the sectors of disk 220 under the window line WW, will now be disclosed in connection with a general description of the reader-unit mechanism 200.

*Reader coupling device*

In certain applications, the prime-mover shaft 201 may be in continuous motion at the instant that a reading is being made, so that precautions must be taken to see that errors are not introduced by changes in code numbers during the time consumed in making a reading. In the reader shown in Figs. 8 and 9, disk 210, which is geared to turn at the same speed as the prime-mover shaft 201, is not directly connected to said shaft, but instead, is connected to it through a gear train, comprising the gears 203, 204, 205, and 206, and a special yielding coupling mechanism, which permits momentary stoppage of disks 210 and 220 by detent means, to be described, while shaft 201 continues to move in either direction, and which quickly restores the normal precision angular relationship between shaft 201 and disk 210 as soon as the detent mechanism releases the disks. The coupling mechanism is a rotary adaptation of the principle of the compound swing-door hinge, which permits the door to swing in either direction, but which tends to bring the door back to a definite central position.

The hub of gear 204 is elongated to form a shaft extending along axis 219, which is journalled at each end in mounting member 202. Coupling member 207 is mounted on, and pinned to, said shaft, and the other coupling members, 208 and 209, are mounted for rotation on, and relative to, the same shaft. Member 209, in addition to serving as part of the coupling, is the gear which cooperates with gear 221 to drive disk 220 through shaft 222, to which shaft both gear 221 and disk 220 are pinned. Member 209 is also rigidly affixed to gear 205.

Members 207 and 208 are provided with stops (shown near the bottoms of these members) adapted to engage each other, and spring 214, which extends between members 207 and 208, is so tensioned as to drive said stops into engagement. Spring 215 is tensioned to drive similar stops on members 208 and 209 into engagement, the stops on members 207 and 209 being driven against the stops on member 208 from the same direction.

With this arrangement, it is seen that, with member 209 held stationary, member 207 can be turned in one direction to wind up spring 214, leaving member 208 engaged, by means of the stops, to member 209, and in the other direction to wind up spring 215, as a result of the engagement between the stops of members 207 and 208. When member 209 is released, the springs drive both sets of stops together, and when in abutment, these stops align the coupling members precisely and cause them to form, in effect, a continuous shaft.

The gear ratios used in the illustrative mechanism are: 4:1 for the 203 and 204 gears; 1:4 for the 205 and 206 gears; and 8:1 for the 209 and 221 gears. Other gear ratios could have been used, but these place the yielding coupling at a point in the system where accuracy requirements are somewhat reduced and spring tensions do not become excessive, while at the same time, the amount of wind-up required in the springs will also be kept within reasonable limits. It should be observed that the 32:1 gear train, comprising the gears 206, 205, 209, and 221, which furnishes the drive connection between disks 210 and 220, does not pass through the yielding portion of the coupling, so that this drive connection is positive.

Reader-cycling and control mechanisms

Ordinarily, the speed of the prime-mover shaft would be low at the time of making a reading, but even so, because of the 32:1 gear ratio connection to the secondary disk, the speed of that disk may be substantial [and in the course of shifting from one reading position to another, the speed of the secondary disk might reach several thousand R. P. M.]. Consequently, in order to obtain a definite reading, a number of events, forming a "reading cycle," take place in sequence in the reader unit, in accordance with the schedule shown in Fig. 10, which covers a full 360° rotation of the cam shaft.

Conventional cams, such as those indicated by the reference number 231, are affixed to cam shaft 230, and are variously shaped to control said sequence of events in the reading cycle while the cam shaft makes one revolution. The timing of the actions of the several members controlled by the cams is indicated by the approximate schematic curves set opposite the identifying symbols in the chart of Fig. 10. The structures and functions of these members will be brought out in the course of describing a typical reading cycle.

Cam shaft 230 can be driven by hand, or by any other suitable means adapted to make the shaft turn through one revolution and then stop. One such means is described in connection with Fig. 15, but single-revolution-mechanical-clutching devices, such as those found in standard adding machines, might be preferable.

As soon as the cam shaft leaves its "zero" position to start a normal reading cycle, brake arm 232, which is pivoted at its lower end for free rotation on shaft 216 carried by mounting member 202, begins to turn clockwise (as viewed in Fig. 9), the force required to hold the arm's roller against its cam being supplied by one of the springs 233. [Similar springs serve a like purpose for the other cam-controlled arms.] Only a slight motion of the arm 232 is required to lead to a pinching of disk 220 between a projection 234 of member 202 and the indicated projection on arm 232. The pinching action is powerful enough to bring disk 220 substantially to rest before the start of the next event in the cycle, the support preventing excessive bending of the thin disk.

After the brake has had an opportunity to act, a primary detent arm 240 (pivoted for free rotation about axis 249 on shaft 241 supported by mounting member 202) begins to turn counter-clockwise (as viewed in Fig. 9) to cause detent finger 242 (including a roller at its engaging end) to engage centering notches, or teeth, 223 (see Fig. 4), which notches are equally spaced around the entire periphery of disk 220. Detent finger 242 is not rigidly affixed to arm 240, but, as shown in the oblique detail elevation in Fig. 8, is pivoted for rotation about a shaft 243. A leaf spring 244, affixed at one end to arm 240 pushes finger 242 in a counter-clockwise direction (as viewed in the Fig. 8 detail)—a stop for this motion being provided by proper shaping of the pivot end of the finger. Shaft 243 is so oriented that when arm 240 is in the engaging position, finger 242 can be rotated about shaft 243 in a plane passing through the center of disk 220. With this arrangement, if disk 220 has not come completely to rest before engagement starts, it is possible for a few of the disk teeth to bump past the finger 242 without damage, whereas, if the finger were constrained to rotate in the plane of rotation of arm 240, the effective camming angle for one direction of rotation of disk 220 would become excessive. Furthermore, since cam spring 233 is effectively much more powerful than the finger spring 244, slight structural inaccuracies, such as variations in the diameter of disk 220, lead to displacements of the detent finger in a plane passing through the center of the disk, and consequently, such displacements have little effect upon centering. The notches and detent mechanism are, of course, arranged to position the coded disk sectors properly under the W contacts (and through the positive gear-drive connection to disk 210, proper positioning of that disk under the W' and W" contacts is also attained).

Fig. 10 shows that brake 232 releases disk 220 before arm 240 has reached the fully-engaged position, and thus finger 242 is free to assume control of the centering of disk 220 smoothly, and ordinarily with no clashing of teeth during the process of stopping the disk.

Occasionally, finger 242 may land directly on one of the outwardly projecting points of the teeth in the disk 220, and such an occurrence, in the absence of additional mechanism now to be described, can lead to failure of the centering operation more often than might at first be supposed. To guard against this trouble, I provide a second detent mechanism, including an arm 245 and finger 246, which is a substantial duplicate of the first, except for the relative orientation and positions of the elements. About the time that finger 242 should come into full engagement with the teeth on disk 220, finger 246 moves briefly toward disk 220 and then withdraws. Finger 246 is so positioned with respect to finger 242 that both fingers cannot rest on the points of teeth at the same time (see Fig. 4), so that if finger 242 happens to be resting on a tooth point, the excursion of finger 246 will push disk 220 enough to get finger 242 off of the tooth point, and the withdrawal of finger 246 then allows normal centering to take place.

With centering thus insured, the next item in the cycle schedule is the simultaneous movement of W contacts toward disk 220, and W' and W" contacts toward disk 210—these sets of contacts being normally held a little distance away from the disk surfaces, except at the time of making a reading.

The W contacts are carried by an insulating block 251, mounted on W contact arm 250, which, in turn, is pivoted at its lower end for free rotation about shaft 216. Contact 252, shown in the partial cross section of insulating block 251, is typical of the contacts in all three sets. The complete contact unit 252 comprises a rigid, headed portion adapted to protrude from, and slide in, a guiding hole in block 251, and a spring portion (connected to an external lead), which normally pushes the rigid portion out of the block until the motion is limited by abutment of the head against the end of the large portion of the hole in block 251 [i. e., to the position of the unnumbered contact in the partial cross section]. Thus, when arm 250 is in the reading position (in which it is shown), contacts which strike the surface of the disk are pushed into the block 251 [i. e., to the position in which contact 252 itself is shown], whereas, contacts which fall into holes in the disk retain their normal positions in the block. [Actually, contact 252 would have to be sticking in block 251 to stay in the position shown, as the spring would normally push the rigid portion of the contact out to the same extent as the other contact, so that the representation is pure pictorial. The reason for not showing the disk solid below contact 252 is that, with the disks in their zero positions, as indicated in Figs. 4, 8, and 9, there should be a hole under the contact.]

The W' and W" contacts are carried by insulating blocks similar to block 251, respectively mounted on W' contact arm 253 and W" contact arm 254, both of which arms are pivoted at their lower ends for free rotation about shaft 217 supported by mounting member 202. At their upper ends, arms 253 and 254 are fitted with respective extensions 255 and 256, the ends of which, except at the time of making a reading, are normally held, by cam action, just out of contact with respective concentric ridges 224 and 225 on the back of disk 220. At the appropriate point in the reading cycle, indicated in Fig. 10, the cams allow the W' and W" arms [253 and 254] to move clockwise (as viewed in Fig. 9) until, as far as the cams are concerned, both the W' and W" sets of contacts could make reading contact with disk 210. However, the ridges 224 and 225 are so designed for cooperation with extensions 255 and 256 that either the W' or the W" set of contacts is held away from disk 210, to meet the reading requirements previously described.

Figures 8 and 9 show the disks in the same positions as those illustrated in Fig. 4, and it will be observed that extension 255 rests on ridge 224 to hold the W' contacts away from disk 210, whereas, ridge 225 does not interfere with the motion of extension 256. The reading is thus made by the W" contacts alone. Had disk 220 been rotated clockwise one tooth (as viewed in Fig. 8), it is seen that the interferences would have been reversed, and the reading would then have been made with the W' contacts alone.

After readings have been made by the contacts, further rotation of shaft 230 leads to the return of arms 250, 253, and 254 to their initial positions [see Fig. 10], and still further rotation of shaft 230 [to its 360°, or new 0°, position] leads to the return of arm 240 to its initial position, to release disk 220. Through the action of the coupling, proper angular relationships between shaft 201 and the reader disks will be restored quickly (as already described), to conclude the reading cycle.

Electric circuits from the disks to common wire 268 are completed through the metal shafts and mounting frame of the reader unit. Brushes could be added readily, if better shaft contacts are desired.

It will be understood that the coding disks 210 and 220 could be modified in many ways, without departing from my basic scheme. For example, instead of using holes in the coding tracks, corresponding portions of solid disks could be covered with insulating material.

*Alternative optical reader unit*

As an alternative to the reader unit employing mechanical contacts, described in connection with Figs. 4, 5, 8, 9, and 10, another form of reader unit 270, employing an optical system, will be described in connection with Figs. 6 and 7. Fig. 6a is a partial front view, and Fig. 6b is a partial side view, partly in section (along the line 6b—6b, extended, of Fig. 6a), of the device; Fig. 7a is a fragmentary plan view, partly in section (along the line 7a—7a of Fig. 6a), of the device; and Fig. 7b is substantially the same as Fig. 7a, except that the positions of the disks 281 and 282 have been shifted enough to make a change of one unit in the code number being read; all of these figures being partly schematic.

Disks 281 and 282 are primary and secondary disks, respectively corresponding to disks 210 and 220 of the reader unit previously described—obtainable accuracy being sacrificed in the interest of simplicity by reducing the number of coding tracks employed. The "window" WW of Fig. 6a, through which the code numbers are read, can be considered to be substantially equivalent to the window WW of Fig. 4. Disk 281 is mounted rigidly on prime-mover shaft 201, the prime mover being the same as that used in conjunction with reader unit 200, previously described. Disk 282 is mounted rigidly on shaft 271, which shaft is driven by shaft 201 through the gear train comprising gears 273, 274, 275, and 276—all shafts being journaled in mounting member 272. Since the primary disk 281 carries four coding tracks, distinguishing code representations can be provided for 16 [=2⁴] positions of that disk. Consequently, for purposes of further subdivision of the primary quantity being coded, the secondary disk 282 is made to turn one complete revolution while disk 281 turns 1/16 of a revolution by means of the gear train mentioned.

The optical system includes light-source means and light-sensitive means responsive thereto, shown schematically in the figures. The method of reading the code number appearing in the window WW of Fig. 6a is indicated in Fig. 6b, where a reading of the code number 01011111 is illustrated. In this example, eight independently-activatable, photoelectric-cell-controlled devices 290 are respectively associated with the several coding tracks on the two disks. At the time of reading, light is directed toward these disks from light-source means 293, and disks 281 and 282 are interposed in the light paths between means 293 and devices 290, whereby to control the reception of light by said devices in accordance with the code-number reading. Thus, light is shown reaching all but two of the devices 290 through holes [or transparent portions], such as 283, in disks 281 and 282, while light for the two remaining devices 290 is depicted as being blocked by solid [or opaque] portions of the disk 281. It is seen that light can reach the four upper devices 290 by passing through disk 282 alone, whereas, in the particular form of reader here shown, it is necessary for light to pass through both disks to reach the four lower devices 290. In the case of the four lower devices, the holes [or transparent portions] in disk 282 are present at every step [even though, for the sake of simplicity, they are not shown in some of the figures] and play no part in forming the code number.

The code numbers themselves will have the characteristics of those already described, and for the purposes of this explanation, the code numbers will be assumed to be of the binary type. With an increasing code number, the code-number digits controlled by the four primary-disk tracks should remain constant [e. g., 0101 in the case illustrated in Fig. 6] while the portion of the code numbers controlled by the four secondary-disk tracks increases from 0000 to 1111, and then, an addition of one unit to the code number should make a sudden change in the primary-disk digit reading [e. g., to 0110, from the Fig. 6 position] as the secondary-disk code-number portion returns to 0000. As before, the movement of the primary disk associated with a one-unit change in the complete code number may be too small to be of practical use in effecting a reliable change in reading, and consequently, special means are introduced to avoid ambiguity at transition points.

One means which I have devised to insure reliability of readings near transition points comprises a plurality of transparent, prismatic elements 285 affixed to, or forming part of, the secondary disk 282. These elements are so disposed on disk 282 that they enter into the optical paths extending between light-source means 293 and the four lower devices 290 when readings are made near transition points, the function of the elements being to deflect the projected light rays definitely to one side or the other of the boundary between coding sections of disk 281, thus to eliminate the possibility of having the rays straddle the boundary.

Fig. 7 shows in detail how the prismatic elements operate on either side of the transition point in the case of a specific one of the devices 290 [i. e., device 291]. With disk 282 in its 1111 code-number position [Fig. 7a], it is seen that light is deflected by one of the prismatic elements 285 into device 291 through one of the holes [or transparent portions] 283 in disk 281, whereas, after disk 282 has advanced one code-number step to its 0000 code-number position [Fig. 7b], the effective reversal of the slope of the prismatic element leads to a cutting off of the light from device 291 by deflecting the light ray onto an opaque portion of disk 281, even though the movement of disk 281 itself is very small.

The important feature of this phase of my invention is the effecting of an abrupt change in light path through the use of means associated with one member, whereby to effect a reliable change in the code-number reading of another member, and it will be appreciated that the reader unit shown in Figs. 6 and 7 represents only one of many substantially equivalent modifications of the idea. For example, prismatic elements 285 could be mounted on a separate member, operatively associated with the disks, instead of being mounted on disk 282 itself; or reflection, instead of refraction and transmission, could be used by replacing elements 283 and/or 285 with suitably tilted mirrors and repositioning the devices 290 and/or the light-source means 293. Again, the gear train could be modified to cause disks 281 and 282 to rotate in opposite directions, and then the slopes of all the prismatic elements should be effectively reversed. The relative positions of the disks 281 and 282, and even the whole character of these members, could be changed without departing from my basic scheme.

In Figs. 6 and 7, it is seen that the prism angles increase in opposite senses as the transition point is approached from opposite sides. When the number of coding tracks is limited, this refinement may be unnecessary, and the elements could all have the same angle over the entire critical range without risk of over-deflecting into an adjoining code-number section. [Furthermore, with the comparatively simple Fig. 6 reader, the movement of the disk 281, though relatively small, is still appreciable, and it might be possible to eliminate most of the prismatic elements without danger.] The grading off of the slopes of elements 285 becomes more important when the number of coding tracks on the primary disk is increased, for then the angle covered by each coding section is decreased, and it may prove necessary to keep the light rays directed more or less toward the centers of the coding sections at the times of making readings. [Two or more of the prismatic elements could be combined into one larger prism with a continuous, though possibly curving, surface: the construction shown is merely more compact.]

So far, it has been tacitly assumed that readings would be made when the coding sections of disk 282 were effectively centered on window WW. The means utilized to effect such centering at the time of reading will now be described.

Light-source means 293 is of the type, known in the art, that is used in making extremely high speed photographs, and may comprise several units connected together for simultaneous flashing, or a single unit combined with suitable light-path-guiding elements. Light-source means 293 is activated by an activating device 294, which device is controlled by a light-responsive unit 295. Unit 295, in turn, is "triggered" by light received from a light-source means 296 through holes [or transparent portions] 284 in disk 282. [As previously noted, the optical path could be controlled equally well by other suitable equivalent means.] Each of the holes 284 extends over an angular range considerably smaller than the angle of a code number section, and these holes are so placed that light can pass from source means 296 [when lighted] to light-responsive unit 295 whenever a coding section of disk 282 is in substantial effective alignment with window WW, and at no other times. The lighting of source means 296 is controlled by switch 297.

When an operator of this type of reader unit wishes to make a reading, he closes switch 297 to light means 296. Assuming that the disk 282 is in motion, light will reach unit 295 as soon as one of the coding sections comes into proper reading position, and then unit 295 will cause device 294 to produce a very brief, high intensity flash in light-source means 293. [If disk 282 is stationary at the time of closing switch 297, it might be necessary for the operator to move the disk a little to get a reading. This difficulty could be overcome by adding an auxiliary device which would impart a small superimposed angular oscillation to the incoming shaft 201.] If the flash mentioned is obtained by discharging a condenser through a suitable lamp, or lamps, and if the time required to recharge the condenser is comparatively long, only the initial "triggering" of unit 295 will lead to a flash, and thus, only the first coding section to come into effective alignment with window WW will be read-repeated triggering of unit 295 keeping the condenser discharged below the flash point until the reopening of switch 297 permits the condenser to recharge for the next reading.

Each of the photoelectric-cell-controlled devices 290 is of a type, known in the art, which effectively completes a connection between common wire 298 and the individual outgoing wire of the device whenever the device receives light from source means 293, the circuit being opened when said light is not received, and thus a reading made with the optical-type reader unit 270 can be made to correspond exactly to a similar reading made with the mechanical-contact type of reader unit 200, as far as the external electric circuit is concerned, units 290 in reader 270 taking the place of the mechanical-contact members in reader 200.

The coding patterns on the disks of reader 270 are shown reversed from those on the disks in reader 200 because, in making a reading, a hole in the former disks leads to the closing of a coding circuit, whereas, a hole in the latter disks prevents the closing of a coding circuit, and vice versa. Of course the process could be inverted easily, and the 0's and 1's in the coding system could be effectively interchanged, without departing from my broad invention or the basic coding principle.

It will be appreciated that the devices and means 290, 293, 295, and 296 do not necessarily have to be lined up as indicated in Fig. 6: the device and means associated with any disk track can be angularly displaced about the axis of shafts 201 and 271, provided that the associated track elements are correspondingly displaced on the appropriate disks. By taking advantage of such permissible displacements, and staggering the units, the space available for the devices and means mentioned can be greatly expanded.

Note that accurate readings can be made with optical-type reader units while the coding disks are in motion, so that much of the control mechanism associated with reader 200, including the resilient-coupling system, is not required. On the other hand, the addition of the flashing optical system may offset the advantage gained through the elimination of the mechanical elements.

Note, also, that accurate readings of prime-mover shaft angles can be made with an optical-type reader unit, even though, except for the gear-train mechanism, the reader is composed of relatively low-precision components.

For remote-control operation of reader unit 270, switch 297 could be replaced by a suitable relay unit, which may be of the time-delay type, and the modifications needed to incorporate this reader into the complete system described later [in the place of reader 200] will become apparent to one skilled in the art.

Data transmission

Whereas Figs. 1 and 2 show systems in which the reader unit is always effectively connected to the calculator unit by a group of circuits in which an individual circuit is provided for each of the several code-number digit places, the fact that each digit in the number is either present [1] or absent [0] at each digit place makes it possible for the whole code number to be transmitted over a single transmission line as a series of properly spaced impulses, provided that there are suitably synchronized distributing elements at the remote and home stations. Thus, in one form of my invention, I employ intermittently-generated [i. e., pulsing] audio frequencies, which are used to produce simultaneous stepping of a pair of standard stepping switches at cooperating remote and home stations, and which are also used to indicate the presence or absence of "1" at each step [i. e., digit place].

To simplify the disclosure of general systems, I will first describe a few sub-units, some of which are employed repeatedly.

The U2 lock-in relay unit

Currents through the reading contacts of a reader unit can be used directly in certain applications, but in some preferred forms of my device, readings must be held for appreciable times, for transmission purposes, even though the circuits through the reader contacts remain closed for very brief periods. Standard lock-in-type relays would serve to hold readings, but in order to reduce contact troubles, I employ an electronic unit of substantially conventional design, shown in Fig. 11. This unit 300 will be called a "U2 unit" in the description and will be designated in other figures by the symbol 301.

As in the case of the U1 unit, the elements shown are purely functional in character, and can be rearranged to meet practical requirements without changing the significance of the unit or symbol. Within the U2 unit, the grid of triode 302 is connected to the cathode of said triode through a high-resistance grid leak 303 and a cut-off biasing battery in series. Said grid and cathode are also connected together through a circuit including a condenser and resistor 304 in series. The purpose of the bias through grid leak is to cut off the plate current of the triode tube as soon as the grid is free from external connections, and the purpose of the condenser-resistance grid-cathode circuit is to introduce a slight time delay action in cutting off the plate current to reduce excessive plate voltage surges when inductive loads are suddenly cut off, and to provide sufficient time for external units to operate reliably when time delays are desired. The condenser-resistor unit can also serve as a kind of filter to reduce any "alternating-current" potential differences between grid and cathode that might otherwise lead to operational disturbances.

The plate current of tube 302 passes through the coil of relay 305, the plate power being supplied by a battery within the unit. Operation of the relay closes a circuit, one end of which is connected to the grid of triode 302 and the other end of which extends outside of the U2 unit. This outgoing end 306 may be connected back to the (outgoing) cathode terminal of the U2 unit through external means to lock relay 305 closed until the external connection between wire 306 and cathode is removed (e. g., by opening switch 307, which is in series with low resistance 308), or by applying cut-off voltage between cathode and wire 306 (e. g., by closing switch 309, which is in series with a cut-off battery).

In addition to the internal switch contact of relay 305, this relay may have one or more circuit opening and/or closing elements external to the U2 unit, as indicated.

The main control element for the U2 unit comprises an external connection to the grid of triode 302, and in Fig. 11 the grid is shown connected to a typical reader contact element 252. It is seen that a momentary contact between element 252 and the fragmentary portion of the reader disk 210 will effectively short circuit the grid to cathode (through the disk contact brush 218 and low resistance 308) and discharge the grid condenser through comparatively low resistance 304, unlocking the tube and allowing plate current to flow. Even though the contact with the reader disk lasts for a very brief interval of time, the tube will remain unblocked until the condenser has recharged to cut-off through the high resistance grid leak, and this should provide ample time for relay 305 to operate reliably. Once operated, relay 305 remains closed, even though the reader contact circuit reopens, until, in the circuit shown, either switch 307 is opened, or switch 309 is closed.

U2 units will be used for a variety of purposes in circuits shown in other figures, and it is to be understood that the particular external circuits shown in Fig. 11 merely exemplify a particular application. Once more, as with all of the units symbolically represented, it is to be understood that the elements within the unit can be turned upside down, reversed, or modified to meet circuit requirements and simplifications, without departing from the significance of the function of the unit.

The U3 stepping-switch-drive unit

Figure 12 illustrates a group of units 320 used to drive the stepping switches incorporated into the signal-transmitting systems shown in other figures. This group as a whole is called a "U3 unit" in the description and is designated in the figures by symbol 321. It comprises a conventional stepping-switch-drive mechanism 322 controlled by an auxiliary relay 323, which, in turn, receives its actuating power from a local-power-supply battery through the plate circuit of a triode 324. The contacts of auxiliary relay 323 are bridged by a conventional spark-suppression unit consisting of a resistance and condenser in series. The grid of tube 324 is normally biased to cut-off by a local battery connected between cathode and grid through the D. C. output end of a U1 unit 325. Tube 324 can be unblocked by applying an A. C. signal to the externally extending input terminals of the U1 unit. The grid of tube 324 is connected through a conventional self-interrupting-switch-contact member 326 mounted on the stepping switch, to another lead wire 327 extending out of the unit. When wire 327 is connected through external means to the cathode through a relatively low resistance, the grid potential rises relative to the cathode to unblock the tube and operate relay 323. The closing of the switch of relay 323 applies operating current to the coil of drive mechanism 322, to pull the clapper of said mechanism to the right—permitting the ratchet pawl to engage a new tooth on stepping-switch ratchet 328, and at the same time, opening switch 326. The opening of switch 326 permits the grid of tube 324 to return to cut-off bias, thus releasing relay 323 and allowing the clapper of drive mechanism 322 to move to the left—advancing the stepping switch ratchet one step, and reclosing switch 326. As soon as switch 326 again closes, tube 324 is again unblocked, and the cycle repeats continually until the low-resistance connection between cathode and wire 327 is removed, or until cut-off bias is reestablished between cathode and wire 327. The cycling just described takes place on a self-interrupting basis, independent of any external pulsing signals, and it is this type of cycling which is utilized in "homing" operations.

Cycling, under the action of periodic, alternating-current pulses applied to the externally-extending input terminals of U1 unit 325, is similar to that just described, except that it is ordinarily much slower, and does not involve the 326 switch circuit. In the preferred form of my invention, the two types of cycling never interfere with each other, because the input to the U1 unit is disconnected when the circuit through wire 327 comes into play, and vice versa.

It should be noticed that the stepping switch makes its one-step advance at the end of the application of an alternating current pulse to the U1 unit (when the clapper of the stepping-switch-drive mechanism 322 returns to its lefthand position, under the action of the spring indicated), rather than at the beginning of said pulse, and thus, all circuit changes made by the stepping switch are normally effected when the circuits are inactive.

"Full-pulse circuits"

At certain points in the operating cycle, circuits may be opened or closed by hand, or by mechanisms that are not controlled by the synchronizing pulsing. Unless special precautions are taken, this might disturb synchronization, because mechanisms are not exactly equal, and a fraction of a pulse (like that leading the symbolically-represented train of pulses shown dotted in Fig. 13) that would cause one stepping switch to advance might not supply enough energy to operate another cooperating stepping switch. The difficulty may be overcome through the use of "full-pulse circuits," which will now be described.

The basic principle of the type of full-pulse circuit which I have devised is illustrated in Figs. 13 and 14, and an application of the principle is described later in connection with Fig. 15, under the heading "The U4 reader-cycling unit."

Referring to Fig. 13, suppose that it is the duty of the switch element of relay 341 to start the transmission of pulsing signals (produced by a pulsing generator represented by the symbol 342) into a wire 343. The full pulse objective will be attained if means are provided which permit the switch to establish connection between the generator and wire 343 only in one of the intervals between pulses, because then, the next full pulse to reach the switch will be transmitted through the switch in its entirety.

To achieve this result, a two-winding relay, of the type which disconnects wire 343 on being energized by either winding, is employed. One winding 344 is connected in series with a normally-closed push-button 345 and battery, so that wire 343 will remain disconnected unless push-button 345 is depressed. The second relay winding 346 is arranged to be energized by the signal pulses themselves, through the use of an extra contact on the switch—a circuit including the generator and winding 346 in series being closed when the connection from the generator to wire 343 is open. It is seen that both relay windings must be deenergized at the same time to permit the switch to connect wire 343 to the generator, so that if push-button 345 is operated while a pulse is passing through winding 346, the switch connection to wire 343 will continue to remain open until the end of the pulse, and then, assuming the push-button circuit to remain open, the switch will establish the connection to wire 343—at the same time breaking the connection to winding 346, to prevent the receipt of subsequent pulses from reopening the connection between the generator and 343. Release of the push-button will, however, again energize winding 344 and break the connection to wire 343.

If a second push-button 347 (which, at first, was assumed to be absent) is now placed in parallel with original push-button 345, it is seen that the relay will take no switching action until both push-button circuits are open, and that, as before, the switching action will take place only at a time when pulse current is not passing through winding 346.

The basic features of the device are (1) that its operation depends upon the absence of two elements—one element being supplied by primary-control means, and the other by the pulses of pulsing signals—and (2) that once the device has been released by both of said elements together, the element supplied by the pulses loses control over the device.

While Fig. 13 illustrates a system in which the generator, which may be of the pulsing direct-current type, provides a source of power suitable for energizing winding 346 directly, Fig. 14 shows a more complete full-pulse system, in which the control pulses may be obtained from a weak, pulsing A. C. source. Even though modified by the inclusion of intermediate auxiliary elements, the Fig. 14 unit as a whole functions like the Fig. 13 unit—the switch element of relay 352 [Fig. 14] corresponding to the switch element of relay 341 [Fig. 13], wire 354 [Fig. 14] corresponding to wire 343 [Fig. 13], the switch elements of relays 356 and 357 [Fig. 14] corresponding to push-buttons 347 and 345 [Fig. 13], and the single coil 352′ of relay 352 [Fig. 14] corresponding to the two coils of relay 341 [Fig. 13].

In the Fig. 14 system, a pulsing A. C. generator 351 is arranged to be selectively connected, through the switch element of relay 352, to either one or the other of the two principal circuit wires 352 or 354, the selection of connection being primarily effected (in an indirect manner described later) through the use of auxiliary control-circuit switches 358 and 359. The switch element of relay 352 connects generator 351 to wire 353 when the coil of that relay is activated, and connects the generator to wire 354 when said coil is not activated. Local battery 360 is connected to coil 352′ through the switch elements of relays 356 and 357, said switch elements being connected in parallel. The power output side of amplifying and rectifying U1 unit 355 is also connected to coil 352′. It is, therefore, possible for that coil to receive power from either or both of these two different power sources. The input side of U1 unit 355 is connected (via ground) in series with generator 351, the switch element of relay 352, and wire 353, so that with the switch element in the position illustrated, the generator will activate the U1 unit to send pulsing power to the coil of that relay.

The coil of relay 356 is connected in a series circuit with switch 358 and a local battery, and the switch element of that relay opens the circuit it controls upon activation of the relay coil through the closing of switch 358. The coil of relay 357 is connected in a series circuit with switch 359 and a local battery, and the switch element of that relay opens the circuit it controls upon deactivation of the relay coil through the opening of switch 359. Consequently, with switches 358 and 359 in the positions illustrated in Fig. 14, the switch elements of relays 356, 357, and 352 will assume the positions there shown, and the coil of relay 352 cannot be deactivated until the positions of switches 358 and 359 have both been changed. As soon as switch 358 is closed and switch 359 opened, relays 356 and 357 will open the circuits they control, and thus prevent power from reaching coil 352′ from battery 360. Even then, coil 352′ will continue to be activated by power received from unit 355 as long as any portion of a pulse from the generator reaches said unit via wire 353; but at the end of such pulse, coil 352′ will cease to be activated, and the switch element of relay 352 will thus be caused to shift the generator connection from wire 353 to wire 354 during an interval between pulses—the desired result. By breaking the connection between the generator and wire 353, such a switching action will prevent subsequent pulses (alone) from reactivating relay 352. That relay can, however, be reactivated by returning switches 358 and 359 (or either of them) to their initial (illustrated) positions.

By considering the operations possible with one, or more, of the 356 and/or 357 relay systems present, in either the parallel arrangement shown, or in a series arrangement, it is seen that the functions of any direct switching operations can be duplicated on a full-pulse basis by performing corresponding operations with switches in auxiliary control circuits, and consequently, instead of showing all of the auxiliary circuits required, the presence of such suitably adapted auxiliary circuits will be indicated in subsequent figures by adding the letters "FP" to representations of direct switching elements—as illustrated in connection with symbol 361 in Fig. 14.

The symbol 351 will be used in other figures to designate a pulsing A. C. generator, and the symbols $F_1$, $F_2$, and $F_3$ in both text and figures will stand for synchronized pulses of three different A. C. frequencies—$f_1$, $f_2$, and $f_3$ being used to indicate three different non-pulsing A. C. frequencies.

Synchronized pulsing A. C. signals can be generated in a variety of ways known in the art, as, for example, by passing the outputs of a group of audio oscillators through respective commutator units, the rotating elements of which are mounted on a common shaft. This may not be the best way to generate such signals, but specific internal structures of the generators do not in themselves constitute a feature of my invention and will not be taken up in detail here.

The U4 reader-cycling unit

The unit 370, shown in Fig. 15, to which has been assigned the symbol 371 for use in figures, and to which the title "U4 unit" will be applied in the text, is adapted to drive, and to control the operation of, the cam shaft 230, of reader unit 200 (see Fig. 8), during the reading cycle.

In this unit, a motor 372 is adapted to drive cam shaft 230 through worm-gear-reduction-drive means 373. Power can reach the motor from a local battery supply via a circuit passing through a normally-open switching element of relay 374 in series with a normally-closed switching element of relay 375, or through normally-open switch 376.

The reading cycle may be started by closing switch 377, which activates the coils of relay 374 to close one power-supply circuit to the motor. As soon as the cam shaft 230 starts to turn, rotation of cam 378, rigidly affixed to shaft 230, causes switch 376 to close, through the action of the cam follower indicated, thus closing the second power supply circuit to the motor. The activation of relay 374 closes a switch element which activates relay 375, which latter activation leads to an opening of the first power supply circuit to the motor. By the time this opening occurs, however, switch 376 has already closed, to keep power flowing to the motor, since relay 375 is of the slow-operating type. Motor 372 will continue to run until its second source of power supply is also cut off—when the cam returns to the initial position shown, at the end of one revolution.

As an alternative to the local cycling resulting from the operation of switch 377, a cycle can be initiated by momentarily unblocking normally-blocked triode 379 to again activate relay 374, by establishing a suitable unblocking potential difference between the first and fifth (cathode and grid) terminals of the unit by external means. Relay 374 is of the slow-release type, so that even though tube 379 be unblocked for a small fraction of a second, motor 372 will be supplied through the 374 relay circuit for a time long enough to permit switch 376 to close and continue the cycle.

The U4 unit includes circuit-control means which breaks a normally-closed circuit between the unit's third and fourth terminals at the start of the reading cycle, and which reestablishes the connection between said third and fourth terminals on a full-pulse basis at the end of the reading cycle, assuming that switch 377 is open, and that relay 374 was activated by a brief pulse received by tube 379. Thus, the initial activation of relay 374 operates a switching element which opens the circuit between the third and fourth unit terminals, and before relay 374 again releases, the closing of a switch associated with switch 376 serves to energize the coil of relay 381 to operate switching elements which make a second break in the circuit between the third and fourth unit terminals, and at the same time, connect the plate of triode 380 to the coil of relay 381. The release of relay 374 closes one of the breaks in the circuit between the third and four unit terminals, but the second break cannot be healed until the switching elements operative with switch 376 open at the end of the reading cycle. Even then, relay 381 will be held closed by plate current from tube 380, if the tube is being unblocked by a [D. C.] pulse received from the generator indicated as being connected to the first and second terminals of the unit. Thus, the circuit between the third and fourth terminals will not be reestablished until the end of the pulse following the opening of switch 376.

It would probably be advisable to equip the motor with braking means to prevent overrunning at the end of the cycle.

The U4 unit includes a conventional alarm-bell device 382 [or other suitable means], connected in parallel with motor 372, for giving an indication of the making of a reading.

If there is any chance that an attempt might be made to make a reading when the reader's secondary coding disk is turning at an excessively high speed, possible trouble from that cause could be avoided by providing the reader unit with a centrifugal cut-out device [or any other suitable form of conventional cut-out] that would prevent the cycling motor 372 from getting its power supply until the speed of the secondary disk had been brought within safe limits.

Polar-coordinate system

Figures 16 through 19 together constitute an abbreviated and largely schematic showing of a complete system for indicating on a chart at a home station a position [i. e., definite point on the chart] "defined" by polar-coordinate magnitudes introduced into the system at a remote station. The system depicted is very rudimentary, since it provides for only four values of each of the two polar-coordinate variables, but additional circuits and related components, like those disclosed, can be added readily by one skilled in the art to extend the number of digit places in the code numbers, and thus get a tremendous increase in accuracy. [The additional circuits and elements mentioned would be qualitative duplicates of those shown, except for the evident variations required to create the code itself. Compact six-bank, 25-step stepping switches are standard items, so that such switches could take care of ten tracks on each of the readers and still leave the five steps used for special purposes. Three-bank, 50-step stepping switches are also standard items, and the number of available banks could be increased by running two or more of the stepping switches in parallel.]

NOTE.—The stepping switches illustrated herein are of the type which go through two complete, duplicate stepping-switch cycles each time their sweep-arms make one revolution—each bank extending over 180°, and being swept alternately by one or the other of two alternative, equivalent sweep arms spaced 180° apart. In reference to stepping switches, "steps," or "positions," are stepping-switch-cycle steps, or positions, regardless of which set of sweep arms is being used.

In this particular system, a single remote station, with two reader units—unit 400 for polar-coordinate radius $r$, and unit 401 for polar-coordinate angle $\theta$—is represented as being wired for the operation of a single calculator unit, but it will become evident that the drive units for the $r$ and $\theta$ portions of the calculator could receive their respective "data" from two entirely distinct reader-transmitter-receiver systems, provided that each pair of coordinate readings referred to the same object point, and that, in each case, both readings of a pair of co-ordinate readings were utilized by the calculator concurrently.

Figure 16 is divided into two main sections—the upper half being a partial schematic representation of home station apparatus, and the lower half being a partial schematic representation of remote units. It will be observed that the two sections are connected together by means of three wires in addition to ground, but, if desired, one of these connecting wires could be eliminated by using a second audio frequency and suitable band-pass filters, as explained in connection with Fig. 2, and the remaining two connecting wires could be consolidated into one through the use of hybrid circuits known in the telephone art.

The circuit shown dotted serves as a position check, and reduces the chance of error by preventing "readings" from being introduced into the calculator-drive units in the event that the stepping switches reach the check point (here indicated as step 8) out of synchronism, but it is not essential to the fundamental operations performed by the system.

Reader unit 401 illustrates a simple way in which a primary quantity can be coded and introduced into the system automatically, when requirements are not too stringent. In this case, the coding members are assumed to be stationary, and the angle through which the pointer arm 410 has moved from the indicated zero position is assumed to be equal to the primary quantity $\theta$—the polar coordinate angle. It is also assumed that the pointers are held stationary throughout the reading cycle.

The coding means of reader 401 comprises two stationary commutator members 405 and 406, made of conducting material, suitably insulated from each other, and respectively connected to terminals 3b'₅ and 3b'₆ [i. e., to the 5th and 6th terminals of the 3b' bank] of stepping switch 430. Certain portions of the peripheries of said commutator members (shown in heavy black) are insulated to form a code pattern for the code unit as a whole effectively equivalent to that described in connection with reader disk 210 (see Fig. 4).

Brushes 412, which serve the same purpose in reader 401 as the contacts 252 in reader 200 (Figs. 8 and 9), are carried by pointer arm 410 for rotation about a pivot at the center of members 405 and 406. Brushes 412 are connected together, and, through other brush means near said pivot, to the main incoming signal wire 420.

Through cooperation between one of the brushes 412 and member 405, connection is established between wire 420 and said terminal 3b'₅ whenever said brush rests on an uninsulated portion of member 405. In the same way, the other 412 brush cooperates with member 406 to establish connection between wire 420 and terminal 3b'₆ whenever that brush rests on an uninsulated portion of member 406.

NOTE.—The type of connection just described, which may, or may not, be present, as determined by the code number involved, will hereinafter be termed a "coded connection."

The two inner commutator members of reader 400 are duplicates of the two inner commutator members 405 and 406 of reader 401, but in reader 400, a third commutator member 404 has been added to illustrate the method to be followed in increasing the number of digit places in the code number controlled by the pattern in the coding unit. Each commutator member controls one digit place in said code number and functions in the same way as a code number track on disk 210 (Fig. 4). The innermost and next commutator members of reader 400 are connected, respectively, to terminals 3b'₂ and 3b'₃ of stepping switch 430.

As in reader 401, the pointer arm of reader 400 (which is a substantial duplicate of arm 410) carries brushes which cooperate with the commutator members to establish coded connections between incoming signal wire 420 and the stepping switch terminals last mentioned.

The circuit associated with commutator member 404, which would be present in an expanded system, is indicated, in part only, by dashed lines connected to the terminal 3b'₄ of stepping switch 430 and to the corresponding terminal 5b₄ of stepping switch 431. It will be appreciated that the stepping switches could include similar additional terminals [and steps] for additional commutator members.

Since a two-digit code number is adapted to indicate only four different angular positions, said positions have been set at 90° intervals in reader 401. It is assumed that, at the time of reading, pointer arm 410 will be set in that vertical, or horizontal position which most nearly approximates the value of the primary quantity [here the polar coordinate angle θ] that is to be introduced into the system. Thus, the inadequacy of the number of digit places in the code number may lead to errors of as much as ±45° in reading θ. In the case of the reader 400, the magnitude of the comparable error could be cut in half by incorporating commutator member 404 and suitable related elements, into the system.

To avoid uncertainties at points of transition from one code number to the next in the reader unit, the readers are provided with interrupter members 413 and 414, similar in character to the commutator members, which are used to open the circuit extending between bank 3b' [i. e., the common bank terminal] of stepping switch 430 and main outgoing signal wire 421 whenever the reader pointer arms are in the neighborhood of code number transition points—such opening preventing the setting up of a code number, other than zero, in the calculator unit. The circuit just mentioned may be traced from bank 3b' to conducting disk 415, thence through brush unit 411 to establish coded contact with interrupter 414, thence by wire connection to interrupter 413, thence via coded connection through brush unit 417 to conducting disk 416, which disk is directly connected to outgoing signal wire 421. In addition to acting as brushes, units 411 and 417 are adapted to act as detents, to indicate the proper reading setting of the pointer arm, arm 410 being illustrated in an improper reading position.

[In the system shown, faulty setting of the reader pointer arms would prevent initiation of the stepping cycle in the first place (as explained later). Further precautions against false reading transmission could be taken, if desired, by including additional interrupter units, similar to those described, in series in the dotted position-check circuit.]

It is seen that as long as the reader pointer arms remain in fixed reading position, continuous coded connection is maintained between incoming wire 420 and terminals 3b'₂, 3b'₃, 3b'₅ and 3b'₆ terminals of stepping switch 430, and that continuous actual connection is maintained between the 3b' bank terminal and outgoing wire 421.

Wire 421, on reaching the home station receiving system, is connected to the input side of a U1 amplifying and rectifying unit 432. The 5b bank of stepping switch 431 is connected, through the D. C. output side of unit 432 and a cut-off biasing battery in series, to ground, in such a way that, when an A. C. signal is received by the 432 unit via wire 421, the potential of [the rotary contact arm of] the 5b bank becomes less negative relative to ground.

NOTE.—Although wire 421 does not actually pass through U1 unit 432, the signal path, or circuit, does effectively pass through said unit [to bank 5b]—the function of the unit and associated cut-off biasing battery being merely to convert possibly weak A. C. signals received over wire 421 into a form adapted to actuate other units in the system at times when said A. C. signals are being received, and to fail to actuate said other units at times when no A. C. signals are being received. To avoid unnecessary duplication of grounding and biasing descriptions, signal paths may be identified by wire numbers and be said to "pass through" units—proper biasing and grounding for purposes indicated being taken for granted without comment.

NOTE.—Where direct wires, rather than telephone lines, are available to connect the remote and home stations, pulsing A. C. generator 450 could be replaced by a pulsing D. C. generator, connected through a cut-off biasing battery to ground, and one skilled in the art could readily modify the whole system for D. C. operation, with elimination of the U1 units throughout.

Terminals 2, 3, 5, and 6 of the 5b bank of stepping switch 431 are connected, respectively, to the grid control wires of U2 lock-in relay units 442, 443, 445, and 446, the cathode wires of said U2 units being connected via a common wire to ground through a normally closed switch element operated by U2 unit 440. The lock-in wires of U2 units 442, 443, 445, and 446 are connected to a common wire, which wire is connected both to ground, through comparatively low resistance 447, and to stepping-switch terminal 3b₁₁.

Suppose, now, that the pointer arms of readers 400 and 401 are both in their 180° positions, and that stepping switches 430 and 431 are caused to advance in synchronism to their second steps. Generator 450 will then be brought into coded path connection with U2 unit 442 via wire 420 and the inner commutator member of reader 400 to terminal 3b'₂ of stepping switch 430, thence through the 3b' bank connection and the interrupter circuits of both readers to U1 rectifier unit 432, and thence through the 5b sweep arm and 5b₂ terminal of stepping switch 431 to the grid control wire of U2 relay unit 442.

With the reader pointer arms in their assumed 180° positions, each of the readers will read the code number "10" [i. e., the "coded connections" established by the reader units will comprise actual closed-circuit connections between wire 420 and terminals $3b'_2$ and $3b'_5$, and open circuits between wire 420 and terminals $3b'_3$ and $3b'_6$ of stepping switch 430]. Consequently, at step 2, under the assumed conditions, a signal from generator 450 will reach U2 unit 442 and cause that unit to close its switch element, thus setting up a "1" in the first code number digit place in the home station receiver, in correspondence with the "1" that was originally set up in the first code-number digit place in the remote station reader 400, and since the cathode and lock-in wires of said U2 unit 442 are both at ground potential, the unit will lock in to hold its setting after it ceases to receive further signals from the generator.

In like manner, a synchronized advance of the two stepping switches to their third steps will serve to transfer the second code-number digit place reading of reader 400 [here "0"] to U2 relay unit 443 at the home station [leaving the switch element of U2 unit 443 open, in this case]. As the two stepping switches are caused to step farther in unison, the code number "10," set up in reader 401, will be transferred progressively to the home station receiver at steps 5 and 6 by closing (and locking in) the switch element of U2 relay unit 445, while leaving the switch element of U2 unit 446 open.

A complete set of readings of two [expanded] remote reader units can be transferred to the home station in this way in a short space of time. Assuming a relatively slow pulsing rate of 5 complete pulses per second [to assure reliable operation of all units], and assuming the use of two ten-digit-place code-number readers [each having a reading accuracy of about ±1 part in 2000] and five control steps, it will be observed that the whole 25-step data-transfer cycle will occupy only 5 seconds, and that since the readings of the primary quantities are transferred in the form of absolute numbers, there is no loss of accuracy in the transmitting process itself.

Note that much more time, and many more pulses, would be required to attain equivalent accuracy through the use of ordinary decimal-system code numbers. [The ordinary number 999 would require 27 transmission pulses, whereas, with the binary-number system, not more than 10 pulses are required to transmit any number from 1 to 1023.]

Cycle control, and synchronization

Attention is next directed to the means employed to synchronize and control the stepping switches. It will be observed that, as step 1, neither stepping-switch-drive unit 433 nor drive unit 434 can receive a signal from generator 450 until the full-pulse switch 435 at the remote station is closed. [Note that generator 450 could be connected to any point of wire 420, so that the placing of the generator in the home station, as indicated, is purely optional.] The closing of switch 435 initiates the stepping cycle of sending a [full-pulse] signal to U3 unit 433 through the $1b'_1$ connection, and at the same time sending a similar signal to U3 unit 434 via $3b'_1$, the reader interrupter circuits, wire 421, and $1b_1$. Receipt of the signal by both drive units simultaneously will normally cause both stepping switches to advance to step 2 in synchronism, but note that if either of the reader pointer arms is not in proper reading position, no signal will reach drive unit 434, and stepping switch 431 will remain idle.

Advance to step 2 establishes comparatively direct connections between the generator and the stepping-switch-drive units, via the terminals from $1b'_2$ to $1b'_{12}$, inclusive, tied together, in switch 430, and via the terminals from $1b_2$ to $1b_{12}$, inclusive, tied together, in switch 431. The connection thus established between generator 450 and drive unit 433 persists until stepping switch 430 returns to its initial position, independent of other circuit elements. Ordinarily, the similar connection to drive unit 434 also persists until stepping switch 431 returns to its initial position, so that in a normal stepping cycle, each generator pulse actuates the relays in both drive units, and at the end of each pulse, the stepping switches advance together in synchronism.

In the event that improper setting of the reader pointer arms keeps switch 431 idle upon the closing of switch 435, switch 430 will run through its cycle alone, but in that case, the remote station will have no effect upon the home station.

Position check and homing circuits

It is possible that the stepping switches could be thrown out of synchronism by the introduction of extraneous pulses, or by momentary disconnections in the transmission-line circuits. As a disparity of even one step in the follow of the two stepping switches could lead to very large errors, a circuit is provided which keeps the data set up in the home-station receiver from being transferred to the calculator unit unless the stepping switches reach a position-check step, at the end of the data-transmission sequence, in synchronism. [It is believed that the chance that the two switches would reach the check point together as a result of two, or more, compensating errors is very slight.]

The position-check circuit mentioned is shown dotted in Fig. 16, where it can be seen that the 8th step is the step primarily involved. Assuming both switches to be set at step 8, it will be observed that U1 units 436 and 437 are both connected to receive signals from the generator by means of independent circuits, one of said circuits passing through terminal $2b'_8$ of switch 430, and the other passing through terminals $4b_8$ and $3b_8$ of switch 431. The cathode wire of U2 unit 440 is connected directly to ground, while the grid-control wire of that unit reaches ground through the D. C. output end of U1 unit 437, the D. C. output end of U1 unit 436, and a cut-off-biasing battery in series. The U1 units are connected in opposition, and are adjusted in such a way that the output of unit 437 would operate U2 unit 440 were it not for the presence of the opposing output of unit 436. Thus, when both of the U1 units 436 and 437 receive signals at the same time, U2 relay unit 440 remains inactive, but if switch 430 reaches any step other than the 8th step when switch 431 reaches the 8th step, the output of U1 unit 437 will be unopposed by an output from unit 436, and U2 unit 440 will operate.

Note that, at step 8, unit 437 receives its signal from generator 450 by means of a circuit lying wholly within the home station receiver, whereas the generator signal must pass through the transmission lines connecting the remote station to the home station in order to reach opposing unit 436. Since it is the absence, rather than the presence, of output from unit 436 which leads to the activation of U2 unit 440, any transmission-line failure will cause unit 440 to operate.

The lock-in wire of unit 440 is connected through a resistance to ground, so that unit 440 locks in on being activated. The operation of the unit opens the normal input circuit to drive unit 434, and at the same time establishes a substantially conventional homing circuit through the $2b$ homing bank of stepping switch 431—leading said switch to step under self-interruption [as described in the portion of this specification dealing with the U3 unit] until the connection between wire 438 and ground is broken by the return of switch 431 to its initial step 1 position. When step 1 is reached, with relay unit 440 in its operated position, cut-off-biasing potential is applied to the lock-in wire of that unit, and unit 440 is thus released, to restore normal initial circuit conditions in the home-station receiver.

[The sweep arms of the homing banks of stepping switches shown in the figures are fitted with "bridging" wipers, which, in advancing, make a new contact connection at each step before breaking connection with the previous contact. The sweep arms of all of the other stepping-switch banks are fitted with "non-bridging" wipers, which break one contact connection before making another. The rate of stepping during the homing process is ordinarily very much faster than the normal stepping controlled by signal pulses—even though the auxiliary relay in the U3 unit must have time to act at each step.]

The same activation of U2 unit 440 which led stepping switch 431 to "home," also caused a normally-closed switching element of unit 440 to break the connection between ground and "tentative-ground" wire 439. The breaking of said connection unlocks U2 units 442, 443, 445, and 446 directly, to wipe out any false data that might be stored in them, and prevents the wiping out (in the calculator-drive unit 470) of the settings previously transferred to the calculator—which previous settings would normally be wiped out at step 9 by the process next to be described.

Since, at any step, other than initial step 1, both stepping switches will normally receive pulses from the generator, via their respective banks 1b and 1b', regardless of the operations of any circuit elements except U2 unit 440, and since the operation of unit 440 causes switch 431 to home to step 1, it is seen that, no matter how far out of step switches 430 and 431 may be, it is only necessary to leave control switch 435 open for a few seconds to bring the stepping switches back into synchonism at step 1—where they will stop (independently) and wait for a reclosing of switch 435.

Transfer of data to calculator-drive units

Assume that the stepping switches have passed the position-check step 8 in synchronism, and that data received from the remote station has been stored in U2 units 442, 443, 445, and 446, as previously described—units 442 and 445 being locked in, and units 443 and 446 being open.

In order to transfer to data mentioned to the U2 units 452, 455, 455, and 456 in the calculator-drive unit 470, these last named U2 units are first unlocked, or "zeroized," to wipe out any data (other than zero) that might already be stored in them. This unlocking is brought about at step 9 by placing cut-off bias on the common lock-in wire 422 (which wire is normally at ground potential because of the ground connection through resistor 448) by means of a circuit passing through terminals 3b9, 4b9, and a cut-off-biasing battery to tentative ground wire 439. [As previously stated, there would be no such zeroizing if a position-check failure at step 8 had caused U2 unit 440 to operate and break the ground connection to wire 439.]

[Incidental attention is called to the advantage of the somewhat unconventional "back-to-back" arrangement of the 3b and 4b banks of stepping switch 431: by connecting together the sweep arms of these two banks, and isolating them from external connection, the circuits through these banks may be made entirely independent of each other at each step.]

Up to this point the closing, and locking-in, of the switch elements of U2 relay units 442 and 445 closed one of two gaps in each of the respective grid-control circuits of U2 units 452 and 455. Advance of stepping switch 431 to step 10 normally places ground potential on wire 423 (via terminals 3b10 and 4b10 and tentative-ground wire 439), and thus, normally-blocked triode 449 is unblocked to operate relay 441. [There would be no activation of tube 449, if a faulty position check at step 8 had caused U2 unit 440 to operate and disconnect wire 439 from ground.] The operation of relay 441 closes the second of the two gaps in each of the control-grid-wire circuits of the U2 units in calculator-drive unit 470, and thus establishes momentary coded connections between said control wires and momentarily-grounded wire 423. In the assumed case, such momentary connections would operate, and lock in, U2 units 452 and 455, and leave U2 units 453 and 456 open—in conformity with the code numbers previously set up in the receiver.

As soon as stepping switch 431 leaves the 10th step, the ground connection to wire 423 is removed, and triode 449 reblocks to release relay 441. Because of the lock-in, however, the data set up in unit 470 remains there until it is wiped out by "zeroizing," as described in connection with step 9.

Advance of stepping switch 431 to step 11 normally releases U2 units 442, 443, 445, and 446 by connecting their common lock-in wire to cut-off bias, via terminals 3b11 and 4b11, to prepare those units for the receipt of new data in the next cycle. [In the event that the step 8 position check caused U2 unit 404 to operate, the removal of the ground connection to wire 439 would defeat this method of release, but in that case, the very removal of the ground connection to the cathode wires of units 442, 443, 445, 446, effects their release.]

After step 11, the stepping switches merely step on to step 1, to complete the cycle, and assuming that switch 435 has been reopened during the cycle, the switches wait at step 1 for the reclosing of switch 435 to initiate a new cycle. If switch 435 is left closed, the cycling continues automatically without interruption.

Attention is called to the fact that the system is so designed that the stepping-switch bank contacts are not called upon to carry currents greater than those required to establish proper biases on the grids of vacuum tubes, and that no inductive loads are broken through said contacts. Contact troubles should, therefore, be at a minimum.

Means by which primary quantities are introduced into the system and conveyed to the drive units of the calculator unit having now been described, attention will next be directed to the calculator itself, with its drives and projection system.

Polar calculator and associated units

Fig. 17 is a partial schematic and side-elevational view of a calculator unit, with associated drive units and projection system, mounted on a stationary base 501. The purpose of the apparatus is to indicate, by projecting a small light spot onto a chart 503, the chart-position P of a target, as determined by polar-coordinate measurements introduced into the reader units 400 and 401 of Fig. 16.

The chart 503 appears only as a trace line, since its plane is assumed to be perpendicular to the principle axis 502 of the calculator unit. The origin of the polar-coordinate system in the calculator unit itself lies on the axis 502. As the origin of polar coordinates for the chart system may not coincide with the intersection of axis 502 with the chart, means for displacing the chart-system polar-coordinate origin O to any desired position, within limits, is provided. The geometry of said means is shown in Fig. 17, where $r$ (assumed to be vertical, for the moment) represents the radius-vector coordinate in the calculator (measured from the calculator-system polar-coordinate origin $o$), and R (also assumed vertical) represents the radius-vector coordinate on the chart (measured from chart origin O). The axis 504 of the projection system connects the outer tips of the radius vectors $r$ and R and intersects the line 505 (extending between the origins $o$ and O) at the center of a universal pivot 511.

Note.—In Fig. 17, line 505, origins $o$ and O, and radius vectors $r$ and R are purely geometrical elements that have been introduced to demonstrate the principles upon which the projection system is based, and said elements have no physical reality in the apparatus. The chart position P is, however, actually indicated in practice by a light spot that is projected onto the chart in a manner to be described later.

If the position of the calculator origin $o$ is held fixed, it is seen that moving the center of universal pivot 511 in any direction in a plane perpendicular to axis 502 will lead to directly proportional movements of chart origin O, while, because of the similar-triangle relationship indicated in the figure, the length and direction of the vector R is left undisturbed. If the distance between the calculator origin o and the plane of motion of the center of universal joint 511 is $h$, and the distance from said plane of motion to the plane of the chart is H, then $R:r=H:h$. In other words $R=rH/h$. [The ratio of the movement of origin O to the movement of the center of pivot 511 is also $H:h$.] The size of $h$ is subject to reasonably arbitrary choice in design, and the size of H is subject to reasonably arbitrary choice in installation, so that the ratio $H/h$ can be varied to make the scale of the projector system's projections conform to the scale of the chart.

A reason for wanting to be able to shift the position of origin O is that in cases (such as those described later in connection with Fig. 30) where the positions of several targets are to be projected onto one chart at the same time, mechanical interferences between projectors may make it impossible to bring calculator-unit axes (such as axis 502) into coincidence with the chart point or points that should serve as the respective origins of chart polar-coordinate systems—remembering that such axes are perpendicular to the plane of the chart.

The geometry of the projection system shown in Fig. 17 is substantially equivalent to that found in the familiar studio camera that has a lens that can be shifted in a plane parallel to the photographic plate. In such an analogy, the object being photographed would correspond to the radius vector $r$, the lens would correspond to pivot 511, the plate would correspond to the chart, and the image of the object that would be projected onto the plate would correspond to the radius vector R. In the camera case, if the "object" remains stationary, the lens can be shifted in a plane parallel to the plate to shift the image of the object about on the plate without changing the size or shape of that image. Furthermore, if the object lies entirely in a plane parallel to the plate, any "figure" in the object plane will be projected onto the plate as an exactly similar "figure" (e. g., a circle will be projected as a circle) regardless of the obliquity of the projection. The reason for this is that the two "figures" may then be considered to be formed (in effect) by the respective intersections of two parallel planes with the two oppositely-extending portions of a single cone of rays. If this fact is borne in mind, it should help to clarify the description that follows.

The angular coordinate $\theta$ of the polar-coordinate system is introduced into the calculator unit's projection system via calculator-drive mechanisms (described in detail in other sections of this application) and rotatable member 522. The way in which vector $r$ is carried to its proper polar-coordinate angular setting by an appropriate rotation of member 522 about axis 502 will be set forth later.

The physical means used to adjust the position of universal pivot 511 comprise a primary upright member 512, slidable laterally in a groove in base 501 to obtain lateral displacements of O, and a secondary slide member 513, carried by member 512 and adapted for vertical adjustment thereon to obtain vertical displacements of O. In practice, the proper effective alignment of line 505 can be established by first letting vector $r$ have the value zero (to bring axis 504 into coincidence with line 505, and the light spot at P into coincidence with origin O), and then adjusting the position of pivot 511 until the light spot falls on any suitable point in the chart that may have been preselected to serve as the pole for the associated polar-coordinate system. The adjustment members can be clamped in place, once the desired settings have been made.

The projection system, which serves to transfer the point at the tip of the arrow $r$ to the chart point P, comprises a light-spot-projection unit 514, of substantially conventional design, mounted for universal movement about pivot 511. The housing of projector 514 includes a tubular portion that extends along the optical axis through pivot 511 to form one-half of a telescopic shaft—the other half of said telescoping shaft being member 515, which ends in a universal pivot 516 carried by radius-slide member 521. The center of universal pivot 516 corresponds to the tip of radius vector $r$ in the schematic geometrical diagram, and consequently, the position of member 521 determines the length of $r$, said length being equal to the distance from axis 502 to the center of pivot 516. It is thus seen that movements of member 521 in the direction of $r$ lead to corresponding, directly proportional changes in the length of $r$.

Part of the mechanism which appears in the side elevation of final calculator unit 500 in Fig. 17 is seen in plan in Fig. 20, and the two figures together show the construction of rotatable member 522, in which member 521 is slidably mounted for radial movement relative to axis 502 (i. e., for movements radiating from axis 502 in a plane perpendicular to that axis, whereby to vary the length of vector $r$). Member 522 is mounted on a circular extension 507 of upright 506 (said upright being rigidly attached to base 501) and is adapted for rotation about the axis 502—said rotation being under the control of gear 531, which meshes with the gear portions 523 of member 522. [In practice, additional support means would probably be provided near the right end of member 522, but this support is omitted here, to avoid cluttering the figure.]

Gear 531 is rotatably mounted on, and driven by, shaft 534, said gear and shift being clamped together by clamp device 522, which cooperates with the enlarged end 533 of shaft 534. Clamp 532 can be loosened to permit rotation of gear 531 relative to shaft 534 in the course of establishing a proper "zero position" for member 522 [e. g., the position in which $\theta=0$ in the system of polar coordinates used.]

Alternative means for driving shaft 534 are shown in Figs. 18 and 25. One end of shaft 534 is suitably supported in whichever one of these alternative means is used, the other end of said shaft being journaled for rotation in upright 506.

Radial movements of slide member 521 (relative to axis 502 in a plane perpendicular to that axis) are controlled by longitudinal movements (along axis 502) of another slide member 524 (slidably supported in extension 507) by means of a gear 525 (rotatably mounted on member 522) which engages both a toothed portion of slide member 521 and a round rack [not a worm] that constitutes the right end of slide member 524. From the manner in which the length of $r$ depends upon the position of member 521, and from the manner in which the position of that member depends upon the position of member 524, it can be seen that the length of $r$ will be equal to the extent of the longitudinal displacement of member 524 (to the right, in Fig. 17) from the position occupied by that member when $r=0$. It will be observed that if member 524 is held stationary, member 522 can be rotated about axis 502 to change the direction of radius vector $r$ without changing its length. Such a rotation of $r$ about the origin $o$ (in a plane perpendicular to axis 502, and under the control of calculator-drive mechanisms described later) is used to bring $r$ to its proper $\theta$-angle setting in the polar-coordinate system. It will lead to a corresponding rotation of radius vector R about the origin O (in the plane of the chart), and because of the similar triangle relationship indicated in Fig. 17, the length of R will also remain unaltered.

Alternative means for determining the longitudinal position of member 524 are illustrated in Figs. 19, 20, and 22, the auxiliary calculator unit 570 being used in a base-and-two-angle system to be described later.

Rudimentary calculator-drive mechanism

Figures 18 and 19 illustrate two rudimentary calculator-drive mechanisms which can be used in conjunction with final calculator unit 500 and the electrical system shown in Fig. 16. Calculator-drive unit 540 [Fig. 19] is adapted to actuate slide member 524, and calculator-drive unit 560 [Fig. 18] is adapted to actuate shaft 534, extensions 524′ and 534′ being the particular types of extensions of member 524 and shaft 534 utilized in units 540 and 560, respectively.

In unit 540, two electromagnetic solenoids, 542 and 543 [which, like other solenoids shown in Figs. 18 and 19, appear schematically in Fig. 16], are mounted rigidly on support member 545, which, in turn, is rigidly attached to base 501. Two bars 547 and 548, the righthand ends of which are made of magnetic material, and the lefthand ends of which are slidably supported by support member 546 (which is rigidly attached to base 501), are longitudinally movable in solenoids 542 and 543, respectively. The range of said movements is precisely limited by suitable stop means—for example, through the cooperation of collars attached to the bars with fingers attached to the respectively associated solenoids, as indicated in Figs. 18 and 19.

An intermediate bar 550 is slidably mounted on support member 546, and another intermediate bar 551 is slidably mounted on supports 545 and 546. Cross-bar 552 is pivotally mounted on the extension 524′ of member 524, and cross-bar 553 is pivotally mounted on intermediate bar 550. To simplify the description of units 540 and 560, it will be assumed that, as far as the compound lever system is concerned, all of their cross-bars are pivoted at their effective mid-points, but this is not an essential condition.

A headed, projecting portion of bar 547 passes through a slot near the end of cross-bar 552, and thus, movements of bar 547 are made effective to drive cross-bar 552. In similar fashion, the other end of cross-bar 552 is drivable by intermediate bar 550, and the ends of cross-bar 553 are respectively drivable by bar 548 and intermediate bar 551.

It can now be seen in Fig. 19 that, if intermediate bar 550 is held stationary, a movement equal to half of any longitudinal movement of bar 547 will be imparted to member 524′ via cross-bar 552, and that, if bar 547 and intermediate bar 551 are held stationary, a movement equal to one quarter of any longitudinal movement of bar 548 will be imparted to member 524′ via cross-bar 553, intermediate bar 550, and cross-bar 552.

When no current is flowing in solenoid 542, bar 547 is pulled to the lefthand limit of its movement range by spring means 555, while activation of solenoid 542 moves bar 547 to the righthand limit of its movement range. In an effectively equivalent way, the other solenoid bars shown in Figs. 18 and 19 are moved to one of their limit positions by spring means when no current is flowing in their respectively associated solenoids, and are respectively driven to the other of their limit positions by the [independently controllable] activations of their respectively associated solenoids—the solenoids being powerful enough to overcome the spring pull and drive the mechanism. [The spring means mentioned can assume many effectively equivalent forms, and in the case of a unit as simple as unit 540, it might suffice to replace the springs indicated with a single spring acting on member 524′.]

By virtue of the manner in which code numbers have been related to the operations of units 452, 453, 455, and 456, of Fig. 16, it can be seen that the lefthand and righthand limit positions of bar 547 correspond, respectively, to "0" and "1" in the first digit place of the code number read by reader 400, and that the lefthand and righthand limit positions of bar 548 correspond, respectively, to "0" and "1" in the second digit place of that code number.

In Fig. 16, there is an indication of a method which can be employed to increase the number of digits in the code numbers. In Fig. 19, solenoid 544, with its associated elements, illustrates a way in which a calculator-drive unit can be correspondingly enlarged to cope with such expanded code numbers. In Figs. 16 and 19, the procedure for adding digit places to the effective code numbers is indicated for one digit place only, but it is evident that more digit places could be added by applying the same principle repeatedly.

The functions of the elements associated with solenoid 544 resemble the functions of corresponding parts associated with solenoid 543. The position of cross-bar 554 is determined by the positions of headed, projecting portions of bar 549 and support member 545, which, respectively, pass through slots near the opposite ends of cross-bar 554. Cross-bar 554 is pivotally mounted on intermediate bar 551 at a point half way between said position-determining, projecting portions. Bar 549 is slidable in, and guided by, solenoid 544, the left hand and righthand limit positions of the bar corresponding, respectively, to "0" and "1" in the third digit place of the code number read by reader 400.

For the purposes of this presentation, assume that the strokes of each of the solenoids shown in Figs. 18 and 19 is limited to exactly .8 inch, and tentatively assume that bar 549 remains stationary in its "0" position. Then, insofar as the first two digit places of the code number for unit 540 are concerned, the receipt of "00" by calculator-drive unit 470 would leave member 524′ in its farthest left position, while the receipt of "01," "10," or "11," would cause member 524′ to be positioned .2″, .4″, or .6″, respectively, to the right of its "00" position. In this way [within the limits of accuracy obtainable with two binary digit places], the movements of member 524′ to the right of its initial position have been made to correspond to counterclockwise angular movements of the pointer arm of reader unit 400 from the zero position of said pointer, and thus, unit 540 is capable of decoding the code number originally set up in reader unit 400. [Note that if no more than two digit places are to be used, intermediate bar 551 never moves, and consequently, under those conditions, that bar could be made integral with the support members 545 and 546.]

On expanding unit 540 into a three-digit-place unit, through the inclusion of solenoid 544 and associated mechanism, a movement of bar 549 becomes effective to transmit half as much movement to intermediate bar 551; this movement of bar 551 leads to half as much movement of intermediate bar 550; and this movement of bar 550 leads finally to half as much movement of member 524′ [assuming that the other solenoid bars remain stationary during the process]. Thus, a movement equal to ⅛ of the movement of bar 549 is transmitted to member 524′, and in view of the assumptions already made, a change from "0" to "1" in the third digit place of the code number for unit 540 will cause bar 549 to move .8″ to the right, and this, in turn, will cause member 524′ to move .1″ to the right of any position determined by the first two code-number digits. In this way, member 524′ can be moved to any one of four new coded positions [i. e., .1″, .3″, .5″, or .7″ to the right of the zero position], in addition to the four coded positions previously obtainable through the use of two-digit code numbers. Each digit place that is added to the code number will double the number of possible coded settings and will cut in half the interval between coded positions previously obtainable, provided that the addition is made in accordance with the procedure outlined.

Calculator-drive unit 560 is shown in Fig. 18 as a simple two-digit unit that operates in substantially the same way as unit 540, except for the fact that unit 560 determines the angular, rather than the longitudinal, position of extension 534′ [of shaft 534, Fig. 17]. Relative to its "00" code-number position, intermediate bar 561 is moved downward by an amount equal to ½ of the downward movement of the bar of first-digit-place solenoid 565 from its "0" position, plus ¼ of the downward movement of the bar of second-digit-place solenoid 566 from its "0" position, and the linear movements of intermediate bar 561 are converted into angular movements of shaft 534' through the cooperation of a toothed-rack portion of bar 561 with a gear 563, which gear is rigidly attached to shaft 534'.

The several units indicated in Figs. 16, 17, 18, and 19, form a substantially automatic, cooperative system, in which a coded activation of the $r$ and $\theta$ calculator-drive units [units 540 and 560, respectively] leads to a positioning of a universal pivot 516 [to establish the length and direction, respectively, of radius vector $r$, Fig. 17] in conformity with the polar-coordinate data originally inserted into readers 400 and 401 [Fig. 16], whereby eventually to cause a light spot to fall on the particular point on chart 503 defined by said data—chart measurements being made at a preselected scale relative to a preselected chart origin and "initial line." [In the apparatus outlined, code-number characteristics, lever arms, movement ranges, the size of gear 563, and the ratio of gears 531 and 523 (shown as 2:1) have been so selected that there is a 1:1 relationship between the respective angular displacements of pointer arm 410 and rotatable member 522 from their respective zero positions, but it is evident that one or more of the factors listed could be modified to obtain other relationships, if desired.]

NOTE.—In the system just described, as well as in the systems to be described later, many of the component parts shown in the figures have been positioned more or less in accordance with pictorial dictates, and are not necessarily in proper operating adjustment. For the same reason, the positions of the switches in the wiring diagrams may not always correspond to the illustrated positions of the mechanical parts, but it is believed that all essential relationships can be perceived readily.

It will be appreciated that the system shown in Figs. 16–19 is probably too limited, as it stands, to have great utility for most practical purposes, but that the system can be expanded, in accordance with the procedure disclosed, to meet a wide range of requirements. Any one skilled in th eart should be able to make the alternations necessary to permit the use of ordinary telephone lines to interconnect the remote and home stations, or to effect a substitution of reader units of the form described in connection with Figs. 4–10 for readers 400 and 401, if such alternations should prove advantageous for certain applications.

In installations where it is feasible to have a separate circuit extending from the reader unit to the associated calculator-drive unit for each code-number digit place, it would be possible to use direct current and to omit the stepping switches and many of the associated units shown in Fig. 16, and thus effect a very great simplification. Furthermore, in some cases, air or hydraulic lines, mechanical linkages, or other equivalent connecting means, can be substituted for the individual digit-place circuits just mentioned, without departing from the broad principles of my invention.

Again, pulley systems, or other types of accumulating-drive devices adapted to decode the code number employed, can be substituted for calculator-drive units 540 and 560, within the scope of my invention. One form of suitable substitute calculator-drive, comprising a hydraulic system and planetary gearing, will be described in connection with Figs. 23–27.

Base-and-two-bearing-angle system

When the primary quantities introduced into the reader units are directly proportional to the respective polar coordinates of the point P which is to be projected on to chart 503 [Fig. 17], comparatively simple calculator-drive units, such as units 540 and 560, can be directly connected to a final calculator unit, such as unit 500. The system can, however, be modified to permit the use of other forms of primary quantities, and a modified system, in which an auxiliary calculator unit is employed, will now be described.

NOTE.—To simplify the following description, it will be assumed that chart 503 is a conventional map, representing, to scale, an imaginary ["horizontal"] plane in object space, onto which the positions of object points are perpendicularly projected. [In developing the theory for the auxiliary calculator unit, the word "projected" will connote purely theoretical, geometrical operations, except in the case of the real light-spot projector.] It will be understood that angles and distances are measured in said plane, or [to scale] in its effective representations [e. g., the "distance" between two object points will be considered to be mapping distance between these points, or, in other words, the projection onto said plane of the actual distance between those points]. It will also be assumed that second-order correction terms, allowing for curvature of the earth, can be neglected without serious error in the comparatively small region covered by the map. It is not my intention, however, to restrict the use of my invention to the particular application which will be described, or to limit my invention by the particular assumptions here made for descriptive purposes.

Suppose that a target is observed from each of two separated observation stations, and suppose that the [projected] bearing angles, measured from [the projection of] a straight line passing through both of said stations to the [projections of] lines of sight extending from said stations to said targets, are $\theta$ and $\phi$, respectively. Then, if the actual [projected] distance between the observation stations is known, and if both angular observations are made at the same time [if the target is moving], the actual [projected] location of the target [at the time of observation] relative to those stations can be determined by solving the triangle shown in Fig. 21, where B' represents the base, or actual [projected] distance between observation stations, O' represents the [projected] pole station, P' represents the [projected] position of the target, R' represents the actual distance [in the projection] from O' to P', and $\beta$ is [the projection of] the angle between the lines of sight. Thus:

(E1) $\qquad R'=|[B' \sin \phi]/[\sin \beta]|$ where $\beta=\phi-\theta$.

Let $S$ $[=R'/R]$ be the ratio of actual [projected] distances to chart representations of those distances [at the scale of the chart]; let $B=B'/S$; let $r=Rh/H$ [see Fig. 17]; and let $b=Bh/H$. Then, substitution into (E1) yields:

(E2) $\qquad R=|[B \sin \phi]/[\sin \beta]|$ and (E3) $\qquad r=|[b \sin \phi]/[\sin \beta]|$ where $b=B'h/HS$.

Ordinarily, $h$ is a constant determined in the design of the apparatus, and B', H, and S, are alterable constants, which are prechosen to meet a particular set of conditions. Consequently, $b$ may be considered to be a prechosen constant, and $r$ then becomes a function of the two variables $\phi$ and $\beta$ [or $\phi$ and $\theta$, since $\beta=\phi-\theta$].

Auxiliary calculator unit

The substantially automatic means which I have devised for solving a triangle similar to that shown in Fig. 21 includes the auxiliary calculator unit 570, shown in plan view in Fig. 20. Extension 524'', the lefthand end of which is slidably supported by fixed support member 508, is one of the alternative extensions of slide member 524, and serves as the operative connection between final calculator unit 500 and auxiliary calculator unit 570. Unit 570 is driven, via shaft extensions 593' and 594' [see Figs. 25–26], by calculator-drive units 601 and 602 (primarily described in the section headed "Hydraulic, planetary-gear-type drive units," and in other related sections, in connection with Figs. 23-29).

The longitudinal position of member 524" is determined by the setting of cylinder cam 571 through the cooperation of cam track 572 with a cam follower roller 526 that is rotatably mounted on a stud rigidly affixed to member 524". [It is to be understood that slide member 524 can be equipped with suitable means for preventing its rotation about its longitudinal axis, and for the purposes of this description, the slide portion of extension 524" will be considered to be rectangular.]

Cam 571 is mounted on, and rotatable relative to, shaft 574, which shaft is journaled in upright 506 and in ears extending from fixed support member 509. After making initial adjustments, which will be explained later, cam 571 may be clamped to shaft 574 by means of the cooperation of clamp device 573 with a flanged portion 575 of the shaft. Cam track 572 is so developed that (E4) $\quad \alpha = k \log r$

[$=k(\log b + \log \sin \phi - \log \sin \beta)$, see (E3)] where $\alpha$ is the angular displacement [measured counterclockwise, as viewed from the left in Fig. 20] of cam 571 from the position of said cam at which the value of $r$ is unity; where $r$ is numerically equal to the length of radius vector $r$ [Fig. 17], and consequently, to the longitudinal displacement of member 524" from the position in which $r=0$; and where $k$ is a constant of proportionality; the sizes of $k$ and the unit for $r$ being subject to choice in design.

In view of the relationship between $r$ and axial displacements of member 524", it follows that track 572 on cam 571 can be produced by conventional procedures through the use of pairs of values of $\alpha$ and $r$ obtained by making numerical substitutions directly into Equation (E4), after selecting a suitable value for the arbitrary constant $k$. For purposes of illustration, suppose that the cam blank is supported on an ordinary dividing head that is mounted on the movable table of a milling machine, with the axis of rotation of the head parallel to the direction of movement of the table. Then a suitable end mill, with its axis of rotation perpendicular to (and intersecting) the axis of the head, could sweep out the cam track, if the table were advanced by amounts directly proportional to $r$ at the same time that the head was turned through angles directly proportional to $\alpha$. (To avoid the introduction of small errors, the foregoing procedure would, of course, be somewhat modified in actual practice.)

In (E4), $k \log b$ becomes a constant term as soon as a suitable preselected value has been assigned to $b$, so that, in normal operation, $\alpha$ may be separated into a constant portion $\alpha'$ and a variable portion $\alpha''$. Then:

(E5) $\quad \alpha = \alpha' + \alpha''$ where (E6) $\quad \alpha' = k \log b$ and (E7) $\quad \alpha'' = k \log \sin \phi - k \log \sin \beta$ When $b=1$ [the unit for $b$ having the same size as the unit selected for $r$], $\alpha'=0$, and $\alpha=\alpha''$; then $\alpha=\alpha'=\alpha''=0$ when $r=1$; thus determining the zero reference conditions for these quantities.

Let $\alpha'$ represent the angular displacement of cam 571 relative to shaft 574 [measured from the zero reference relative position, the positive direction being the same as the positive direction for $\alpha$]. Then $\alpha''$ becomes the angular displacement of shaft 574 from its zero reference position [the positive direction being the same as the positive direction for $\alpha$]. Thus, angular adjustments of cam 571 relative to shaft 574 can be used to provide for the changes in base length and chart scale [see (E3)] required to meet varying conditions, and to make the portion of the auxiliary calculator unit that is further removed from the final calculator unit independent of the size of $b$. To facilitate the establishment of proper $\alpha'$ settings, graduations on cam 571 may be arranged to cooperate with an index mark device carried by flange 575, as indicated in Fig. 20, and if the spacing of the graduations is to be uniform [to permit the use of a vernier], the constants of the system can be so chosen that an ordinary table of common logarithms can be used as a substantially direct reading table relating base lengths to cam graduation readings.

A gear 576, rigidly attached to shaft 574, engages a toothed-rack portion of slide member 580, which member is slidably supported by ears 517 and 518 of support member 509. Gear 583, rotatably mounted on a stud rigidly attached to member 580, engages toothed-rack portions of two slide members, 581 and 582, that are slidably supported by ears 517 and 518. The movements of slide members 580, 581, and 582 are longitudinal, and for the purposes of this description, the cross sections of slide portions of these members will be considered to be rectangular, to prevent rotations about the members' longitudinal axes. One end of member 582 is offset, to clear shaft 574.

The longitudinal position of member 581 is determined by the setting of disk cam 584 through the cooperation of a cam track 586 (the shape of which will be specified later), cut into the face of the disk, with a cam follower roller that is rotatably mounted on a stud rigidly affixed to member 581, cam 584 being mounted for rotation about the axis of cam shaft 588. Similarly, the longitudinal position of member 582 is determined by the setting of disk cam 585 through the cooperation of its cam track 587 (the shape of which will be specified later) with a cam follower roller rotatably mounted on a stud rigidly affixed to member 582, cam 585 being mounted for rotation about the axis of cam shaft 594' (which is one alternative extension of shaft 594). [See Figs. 25-26, 22.] Cams 584 and 585 are respectively caused to turn to positions determined by the magnitudes of $\beta$ and $\phi$ by means, and in a manner, that will be described later.

By inspection of Fig. 20 it can be seen that a movement equal in magnitude to half of the sum of the movements of members 581 and 582 will be transmitted to member 580, via gear 583, and that the movement of member 580 will lead to a directly proportional angular movement of shaft 574, via gear 576. Thus, if $u$ represents the magnitude of the displacement of member 581, as measured positively toward the bottom of the page [in Fig. 20] from the zero reference position which that member occupies when cam 584 is set to the position corresponding to $\beta=\pi/2$ [radians], and if $v$ represents the magnitude of the displacement of member 582, as measured positively toward the top of the page [in Fig. 20] from the zero reference position which member 582 occupies when cam 585 is set to the position corresponding to $\phi=\pi/2$, then:

(E8) $\quad \alpha'' = K(u-v)$ [$=k(\log \sin \phi - \log \sin \beta)$, see (E7)]

Since only the absolute value of $[\sin \phi]/[\sin \beta]$ need be considered [see Equations (E1), (E2), and (E3)], it is permissible to transform (E8) into the following Equation (E9) through application of the handbook formula $\sin A = [\frac{1}{2}(1-\cos 2A)]^{1/2}$ to any concurrent values of $\phi$ and $\beta$ [to simplify the disk cams, reduce their camming angles, and avoid encountering logarithms of negative quantities]:

(E9) $\log \sin \phi - \log \sin \beta =$
$\quad \frac{1}{2} [\log (\frac{1}{2} - \frac{1}{2} \cos 2\phi) - \log (\frac{1}{2} - \frac{1}{2} \cos 2\beta)]$ Cam track 586 is so developed that, in its useful range, (E10) $\quad u = -k [\log (\frac{1}{2} - \frac{1}{2} \cos 2\beta)]/[2K]$ and cam track 587 is so developed that, in its useful range, (E11) $\quad v = -k [\log (\frac{1}{2} - \frac{1}{2} \cos 2\phi)]/[2K]$ where $k$ and $K$ are constants, subject to choice in design. If both $k$ and $K$ are positive, $u$ and $v$ will always be positive quantities, as logarithms of numbers smaller than 1 are negative.

As $\beta$ approaches either 0 or $\pi$, log ($\frac{1}{2}-\frac{1}{2}$ cos $2\beta$) approaches $-\infty$, so that the range of cam track 586 over which Equation (E10) is valid [i. e., the "valid," or useful, range] is limited by cam-size and camming-angle considerations. [Camming angles can be reduced by driving the cam through a variable-speed unit, similar to the type of unit used in obtaining a quick-return motion, but such a device is not necessary, unless $\beta$ comes quite close to one of its critical values, and experience has shown that loss of accuracy through the introduction of an additional unit may offset much of the anticipated gain.]

Through the use of the double-angle transformation (E9), cam 584 can be allowed to turn through one complete revolution as $\beta$ increases from 0 to $\pi$, and as the value of $u$ [see (E10)] is not altered by adding $\pi$ to any $\beta$, increasing $\beta$ from $\pi$ to $2\pi$ merely corresponds to turning the cam through a second revolution. Thus, a one-lobed [rather than a two-lobed] cam track can be used to cover the full angular range.

To permit cam 584 to make a complete revolution without damage to the apparatus, the portions of track 586 in which the camming angles would have been excessive have been cut off, and the corresponding angular range of the cam has been covered by an arbitrary portion of the track formed into a circular arc (concentric with the axis of cam shaft 588) that is joined to the valid track portion by short easement curves. Since $-\beta$ can be substituted for $+\beta$ in Equation (E10) without changing the value of $u$, the cam track has been made symmetrical about the point where $\beta=0$, so that equal angular displacements of the cam in either direction from this point produce equal effects. Note that cam track 586 is then also symmetrical about the point at which $2\beta=\pm\pi$, and as the latter point is in the valid range of the track [rather than in the arbitrary range], it will be taken as the initial reference point of the track and cam, and will correspond to the position occupied by the cam when $u=0$.

If $\beta'=2\beta=$(the polar-coordinate cam-track angle to be used in laying out cam track 586), then, from (E10), the polar coordinate equation of the valid portion of said cam track, with the axis of shaft 588 as the pole, is given by (E12)  Effective radius=
$$g+u=g-k\,[\log\,(\tfrac{1}{2}-\tfrac{1}{2}\cos\beta')]/[12K]$$

where $g$ is the effective minimum radius of the track [i. e., the effective radius when $\beta'=\pm\pi$, and $u=0$].

[In laying out the center line of the cam track, care should be exercised to see that no cusps are formed when the track is given finite width.]

The form of cam track 587 is determined by an analysis that substantially duplicates that just given. If the mechanism is suitably designed, cam track 587 can have the same form as cam track 586. In auxiliary calculator unit 570, cams 584 and 585, with their respective tracks, are duplicates of each other, and the effective opposition of the displacements of associated members 581 and 582 [see (E8)] is obtained by driving said members from opposite sides of the axes of cam shafts 588 and 594', respectively. The initial reference point for cam 585 and track 587 is the point at which $2\phi=\pm\pi$.

Cam shaft 588, which carries cam 584, and to which cam 584 is rigidly attached, is journaled for free rotation in fixed support member 510, and cam shaft [extension] 594', which carries cam 585, and to which cam 585 is rigidly attached, is journaled for free rotation in an ear of support member 509 and in an upright 621 [Figs. 25-26] that is rigidly attached to cap member 620.

Gear 589, which forms part of a planetary unit [Fig. 20], is mounted on, and rigidly attached to, shaft 588. Gear 592, which also forms part of the planetary unit, is mounted on, and rigidly attached to, the alternative extension 593' of shaft 593 [Fig. 25], which shaft is journaled in fixed support members 577 and 578 [rigidly attached to base 501]. The axes of shafts 588 and 593 are in alignment, and gear 596 is mounted for rotation about the common axis of the two shafts, hub portions of gear 596 being journaled in recesses in gears 589 and 592. Gear 590 (which meshes with gear 589) and gear 591 (which meshes with gear 592) are rigidly attached to the opposite ends of a shaft that passes through, and is journaled in, gear 596. Gear 595, which is rigidly attached to shaft 594', meshes with gear 596.

Gear ratios of the three meshing pairs of gears are: gears 589—590, 3:1; gears 591—592, 1:6; and gears 595—596, 1:1. With these ratios, if shaft 593' is turned through $+\theta$ radians, and shaft 594' is turned through $-2\phi$ radians, shaft 588, with cam 584, will have been turned thereby [via the planetary unit and gears 595—596] through $2(\theta-\phi)$ [$=-2\beta$] radians, and cam 585 will have been turned through $-2\phi$ radians. The respective initial reference positions for shafts 593' and 594' will be the positions occupied by those shafts when $2\beta=2\phi=-\pi$, and $u=v=\theta=0$.

From the theory of auxiliary calculator unit 570, which has just been developed, step by step, in connection with the description of the component parts of that unit, it can be seen that unit 570 is capable of solving Equation (E3) by positioning member 524" in accordance with the value of $r$ determined by the magnitudes of $b$, $+\theta$, and $-2\phi$; $b$ being introduced into the unit via a presetting of cam 571 relative to shaft 574, and $+\theta$ and $-2\phi$ being introduced via shafts 593' and 594', respectively. Such a positioning of member 524" will, in turn, normally lead to the establishment of the proper length of radius vector R in the projection onto chart 503.

[Many different, effectively equivalent means for adding mechanical motions together are known in the art, and it is not difficult to make substitutions in, or modifications of, the mechanisms shown in Fig. 20, without departing from the broad principles of my invention. For example, the gear ratios in the planetary unit could be changed, or the whole form of the planetary unit could be altered, while leaving the relationships between the movements of shafts 588, 593', and 594' undisturbed. Again, member 580, which is equally responsive to movements of either of the members 581 or 582 in the illustrated case, could be made unequally responsive by substituting two concentric gears, unequal in diameter and rigidly fastened together, for gear 583 and adapting member 581 to mesh with one gear of the pair of gears and adapting member 582 to mesh with the other, but, as no especial benefit could be discerned in such a structure for the particular application considered, the simpler structure, permitting duplication of cam tracks, was shown in Fig. 20. In a more substantial modification of unit 570, member 580 and gears 576 and 583 could be replaced by a planetary unit associated with shaft 574 (members 581 and 582 then being respectively adapted to drive two of the gears in said unit), without changing the relationship between setting positions of cams 584 and 585 and shaft 574.]

Hydraulic, planetary-gear-type drive units

In the neighborhood of certain settings, comparatively small movements of shafts 593' and 594' will lead to substantial movements of some of the members comprised in auxiliary calculator unit 570, and considerable torque may have to be developed in the shafts mentioned to overcome frictional drag and to drive final calculator unit 500 through unit 570. To meet high torque requirements, while maintaining accuracy of setting, I have devised the hydraulic, planetary-gear-type calculator-drive units now to be described.

Figures 24, 25, and 26 are, respectively, partial end, plan, and side views of calculator-drive units 601 and 602, the former unit being settable in accordance with the magnitude of the variable θ, and the latter in accordance with the magnitude of the variable φ. These units are each composed of several substantially duplicate sub-units, one of which—unit 603—is segregated from the rest [by dashed line enclosures, in Figs. 25 and 26] for detailed study.

NOTE.—To avoid excessive crowding in Figs. 23–26, many parts have been omitted, or shown incompletely. Certain elements, which are actually present in each of the sub-units, are illustrated and described in connection with one of these sub-units, while other elements, which are also present in each sub-unit, are illustrated and described in connection with one or another of the other sub-units. Some parts, which appear in only one or two sub-units, are made the subject of special comment. Except for the section at 24—24, Fig. 24 pictures units 601 and 602 as they would appear on looking to the right at the breaks in Figs. 25 and 26, and shows essential elements of a typical sub-unit [such as sub-unit 603], as well as special single features of units 601 and 602. Since, under the specified conditions, some of the typical parts of sub-unit 603 fall directly behind duplicate parts of another sub-unit, Fig. 24 will serve as an end view of sub-unit 603, as well as of the other sub-unit. In Fig. 24, gears are represented by their pitch lines, and to avoid confusion, gears 627 and 628, which appear in Fig. 26, have been omitted in Fig. 24.

Shaft 594, which forms part of the drive means for unit 570 in one of the alternative forms of my invention, terminates in gear 627, which gear meshes with a gear 628 that is mounted for rotation about axis 626. The gear ratio between gears 628 and 627 is 2:1, so that if gear 628 is rotated through an angle φ, gear 627 and shaft 594 will be rotated through an angle $-2\phi$.

Gear 631, which is the driven member of the planetary unit composed of gears 631, 632, 633, and 634, and planetary arm 630, is also mounted for rotation about axis 626 and is rigidly attached to gear 628 by means of a common hub portion, the unit formed by gears 628 and 631 being provided with projections that are journaled in uprights 621 and 622. Integral with arm 630 is a shaft portion (shown in section) journaled for rotation about axis 626 in uprights 622 and 623. Planetary gears 632 and 633 are rigidly attached to a common shaft, which shaft is carried by, and freely rotatable in, a supporting portion of arm 630. Gear 634 is mounted on the shaft portion of arm 630 for rotation (independent of the rotation of arm 630) about the axis 626. Gear 631 cooperates with gear 632, and gear 633 cooperates with gear 634, these four gears and arm 630 functioning together as a conventional planetary unit.

Gear ratios in the planetary unit are so chosen that a $+180°$ rotation of arm 630 leads to a $+90°$ rotation of gear 631, and a $+180°$ rotation of gear 634 also leads to a $+90°$ rotation of gear 631. [The ratios illustrated are 6:1 for gears 631 and 632, and 1:3 for gears 633 and 634, but other ratios could have been used to obtain equivalent results.] In this way, the rotation of gear 631 is made equal in magnitude to one half of the sum of the [independent] rotations of arm 630 and gear 634 about axis 626.

A planetary unit 640 [for convenient reference, the number applied to the planetary arm of a sub-unit that is substantially functionally equivalent to sub-unit 603 may be used hereinafter to identify the planetary unit in such a sub-unit, or the sub-unit as a whole] is shown at the left of the sub-unit 603 that contains the planetary unit comprising arm 630. The gears in the two planetary units are duplicates of each other—gear 631 in sub-unit 603 corresponding to gear 641 in the adjoining sub-unit. Gears 634 and 641 are rigidly tied together by a common hub portion, so that they turn in unison about axis 626, which axis is the common principal axis of all of the planetary units in calculator-drive unit 602. Thus, the output of unit 640 becomes an input to sub-unit 603, and with gear ratios in unit 640 like those specified for sub-unit 603, a $+180°$ rotation of the 640 arm will lead to a $+45°$ rotation of gear 631.

Calculator-drive unit 602 may contain any desired number of sub-units substantially similar to sub-unit 603, and for purposes of illustration, ten such sub-units are indicated as being present in Fig. 31. These ten sub-units are arranged in cascade, relationships between adjoining sub-units being substantially the same as the relationship between sub-units 603 and 640. A $+180°$ rotation of a planetary arm in any one of these ten sub-units will contribute half as much rotation to gear 631 as a $+180°$ rotation of the preceding arm on the right [in Figs. 25, 26, and 31], and thus a geometrical progression suitable for use in decoding binary code numbers has been established in the mechanical drive system. The breaks in Figs. 25 and 26 indicate the omission of seven sub-units in each of the units 601 and 602.

The series of planetary units is shown as terminating in a unit comprising gear 651 (which is rigidly fastened to the input gear 654 of planetary unit 650 by means of a common hub portion) and a lock member 652 (mounted on upright 653) adapted to engage the teeth of gear 651. With the lock member removed, gear 651 can be turned to establish the proper initial relationship between the setting of gear 631 and the value of the variable φ, and then the lock member can be replaced, to hold gear 651 stationary during subsequent operation of unit 602.

Attention is next directed to the hydraulic means which I employ to drive the planetary units. In sub-unit 603, arm 630 includes a gear portion 635, integral with that arm [see section in Fig. 26], which gear portion is adapted to cooperate with an upper rack portion of plunger 637. [In like manner, arm 640 includes a duplicate gear portion adapted to cooperate with a rack portion of plunger 647, and similarly for the other sub-units. Rollers, like roller 658 of calculator-drive unit 601 (Figs. 24 and 25), can be pivotally mounted on uprights associated with each of the sub-units to maintain close engagement between the arm gears and cooperating plunger racks, if desired, but they have been omitted to avoid unnecessary cluttering of the figures.]

Plunger 637 terminates at its lower end in a piston unit 638 slidable in cylinder 639 in block member 624, which block is rigidly mounted on base 501. Block 624 is surmounted by, and rigidly fastened to, cap member 620, which cap is assumed to be equipped with suitable stuffing-box means [not shown] to permit longitudinal motions of the plunger without excessive leakage of fluid which is forced into the cylinders to drive the pistons.

In addition to heading the ends of cylinder 639, base 501 and cap 620 serve as stops which cooperate with stop portions of piston unit 638 to fix the upper and lower limits of the stroke of plunger 637—the size of gear 635 and the length of said stroke being so chosen that a complete stroke leads to a 180° rotation of arm 630. Except in the cases of plunger 657, in unit 601, and plunger 647, in unit 602, the strokes of all of the plungers (and the [180°] angular throws of the associated planetary arms) in the calculator-drive units are similarly limited.

The piston units of plungers 647 and 657 are not equipped with stop portions [as exemplified on the left of Fig. 24], and the base and caps do not limit the strokes of these two plungers. Instead, the extents of the throws of arms 640 and 655 are determined by means best seen in Figs. 24 and 25. The means which I employ in these two cases are effectively equivalent [one being the mirror image of the other], so that the following description of the means associated with arm 655 will suffice to illustrate the construction and mode of operation of both means.

A spring-stop member 656 is mounted on upright 613—the heads of adjusting screws at the ends of the spring acting in conjunction with a projecting portion of upright 613 (near the middle of the spring) to tension the spring like an archer's bow. The ends of the spring are slotted to fit around the bodies of the adjusting screws and to permit the ends of the spring to be forced down away from the adjusting-screw heads in the event of the application of sufficient force. Spring 656 is so positioned that its ends will be struck by the projecting portion of arm 655 (which carries the shaft of the planetary gears) at either end of the desired 180° angular range of motion of the arm, and the spring is so designed that the force it exerts against the head of each adjustment screw is more than enough to rotate the arm in opposition to the arm's normal driving force.

The adjustment screws mentioned can be set to establish the terminal positions of the arm with high precision, and thus the normal net 180° travel of the arm can be determined by means of this resilient mechanism with an accuracy approaching that which could be obtained with solid stops. Spring stops of this type act somewhat like safety valves for the entire calculator and calculator-drive system, since they tend to limit the maximum stresses that can be developed when moving parts are suddenly brought to rest by stop means. It should be noted that, as the planetary units are able to drive through each other, it is not necessary to equip each separate sub-unit with spring stops of its own, and consequently, only one sub-unit in each of the calculator-drive units 601 and 602 is so equipped.

Fluid distribution and valving system

Since hydraulic systems for supplying fluid to means comprising hydraulic cylinder-and-piston drive units under the control of electrically-operated valves are well known in the art, the figures contain no detailed showing of an external pump, reservoir, accumulator, or connecting piping, but suitable source and sink means for supplying and exhausting hydraulic fluid are assumed to be present. [The "fluid" could be a gas for some applications, but then care would have to be exercised in designing the unit to see that motions did not become too violent.]

Circles 606 and 607 [Fig. 24] represent (the entrance ports to) inlet passageways for oil under appropriately high pressure, and boxes 609 represent, symbolically, sources of such oil. Circles 605 and 608 represent (the exhaust ports for) outlet passageways for oil under appropriately low pressure. Passageways 605 and 606 extend horizontally some distance into base 501 and then turn upward until they reach block 614, where they respectively open into passageways 665 and 666 [see Fig. 23] in block 614. [Figure 23 is an enlarged and "stretched" fragmentary side detail view of part of calculator-drive unit 601, which will be used to indicate hydraulic passageway and valving features of the hydraulic-drive system. Block 614 and cover 615, which appear in end view in Fig. 24, are shown in Fig. 23 as they would appear if viewed from the right in Fig. 24, after being stretched and broken away.] After ascending short distances in block 614, passageways 665 and 666 turn to the right [of Fig. 24] and continue until they form openings in the face of the block.

NOTE.—Except for provision for an additional sub-unit in calculator-drive unit 601, the hydraulic systems in units 601 and 602, including the valve-control mechanisms therefor, are substantially mirror images of each other, so that descriptions of particular features in either unit will serve for both units, and words such as "typical units" are to be construed broadly enough to include mirror-image constructions. It is assumed, of course, that appropriate parts of units 601 and 602 are held together tightly by bolts, or otherwise, and that suitable gaskets may be introduced (if found necessary) at certain joints to prevent oil leakage, but to avoid confusion, these conventional elements have been omitted in the figures.

A recessed cover 615, shown broken away along a surface oblique to the plane of the paper in Fig. 23, extends along, and is rigidly fastened to block 614. Passageway 665 opens into recess 661, so that that recess becomes a discharge duct for low-pressure oil, and passageway 666 opens into recess 662, to make recess 662 a duct for high-pressure oil—the lefthand ends of the recesses [not shown] being suitably enclosed to prevent any undesired escape of oil.

In unit 602, passageways 607 and 608, block 624, cover 625, and recesses 663 and 664 correspond, respectively, to passageways 606 and 605, block 614, cover 615, and recesses 661 and 662 of unit 601.

In both units 601 and 602, greatest plunger force requirements will normally be encountered at the calculator ends ["front" ends] of the calculator-drive units, as the activations of sub-units near the front of the calculator-drive units lead to major changes in calculator cam settings, while activations of sub-units farther to the rear lead to progressively smaller and smaller changes in calculator cam settings. To reduce the amount of high-pressure oil required to operate the drive units, the rear cylinders and pistons can be made smaller in diameter than those near the front, but for simplicity, this refinement is not shown in the figures. Since the forward cylinders have the greatest need for high-pressure oil, the oil-connection openings into the recesses in the covers 615 and 625 have been placed near the fronts of the calculator-drive units.

[It is worth noting that accuracy requirements also decrease rapidly on progressing from the front to the rear of the calculator-drive units, so that only the first three or four sub-units, near the fronts of each of the calculator-drive units, need to receive special consideration from the point of view of precision and stress.]

The "oil circuits" of the calculator-drive units 601 and 602 comprise, in addition to portions of the primary oil-distributing systems which have just been described, a plurality of secondary oil-distributing systems, respectively associated with the several major sub-units of those calculator-drive units. Each of these secondary systems comprises a plurality of holes and recesses in one or the other of the blocks 614 or 624, and includes valve means which may be operated to establish coded connections between the primary high-pressure and low-pressure oil ducts and the appropriate ends of the associated sub-unit cylinder. Holes and recesses in block 614 are sealed off (where desired) on the top by cap 610, and on the bottom by base 501, so that certain block recesses are thus converted into closed passageways. This same sealing-off also makes it unnecessary to plug the unused ends of certain holes. Cap 620 and base 501 perform similar functions in cooperation with block 624.

Each of the valve means mentioned in the preceding paragraph comprises a cap and shaft portion [for example, see valve 682, at the right of Fig. 24], an arm portion [e. g., arm 683], and a spring member [e. g., spring 684]. Each valve cap is seated on a side face of the block with which it is associated, and the cap's shaft portion projects through, and is journaled for rotation in, said associated block, the axis of the shaft portion being perpendicular to the face of the block. The valve's arm is rigidly affixed to the protruding end of the shaft portion on the side of the block opposite to that upon which the cap is seated, and the valve's spring member is inserted between the arm and the adjacent side face of the block, to cause the cap to be pressed tightly against the opposite side face of the block. The cap, shaft, and arm portions of each valve are rotatable in unison to either one of two predetermined positions, the setting being determined by the code-number digit, "0" or "1," received by associated means to be described later.

The design and functions of the secondary oil-distributing systems and associated valve caps will now be described in connection with Fig. 23. In the typical secondary system, shown at the left of that figure, the upper end of cylinder 659 is connected to the upper end of a hole 672 by means of a recess 671 in block 614. Hole 672 is L-shaped, comprising a vertical portion, drilled into the top of the block, and a connecting horizontal portion, drilled into the near side of the block. [It may be helpful to note the comparable (mirror image) block 624 detail shown in the end-view cross section at the right of Fig. 24.]

A shallow recess 674 is "spotted" into the side of block 614, and with the cap of valve 670 in the "0" code-number digit position in which it is shown, connection is established between recess 674 and the lower end of hole 672 by means of a small recess 673 in said cap. Recess 674 does not extend far enough into the block to connect with cylinder 659. By comparison with the duplicate secondary system and valve cap at the right of Fig. 23, it can be seen that the righthand side of block recess 674 opens into cover recess 661, it being understood that cover 615, with its recesses, actually extends over all of the secondary systems and valve caps associated with the cylinders of block 614. Thus, oil from the upper part of cylinder 659 can pass through block recess 671, block hole 672, valve cap recess 673, and block recess 674 into the discharge recess 661 in cover 615, and thence through block passageway 665 and passageway 605 [see Fig. 24] in base 501 to the main discharge port.

The lower end of cylinder 659 is connected to the lower end of hole 676 by means of a recess 675 in block 614. Like hole 672, hole 676 comprises a vertical portion, in this case drilled into the bottom of block 614, and a connecting horizontal portion, drilled into the side of the block. Hole 678 resembles hole 676, but includes a second horizontal portion (comprising hole 678', drilled into the side of the block), which opens into the high-pressure oil recess 662 of cover 615. With valve cap 670 in its "0" position, the upper ends of holes 676 and 678 are connected by means of a second small recess 677 in the cap of valve 670. Thus, oil from the main high-pressure source can traverse passageway 606 in base 501 [see Fig. 24] and block passageway 666 to reach cover recess 662 [see Figs. 23 and 24], and from that recess, oil can flow through block holes 678'—678, valve-cap recess 677, block hole 676, and block recess 675, to reach the lower end of cylinder 659 and push plunger 657 upward.

The hole system 679—679' in the upper portion of block 614 is the counterpart of the hole system 678—678' in the lower portion of the block. With the cap of valve 670 in the position shown in Fig. 23, the lower horizontal end of hole 679 is sealed off by the valve cap, but it can be seen that a small counterclockwise rotation of the valve cap (i. e., from its "0" code-number digit position to its "1" position) will move recess 673 to a position where it interconnects holes 672 and 679, after first breaking the former connection between hole 672 and recess 674. Such a rotation of said cap will, at the same time, first break the connection between holes 676 and 678, and then establish a connection between hole 676 and recess 674. [The cap of valve 681, at the right of Fig. 23, is illustrated in its "1" code-number digit position.]

The upper horizontal branch 679' of hole 679 opens into the high-pressure oil recess 662 in cover 615, so that after the cap of valve 670 has been rotated to its "1" position, the upper end of cylinder 659 is connected to the high-pressure oil supply, and the lower end of that cylinder is connected to the discharge recess 661. A small rotation of valve 670 is thus utilized to reverse the thrust of the oil on the piston attached to plunger 657—the plunger being forced up when the valve is in its "0" position, and being forced down after the valve has been rotated to its "1" position. [In designing the valve, care should be taken to see that recesses 673 and 677 never pass through positions where they furnish direct connections between recess 674 and holes 678 or 679. Studies of cavitation effects (which have not yet been made) may demonstrate the advisability of streamlining the passageways and of making them less tortuous.]

Oil circuits, formed as described, lend themselves to exceedingly compact designs. Aside from initial couplings, and the general hydraulic supply system external to base 501, the oil circuits of the hydraulic system are made up entirely of holes and recesses in base 501, blocks 614 and 624, covers 615 and 625, and the several valve caps—certain other members, such as caps 610 and 620, and the plunger-and-piston units, serving to terminate, or complete the enclosure of, certain passageways. Most of the holes and recesses require little accuracy, and no tapping, and some of the recesses might even be cast into the appropriate members. Many of the holes can be formed by simple drill-press operations, and because of the presence of many duplicate sub-units in each calculator-drive unit, quantity production can be facilitated through the use of gang drilling.

Should holes, such as holes 605 and 606 in base 501, prove to be too deep for practical drilling, equivalent passageways could be formed by milling, or casting, grooves into the top of base 501, drilling short holes into the end of base 501 to connect with said grooves [to give the same end view of base 501 as that shown in Fig. 24], and completing the enclosure of said passageways by interposing a thin sheet of suitable material between base 501 and block 614—said sheet including holes matching holes 665 and 666.

Through the use of the special hydraulic system that has been described, many tapped holes and connecting pipes (that would be required to interconnect the numerous separate cylinder and valve units of a system of more conventional design, employing standard fittings) have been eliminated. A small amount of leakage past the pistons, at the valve caps, or between passageways, can be tolerated, as the oil thus lost merely flows out through the discharge duct, and unless leakage is great enough to reduce oil pressure, the operation of the mechanism is substantially unaffected thereby.

Hydraulic valve-setting mechanism

The mechanical portion of the mechanism used to control the setting of a typical valve is best seen in Figs. 24 and 26, where rocker 687 is shown mounted for free rotation on a shaft 686 between two collars that are rigidly affixed to said shaft. Rocker 687 is fitted with a roller at its upper end, which roller cooperates with a channel member 688 to limit the extent of rotation of the rocker. The rocker is designed to be somewhat top-heavy, so that if it is tipped either way from a vertical position, it will tend to remain in the position to which it has been tipped.

Shaft 686 is slidably carried by support member 685 [Fig. 26] and shaft-actuating unit 718' [which appears in schematic form in the figures] for limited movement in the direction of the axis of the shaft—said support member and shaft-actuating unit being rigidly attached to block 624.

Any one of a number of different conventional types of shaft-actuating devices could be used to move shaft 686, but since the force required may be quite large, and since a source of hydraulic power is close at hand, I prefer to employ electrically-controlled hydraulic means. Unit 718' comprises an ordinary hydraulic cylinder-and-piston unit and a cooperating, conventional, electrically-operable, magnet-and-valve control unit therefor [see also Fig. 27], together with suitable hydraulic connections [not shown], including connections to the hydraulic power-supply system. The control unit, which includes spring-return means 719' (shown in the partially schematic representation of the control unit in Fig. 27), is so arranged that, when current is supplied to the magnet, opposition of said spring means is overcome to set the valve in a position which leads to the driving of shaft 686 to the right [Fig. 26] to the limit of its stroke (as predetermined by appropriate limit stop means), and when current is cut off from the magnet, said spring means returns the valve to its initial position, which leads to a driving of the shaft to the left to the limit of its stroke.

Rocker 687 cooperates with a unit [see Fig. 24] comprising a clapper magnet 711′, and L-shaped mounting member 690, a clapper 691, and a clapper spring 692. [A showing of this unit has been omitted from Figs. 25 and 26 to avoid the necessity of including many confusing lines, but equivalent plan and elevation views of a duplicate unit appear at the lefthand end of those figures, and it is believed that the mode of operation of the unit can be understood readily from the showing in Fig. 24.] Member 690 and clapper 691 are made of soft iron, or other suitable magnetic material, while spring 692 is (preferably) made of nonmagnetic material.

Clapper 691 is pivotally supported at its right end [Fig. 24] by member 690. One end of the generally U-shaped clapper spring 692 is rigidly attached to said clapper, and the other end of said spring rests on the upper end of the core piece of magnet 711′—the spring serving to hold the clapper a little distance away from the core when the magnet is not activated. Conventional stop means is incorporated into the hinge means to keep the clapper from rising too high. A small bent piece is rigidly attached to rocker 687 to constitute rocker ear 687′. This ear, and spring 692, are so proportioned that there will be a slight clearance between the ear and the spring when no current is flowing in magnet 711′ and rocker 687 has been rotated counterclockwise to the limit of its travel [the position here specified being shown in mirror image at the left of Fig. 24 in connection with the unit containing magnet 711].

As soon as magnet 711′ is activated, clapper 691 is pulled down, and unless rocker 687 is already in the position shown in Fig. 24, a portion of spring 692 under the round of the U comes into contact with ear 687′ to cause rocker 687 to turn clockwise until the roller at the top of the rocker is stopped by the righthand side of channel member 688. When the current supply to magnet 711′ is cut off, clapper 691, with its spring, returns to its initial position, but the rocker remains in the position to which it was tipped by the action of the magnet.

Valve alarm 683 is provided with upper and lower rollers, which project to the right in Fig. 24. It can be seen that, with rocker 687 in the Fig. 24 position, an appropriate motion of shaft 686 along its axis would bring the rocker into contact with the lower roller of valve arm 683, while leaving clearance between the rocker and the upper roller of that valve arm. On the other hand, if rocker 687 had been rotated counterclockwise to its other limit of tip, the motion of shaft 686 mentioned would have brought rocker 687 into contact with the upper roller of valve arm 683, while leaving clearance between the rocker and the lower roller of that arm. Thus, as seen in Fig. 26, regardless of which of its two normal setting positions valve (682)—683 may occupy initially, if the upper end of rocker 687 is tipped away from the observer, a movement of shaft 686 to its righthand limit position will force said valve to occupy the particular setting position shown, whereas, if the upper end of rocker 687 is tipped toward the observer, an equivalent movement of shaft 686 will force said valve to occupy the other of its setting positions [i. e., the position occupied when the valve is turned through a limited counterclockwise angle from the position shown in Fig. 26].

The particular setting position of a rocker that can be utilized (as just described) to set the associated valve to its "0" position is termed the "0" position of the rocker, and the rocker position [obtained through the action of the associated clapper magnet] that can be utilized to set the associated valve to its "1" position is termed the "1" position of the rocker. The means used to set rockers to their "0" positions will be described later, under the heading "'Zeroizing' mechanisms."

Channel member 688 is equipped with a central, longitudinal, interrupted septum—the gaps in the septum being so placed that the rockers of calculator-drive unit 602 are free to tip back and forth when shaft 686 is in its extreme lefthand [Fig. 26] position, whereas the rockers are restrained from changing their respective angles of tip when shaft 686 is moved to the right [Fig. 26]. Thus, full and positive engagement between the rockers and the valve-arm rollers is insured, and the danger of jamming avoided.

Substantial duplicates of the valve and control means described (in either direct or mirror arrangement) are associated, respectively, with each of the calculator-drive sub-unit cylinders in each of the calculator-drive units 601 and 602. Shaft-actuating unit 718 [in unit 601, Fig. 25], and the valve-control mechanisms associated therewith, substantially duplicate (in mirror image) the corresponding parts in unit 602—except for provision for one additional calculator-drive sub-unit. Note that valve-setting mechanisms like those just described can be used to turn any reasonable number of valves simultaneously to coded positions determined by the coded settings of respectively associated rockers. To eliminate the possibility of catching clapper springs behind rocker ears as a result of longitudinal rocker shaft movements, said springs are so designed and placed that some portion of each spring always overlaps some portion of its associated rocker ear, regardless of the position of the rocker shaft.

Differences between calculator-drive units

Calculator-drive unit 601, as a whole, is largely a mirror image duplicate of units 602—corresponding sub-units of the two units appearing opposite each other in Fig. 25—but in the particular alternative form of my invention illustrated in Figs. 20, 24–26, the means used to establish operative connection between units 570 and 601 differs somewhat from the means used to establish operative connection between the units 570 and 602, and unit 601 includes an additional duplicate planetary unit 644 (in series with the others), the output gear 645 of which is rigidly attached to alternative extension 534″ of shaft 534 to establish a direct operative connection between units 500 and 601. The several principal sub-units of unit 601 are also operated in substantially the same way as the principal sub-units of unit 602—bearing in mind the specific differences noted, the mirror-image reversals present, and the fact that, in the alternative form shown, unit 601 is related to the independent variable $\theta$, whereas unit 602 is related to the independent variable $\phi$. Consequently, no descriptions of the hydraulic system and control mechanisms specifically associated with unit 601 need be given, since they would be substantial repetitions of the descriptions of the system and mechanisms specifically associated with unit 602.

Shaft 593, which forms part of the drive means for unit 570 [in the base-and-two-bearing-angle system now being considered], is rigidly attached to gear 617 [indicated by its pitch line in Fig. 24, and shown partly broken away in Fig. 25], which gear meshes with a gear 618 that is rigidly coupled to, and rotates with, output gear 619 [Fig. 25] of planetary unit 660. The gear ratio between gears 617 and 618 is 1:1, so that if gear 618 is rotated through an angle $-\theta$, gear 617 will be rotated through an angle $+\theta$. [Compare the description of the means used to drive shaft 594, starting a few paragraphs subsequent to the heading "Hydraulic, planetary-gear-type drive units."]

The shifting of the planetary arm of sub-unit 644 from its "0" code-number-digit position to its "1" position [the latter position being illustrated in Figs. 25–26] normally turns gear 645 through $-\pi/2$ radians, and through the mechanism previously described, member 522 [Fig. 17] is thereby caused to rotate through an angle of $+\pi$ radians—assuming gear 619 [Fig. 25] to be stationary during the operation. Thus, in view of the geometrical-progression properties of the series of planetary sub-units of unit 601, all settings of member 522 for 1st- and 2nd-quadrant values of $\theta$ [Fig. 21] will be obtained—with sub-unit 644 in its "0" position—through the use of the other sub-units of unit 601, while all settings of member 522 for 3rd- and 4th-quadrant values of $\theta$ will be similarly obtained with sub-unit 644 in its "1" position.

In practice [see Figs. 21 and 31]: if $0<\theta<\pi$, then $0<\phi<\pi$; and if $\pi<\theta<2\pi$, then $\pi<\phi<2\pi$. Furthermore, since $\beta=\phi-\theta$, Equation (E3), in view of (E9), shows that if $\pm\pi$ radians are added to both $\theta$ and $\phi$ simultaneously, the absolute value of $r$ is left unaffected. Consequently, while the full angle $\theta$ must be utilized in unit 601 to determine the direction of the radius vector $r$ in unit 500 [Fig. 17], the first major divisions of both the $\theta$ and $\phi$ circular ranges [i. e., the divisions of the respective circles into halves] can be simultaneously ignored in providing the necessary drives for the auxiliary calculator unit 570 [Fig. 20], which determines the length of vector $r$. It is thus possible to use the construction shown to eliminate the $\phi$-drive [unit 602] sub-unit that would have corresponded to sub-unit 644 in unit 601, and at the same time avoid the necessity of driving each of the disk cams of unit 570 through a useless extra revolution [that would lead to delay, and increased mechanical wear and tear] in dealing with 3rd- and 4th-quadrant angles.

"Zeroizing" mechanisms

Prior to the coded activations of the clapper magnets in each valve-setting cycle, the rockers are simultaneously "zeroized" by means that will now be described. Except for the slight modification required to allow for the extra sub-unit in unit 601, the zeroizing mechanisms respectively associated with units 601 and 602 are mirror-image duplicates of each other, so that a description of features in either of the units will suffice for both. Both zeroizing mechanisms are represented in Fig. 24, while a partially broken away side view of the mechanism associated with unit 602 appears in Fig. 26.

In unit 602, shaft 693 is journaled for rotation about its axis in uprights 623 and 653. Spring fingers, such as finger 694, are spaced along, and rigidly fastened to, shaft 693—one finger being associated with each rocker. A weight 695, made of soft iron, or other suitable magnetic material, is also rigidly attached to shaft 693—the action of gravity upon said weight serving to rotate said shaft in a counterclockwise [Fig. 24] direction (when magnet 708' is not activated) until the motion is arrested by the stop indicated.

A zeroizing magnet 708' is permanently mounted on upright 623. Upon activation, magnet 708' attracts weight 695 and rotates shaft 693 in a clockwise direction, and provided that the rockers of unit 602 are in positions opposite the gaps in the central septum of channel member 688 [as would normally be the case], such a rotation of said shaft will drive the fingers against the rockers and push the upper ends of the rockers to the left [Fig. 24], leaving all of said rockers tipped to the left, no matter how they were tipped before. [To avoid any chance of catching the fingers behind the rockers when the rocker shaft 686 moves longitudinally, the lower ends of the fingers are widened, and the fingers are so placed that some portion of each finger always overlaps some portion of its associated rocker, regardless of the position of the rocker shaft.] When current is cut off from magnet 708', the fingers return to their initial [Fig. 24] positions, in which positions there is always clearance between the rockers and the fingers [i. e., even when the rockers are tipped as far as possible toward the fingers].

Mirror-image zeroizing movements, under the control of magnet 708, are executed in unit 601 by means substantially equivalent to those just described in connection with unit 602. Circuits for magnets 708 and 708' are illustrated in Fig. 27, and the way in which said magnets are activated will be described later. The term "zeroizing" is applied to these movements because activation of the zeroizing magnets tips all of the rockers to their "0" positions. All of the hydraulic plungers would be driven up, if the rocker-shaft-actuating units were activated with all of the rockers zeroized, and the several planetary arms would reach their normal "0" positions when the associated plungers reached the upper limits of their strokes.

In normal operation, the rockers are first zeroized [i. e., left in their "0" positions] by activation of the zeroizing magnets, and then any rockers which must be tipped to their "1" positions to meet code-number requirements are set independently into their coded positions by momentary coded activations of the respectively associated clapper magnets. Activations of the clapper magnets need not be simultaneous, since such activations do not alter valve settings directly. The plunger-controlling valves (and consequently, the plungers) hold whatever previous settings they had, until new coded settings are transferred to them from the rockers upon activation of the rocker-shaft-actuating units.

Note that, while the calculator-drive units described were designed to drive a comparatively light mechanism, other units, employing the same coded, cumulative-drive principles, could be designed to move very large mechanisms to positions accurately defined by code numbers of the type described, said movements being controlled by coded activations of control means responsive to relatively very weak coded activating "signals."

Alternative auxiliary calculator unit

Parenthetically, attention is now directed to the alternative auxiliary calculator unit 567, shown in Fig. 22, which can be substituted for auxiliary calculator unit 570 when calculator-drive units like units 601 and 602 are to be used in a radius-and-bearing-angle system, instead of in a base-and-two-bearing-angle system.

Auxiliary calculator unit 567 comprises a cylinder cam 568 that is rigidly attached to alternative extension 594" of shaft 594 [Figs. 25 and 26]. Shaft extension 594" is journaled for rotation in, and alternative extension 524''' of slide member 524 [Fig. 17] is slidably supported for longitudinal movement by, fixed support member 579. For the purposes of this description, the slide portion of extension 524''' is considered to be rectangular, to prevent rotation of member 524 about its axis. The longitudinal position of member 524 is determined by the setting of cam 568 through the cooperation of cam track 569 with a cam follower roller that is rotatably mounted on a stud rigidly affixed to extension 524'''.

Through the use of auxiliary unit 567, a coded setting of output shaft 594 of calculator-drive unit 602 can be utilized to fix the position of member 524, whereby to determine the length of vector $r$. If the useful portion of cam track 569 is effectively a uniform helix, angular movements of shaft 594 will be directly proportional to linear displacements of member 524, and then, with suitable modifications of the ratio of gears 627—628 [Fig. 26] (if necessary), units 567 and 602 together may be substituted for unit 540 [Fig. 19] in a system of the general type described in connection with Figs. 16—19. In such a system, unit 601 could be substituted for unit 560 (omitting shaft 593 and gears 617—618 [Fig. 25], since no use would be made of those components).

Relationships between certain units, and the ways in which some units may be substituted for others, are indicated in Figs. 17, 20, 25, and 26. When no auxiliary calculator unit is used [as in the Fig. 17—19 system], shaft 593, support 578, gears 617—618, and shaft extensions 593′, 594′, and 594″ are redundant, and except for extension 594″, this also holds true when auxiliary unit 567 is employed. If units like units 601 and 602 are to be incorporated into the system, it is probable that the system would be modified to increase the number of digits in the code numbers at the same time. Methods by which reader units like those described in connection with Figs. 4—10 could be utilized in the system will become apparent after study of the electrical system that will be described later in connection with Figs. 27—31.

Note that, instead of the direct proportionality relationship previously specified, the length of vector r [Fig. 17] could be varied in accordance with a prechosen, non-linear function of a primary quantity originally introduced into a related reader unit by merely changing the character of cam track 569 in a system employing auxiliary unit 567.

*Electric circuits and devices used in base-and-two-bearing-angle systems*

GENERAL DESCRIPTION

Interrelationships between units of a multiple-unit base-and-two-bearing-angle system [that represents one alternative form of my invention] are indicated schematically in Fig. 30. While only a few units are illustrated, it will become apparent that units that are substantial duplicates of those already present could be added to expand the system to practically any desired extent.

In Fig. 30, the six circles T1–T6 represent six "targets" external to the system comprising my invention. Each of the four "boxes" 921–924 represents a "remote station" comprising a reader unit and a data-transmitting unit operatively associated therewith, together with direction-finding means (external to the system comprising my invention).

NOTE.—To simplify description, specific components are often mentioned as being assigned to particular units, but in view of the alternative components disclosed herein, it will become evident that a number of the units could be modified by replacing certain components with others (which I have shown to be functionally equivalent), while remaining within the scope of my invention. Where it is stated that one unit is a duplicate of another, it will be appreciated that numerous minor changes could be made without materially altering the operation of the system [e. g., some reader units could be adapted to handle more code-number digit places than others].

Reader unit 200, described in connection with Figs. 4–5 and 8–10, forms part of remote station 921, and the other remote stations are equipped with duplicates of said reader unit. It will be assumed: that the direction-finding means at the station 921 is of the type which can be made to follow a moving target; that said means includes a rotatable element that is directly connected to shaft 201 of reader 200; that said direction-finding means is adapted to rotate said element through an angle (measured from a fixed, prechosen, reference position) that is equal to [the mapping projection of] the bearing angle of said target (as measured from a fixed, prechosen, reference base line); and that stations 922–924 are similarly equipped.

When the position of a selected target is to be determined [through the use of the base-and-two-bearing-angle system now being considered], it is first necessary to introduce into the system bearing angle "data" obtained by direction-finding means at each of two remote stations. A coding unit ["coder"] (comprising a reading unit ["reader"] for coding an angle reading, and a plurality of U2 units, cooperative with said reader, for tentatively "holding" the respective code-number digits after they have been read) is located at each remote station. Each reader cooperates with the direction-finding means at its remote station to effect coded angle-data introduction by setting up said data in its coder in such a way that the data can be transmitted to a home station as a series of "signal" pulses ["signals"]. At each remote station, a data-transmitting unit ["transmitter"] cooperates with an operatively associated coder, and through said cooperation, and the further cooperation of said transmitter with an operatively associated data-receiving unit ["receiver"] at the home station, said data transmission is effected.

The coder, transmitter, and receiver units associated with a particular remote-station direction-finding means are always the same, but each receiver is operatively associatable with any selected one of a plurality of calculator-drive units at the home station. [Only a simple modification of the system would be required to permit each receiver to be operatively associatable with any selected plurality of said plurality of calculator-drive units.]

In Fig. 30, the four boxes 911–914 represent four receivers, and the seven boxes 901–907 represent seven "combination units" that comprise calculator-drive, auxiliary calculator, calculator, and projector units. Combination unit 901 is typical of the units 901–907, all of which are at the home station.

In more detailed schematic Fig. 31, it can be seen that unit 901 comprises calculator-drive units 601 and 602, auxiliary calculator unit 570, and final calculator and projector unit 500, which component units, together with their interrelationships and mode of operation, have been described in connection with Figs. 17, 20, 21, and 23–26. Unit 900, which contains certain components of units 601 and 602, as well as some components of its own, and which will be described later in connection with Fig. 27, is also comprised in unit 901. The projectors in the several combination units are adapted to project target-position-indicating light spots onto a chart 503, represented in the figures by its trace line.

NOTE.—To facilitate observation of the chart without interfering with projected light beams the [vertical] chart can be made of translucent material, and then the chart can be viewed from the side opposite to that on which the projectors are situated. Mirror image reversals involved in such viewing can be readily effected in original design and set-up by one skilled in the art. For example, angular reversals can be obtained by merely changing the hydraulic-unit valves, or by adding an idler gear between gears 523 and 531 in calculator unit 500, or by making simple changes in the reader units involved.

Boxes 811 and 821 [Fig. 31] represent, respectively, transmitter-unit and coding-unit portions of remote station 921, which will be described in detail in connection with Figs. 28–29. Boxes 812 and 822 represent respectively corresponding duplicate portions of remote station 922 [see Fig. 28a].

Box 910 represents a pulsing-generator unit that serves as a source of synchronized pulses (of a plurality of different frequencies) for the entire system. The character of the pulses is subject to wide choice in design, but for the purposes of this description, it will be considered that pulsation is of the interrupted-audio-frequency type—suitable frequencies being chosen from the range extending from 350 to 2,600 cycles per second, each pulse lasting for .1 second, and each interval between pulses lasting for .1 second [i. e., to form five complete pulse cycles per second].

*Operations and associations in a complete system*

The pulses used by the transmitters in sending signals to the receivers are first received from generator unit 910 via said receivers, so that no pulsing oscillators are required at the remote stations. By thus letting all pulses originate in one unit that is included in the main home-station installation, synchronization problems are minimized, servicing is facilitated, and one possible source of remote-station trouble is eliminated.

The arrow lines extending from remote station 921 to targets T1–T6 [Fig. 30] are intended to indicate that the direction-finding means at that station is to be used in determining the bearing angles of said targets, but it is to be understood that such determinations are to be made progressively, rather than simultaneously. The arrow lines extending from receiver 911 to combination units 901–906 are intended to indicate that receiver 911 is operatively associatable with said combination units, but again it is to be understood that effective operative associations are normally to be established progressively, rather than simultaneously.

The line extending between remote station 921 and receiver 911 [Fig. 30] indicates that said station and receiver are operatively associated, and for the purposes of this description, it will be understood that this association is effected by means of a multiple-wire cable. [The system is so designed, and the audio frequency range for pulses is so chosen, however, that said association could be effected equally well through standard telephone lines that pass through ordinary telephone central stations and repeaters. The system and pulse characteristics could be modified in such a way (not disclosed herein), that said association could be effected by more or less conventional radio means, and thus two stations could be "operatively connected" together, even in the absence of actual wire or other connections.]

Lines, similar to those described in the two preceding paragraphs, extending between other components of the Fig. 30 system have similar significance.

Ordinarily, one combination unit (like unit 901) is assigned to each target, and events are so scheduled, and operative associations so controlled, that each combination unit is activated by two sets of signals representing the bearing angles of the target to which the combination unit is assigned, and not by signals representing other target bearing angles. In each case, said two sets of signals are respectively transmitted from two remote stations which, from the point of view of the system as a whole, may be said to "pair" [or to "be paired"] in securing the required signal-controlling bearing-angle "data" on the target involved, even though (as a consequence of the progressive way in which operative associations are established) said stations may act with a great degree of independence in making their bearing-angle readings.

The bearing angles just mentioned correspond to those shown in Fig. 21—the reversal of the order of $\theta$ and $\phi$ in Fig. 31 being of no consequence, because such a reversal does not invalidate Equation (E3) and, therefore, does not affect the absolute value of $r$. The point P' of Fig. 21 corresponds to a point at (or directly above or below) the position of target T1 in Fig. 31.

Typical associations involved in setting a combination-unit projector to the position in which it will indicate the location of a [selected] target in accordance with bearing angles read at two appropriately paired remote stations are indicated schematically in Fig. 31. Note that, in addition to illustrating the type of tentative subsystems formed in the more comprehensive Fig. 30 system, the Fig. 31 system could stand alone as a complete base-and-two-bearing-angle system.

Either remote station of a pair can be prechosen to be the "pole station" [i. e., to read the pole angle $\theta$, previously described]. A simple interchange of receiver-combination-unit connecting plugs, and a few alterations of preliminary adjustments, will suffice to change the pole-angle reading from one station to the other of a pair.

The principal operative-association changes in the system are effected in the receivers, under the control of selecting means in the remote stations—said receivers being paired in correspondence with the pairing of the remote stations with which they are respectively associated. Since targets may be moving relative to the remote stations, target bearing angles should be read simultaneously at each of two paired remote stations, and means for attaining such simultaneity is included in the system.

*Operating cycle for one complete system*

Figure 30 is intended to show one of many possible different operating-cycle arrangements, with particular reference to the activities of remote station 921 and receiver 911 in the course of such a cycle. In Fig. 30, units 901–906 are respectively assigned to targets T1–T6, and in the example illustrated, events takes place as follows:

(1) The unit 901 projector is first set to indicate the position of target T1 as a result of readings made at paired stations 921—922, station 921 acting as the pole station [i. e., the station that reads the angle $\theta$].

(2) The unit 902 projector is next set to indicate the position of target T2 as a result of readings made at the same pair of remote stations, but in this case, station 922 acts as the pole station, as indicated by the fact that the arrow line from receiver 912 is connected to the lefthand side [Fig. 30] of unit 902 [i. e., the side of the combination unit that is adapted to handle the pole angle $\theta$ (see Figs. 24, 25, and 31, and related descriptions)].

(3) The unit 903 projector is next set to indicate the position of target T3 as a result of readings again made at stations 921—922, with station 921 acting as the pole station.

(4) The unit 904 projector is next set to indicate the position of target T4 as a result of readings made at paired stations 921—923.

(5) The unit 905 projector is next set to indicate the position of target T5 as a result of readings again made at stations 921—923, and at the same time, the projector of another combination unit 907 [like unit 901] is set to indicate the position of target T6 as a result of readings made at paired stations 922—924.

(6) The unit 906 projector is next set to indicate the position of target T6 as a result of readings made at paired stations 921—924. Note that units 906 and 907 both indicate the position of the same target, as may be the case when a target is moving out of the range best covered by one pair of remote-station direction-finders and into an overlapping range best covered by another pair of such direction-finders.

(7) Next [assuming that the targets may be in motion], unit 901 is reset to the new position occupied by target T1, again as a result of readings made at re-paired stations 921—922, and the whole cycle of operations is repeated as often as desired.

Each combination-unit projector normally holds its setting throughout most of the operating cycle, and safety devices are included in the system to prevent a change in said setting unless remote stations are properly paired to transmit signals relating to a selected target to the assigned combination unit. The system is so designed that, if six bearing-angle readings can be made in a minute at each remote station, then any remote station, such as station 921, can play a part in indicating the positions of six different targets per minute, and if six targets are assigned to each remote station, then the indicated position of each target will be redetermined once each minute. It would, of course, be possible to make more frequent redeterminations of indicated target positions by assigning less than six targets to each remote station.

*Electric component details and operation*

A complete wiring diagram for a multiple unit base-and-two-bearing-angle system would be so encumbered with duplications that it would be very difficult to bring out clearly the basic circuits involved. Consequently, the wiring diagrams for such a system which appear in Figs. 27–29, have been very much abridged, and in many cases where a unit contains a number of substantially duplicate components, only one or two typical components are shown. The way in which missing (or additional) components are (or can be) incorporated into the system will become obvious, and the actual presence of such elements in the illustrative system under consideration is indicated schematically in Fig. 31 by multiple circuit connections between units, and otherwise. Nonessential conventional items, such as spark suppression units for increasing the life of contacts, have been omitted altogether.

Numerous features of the base-and-two-bearing-angle system duplicate, or nearly duplicate, similar features in the polar-coordinate system previously described, and many of the notes and comments herein are equally applicable to both systems. As before, it would be possible to obtain at least some "useful results" from a rudimentary system employing a very limited number of code-number digit places, but it will be here assumed that the code numbers contain enough digit places to permit the magnitudes of angles to be coded with precision.

*Recapitulation of the significance of certain symbols*

Certain electrical units and means, to which special symbols have been assigned, and most of which were used in the description of the polar-coordinate system, will appear frequently in this description, and for convenient reference, their characteristics, and the figures in connection with which they were described, will be tabulated here:

U1 [Fig. 3] = An isolating, amplifying, and rectifying unit.
U2 [Fig. 11] = A high-impedance-input relay unit, with an optional lock-in connection.
U3 [Fig. 12] = A stepping-switch-drive unit, with one input through a U1 unit, and an auxiliary input connection for use in homing operations.
FP [Fig. 14] = "Full-pulse" means, associated with certain switching elements of the system for preventing certain prechosen operations of said elements from taking place at times other than in the intervals between pulses of the system's pulsing power supply.
U4 [Fig. 15] = A reader-cycling unit for initiating the reading operation when activated, for automatically terminating its own operations at the end of the reading cycle, and for temporarily opening certain external circuits during the reading operations.

*Circuit showings and abridgments*

Figures 27 and 28 may be placed side by side (with Fig. 27 on the left) to form a single wiring diagram, the three wires extending to the lefthand edge of Fig. 28 matching, and being continuations of, the three wires extending to the righthand edge of Fig. 27. All of Fig. 27, except the portions included in valve-setting control unit 900 and pulsing-generator unit 910, constitutes a partial wiring diagram of receiver unit 911 [Figs. 30–31], and all of Fig. 28 constitutes a partial wiring diagram of remote station 921 [Figs. 30–31]. All of Fig. 28, except the portion comprised in coding unit ["coder"] 821 (comprising reader 200 and its operatively associated U4 and U2 units), constitutes transmitter unit 811.

Figs. 27a and 28a may be placed side by side (with Fig. 27a on the left) to form a single wiring diagram, the three wires extending to the left-hand edge of Fig. 28a matching, and being continuations of, the three wires extending to the right-hand edge of Fig. 27a. All of Fig. 27a, except the portions included in valve-setting control unit 900 and pulsing-generator unit 910, constitutes a partial wiring diagram of receiver unit 912 [Figs. 30–31], and all of Fig. 28a constitutes a partial wiring diagram of remote station 922 [Figs. 30–31]. All of Fig. 28a, except the portion comprised in coder 822 (which is an exact duplicate of coder 821), constitutes transmitter unit 812.

NOTE.—The means shown in unit 912 [Fig. 27a] exactly duplicates that shown in unit 911 [Fig. 27]; and the means shown in unit 922 [all of Fig. 28a] exactly duplicates that shown in unit 921 [all of Fig. 28]. Duplicate reference numerals have, therefore, been applied (in most cases) to corresponding duplicate parts of duplicate units, but to avoid ambiguity in certain portions of the description, the letter "a" has been added to some numerals to distinguish units in receiver 912 and remote station 922 (shown in Figs. 27a and 28a) from the corresponding duplicate units in receiver 911 and remote station 921 (shown in Figs. 27 and 28). Since "a" is incorporated into such reference numerals merely to distinguish between duplicate units, without changing the significance of the basic portions of such numerals, the character and mode of operation of an "a-numbered" unit can be understood without further description in cases where the character and mode of operation of corresponding duplicate units have been previously described, and consequently, "a" may be incorporated into some of the numerals without special comment. Attention is called to the fact that while unit 911 is connected to the left side of unit 900 [Fig. 27], unit 912 is connected to the right side of unit 900 [Fig. 27a]—in conformity with the showings in Figs. 30–31. Notice, also, that there is a difference in the settings of switches 844 [Fig. 28] and 844a [Fig. 28a].

In addition to the pulsing-generator unit 910, only two remote stations, two receivers, and one valve-setting control unit are illustrated [in part] in Figs. 27–29 [i. e., Figs. 27, 27a, 28, 28a, and 29], but it will be understood that other duplicate units are actually present, as indicated in Fig. 30. Since, except for variations resulting from differences in settings and code numbers, operations carried out by one remote station and its associated receiver are almost exactly the same as corresponding operations carried out by another such combination, it is believed that (with suitable explanation) the showing in Figs. 27–29 is sufficiently complete to convey a clear understanding of the operation of the entire system.

Certain design and operational features of the base-and-two-bearing-angle system so closely resemble corresponding features of the polar-coordinate system already described that a repetition of the detailed description of those feature would appear to be redundant. Thus, in cases where the general characteristics of features can be understood through reference to previous descriptions, additional descriptive remarks will be directed chiefly to the way in which said features are incorporated into the new system.

*Pulsing-generator unit and grounding*

Pulsing-generator unit 910 comprises three operatively associated, synchronized, pulsing generators which, respectively, supply periodically repeated pulses $F_1$, $F_2$, and $F_3$ (having the respective A. C. frequencies $f_1$, $f_2$, and $f_3$) to the entire system. Frequencies $f_1$, $f_2$, and $f_3$ should be so selected that they can be readily separated by means of band-pass filters, taking into account the possible presence of undesirable harmonics of the frequencies. [See end of previous description following the heading "Full-pulse circuits."] $F_1$ pulses are sent out over wire 991, while $F_2$ and $F_3$ pulses are both sent out over wire 992.

NOTE.—When circuits are completed through "ground," the ground portion of the circuit is to be understood to be present, even though it may not be specifically mentioned. All of the grounds indicated are to be understood to be common. In cases where such common grounding might be objectionable [e. g., in transmitting signals over telephone lines], the system could be modified, by one skilled in the art, to eliminate grounding through the use of conventional isolating devices and additional point-to-point wiring. Unless otherwise stated, the cathodes of all U2 units are to be understood to be connected directly to ground.

Specific circuits—normal operations

NOTE.—Except where otherwise stated, the following description of means and mode of operation will be primarily directed to the units shown in Figs. 27, 28, and 29; but, to avoid useless duplication in extending the disclosure to cover the complete system, said description is to be understood to apply (with suitable, obvious modifications) to the units shown in Figs. 27a and 28a also.

NOTE.—While generator unit 910 supplies pulses that are used to keep each receiver in synchronism with the transmitter with which it is associated (as well as for other synchronizing purposes in a complete system), the circuits are so arranged that the two transmitter-receiver combinations forming a pair need not be in synchronism with each other through large portions of their respective cycles of operation. However, the two transmitter-receiver combinations of a pair are brought together at certain points in their cycles (by waiting for each other) in ways that will be set forth at appropriate points in the detailed description of those cycles.

Generator wires 991 and 992 are normally connected to receiver wires 791 and 792, respectively, via normally-closed switch elements of slow-release relay 797, and until this relay is made the subject of further comment, it will be understood that its switching elements are in the position shown in Fig. 27. Wire 791 extends directly to remote station 921, where it branches out to make $F_1$ pulses available to many points at that station. [All branches of a wire are considered to be part of the same wire—covered by one reference number.]

Upon reaching U1 unit 830 [Fig. 28], the $F_1$ pulses are amplified and rectified, and, with the aid of the operative connection between unit 830 and relay 801 indicated, the resulting rectified pulses are utilized to close a switch element of said relay, whereby to light lamp L1 by completing a local circuit including said lamp and a battery, to indicate that normal $F_1$ pulses are being received by station 921. Relay 801 is of the slow-release type, and is so adjusted that, if pulses are being received at their normal rate, it will not release between pulses, but if one pulse is missed, it will release.

NOTE.—For purposes of explanation, it will be assumed (unless otherwise stated) that the operating cycle for the complete Fig. 30 system is in the phase in which Fig. 31 represents the particular pairing of units then current, and units will be considered to be so paired in the following description. Even though operations are described in connection with only one component system of two paired systems of units, it is to be understood, without further comment, that the other component system is operating similarly, and concurrently, though not always in exact synchronism.

NOTE.—Where the character of interconnection, or co-operation, between elements is evident in the figures, the necessary connecting wires, or interlinking means, indicated will be understood to be present, even though, to avoid continual recital of the obvious, such wires and means may not be specifically mentioned. In such cases, said wires and means will be considered to form parts of one or the other of the cooperating elements, and will not require special reference numbers. Also, an operative "pulse" will be said to "pass through" a U1 unit, even though its character may be changed (by amplification and rectification) in the process.

NOTE.—Until otherwise stated, normal operation (in which the switch elements of relays 797 and 801, and U2 units 796 and 896 occupy the positions shown in Figs. 27–28) will be assumed in the following description. Note that any pulse which reaches the bank terminal of bank 4B will normally activate drive unit 741, and that any pulse that reaches the bank terminal of bank 4B' will normally activate drive unit 841, the circuit from unit 841 to ground being completed through a normally-closed switching element of U2 relay unit 896. Consequently, in tracing circuits employed in effecting normal stepping-switch advancements, it will suffice to carry the tracings to the respectively appropriate terminals [i. e., the terminals connected to the sweep arms at the time] of "normal drive banks" 4B and 4B'.

NOTE.—To save many needless words in the following description of connections made, and operations taking place, in the normal course of events, it will be understood that, until their advancement to the next step is specified, stepping switches 740 and 840 are, and remain, at the step last given. Since the significance of certain symbols is evident in the figures [e. g., 3B'$_2$ stands for the 2nd terminal of the 3B' bank of stepping switch 840], and since, with the sweep arms of switch 840 at step 2, connection to terminal 3B'$_2$ implies connection to the 3B' [sweep arm] bank terminal, such symbols may be used without descriptive words in tracing circuits, and mention of [sweep arm] bank terminals may often be omitted altogether, without loss of clarity. Thus [at step 2, Fig. 28], an expression like, "via terminal 3B'$_2$, bank terminals 3B' and 2B', and terminal 2B'$_2$," may be condensed to read, "via 3B'$_2$, and 2B'$_2$. Connection "to a bank" will ordinarily mean connection to the sweep-arm terminal of the bank, said terminal being represented by the bank symbol (without subscript).

First steps in a stepping-switch cycle

If the initial condition of the system is that illustrated in Figs. 27–28, the operation of relay 801, to light lamp L1, is the only operation that will be performed by receiver 911 and transmitter 811 until said receiver and transmitter are further activated by the closing of full-pulse switch 701 [Fig. 27] by an operator (or by other means, external to the system). [The full-pulse means associated with switch 701 receives its control pulses from unit 910 (via wire 992, a normally closed switch element of relay 797, wire 792, and 5B$_1$).]

The closing of switch 701 permits the next $F_2F_3$ combined pulse to reach and activate the U3 drive unit 741 of stepping switch 740 from wire 792 (via 5B, 5B$_1$ switch 701, wire 892, 4B$_1$, 4B, and a third normally-closed switching element of relay 797). At the same time, a branch of wire 892 conveys said $F_2F_3$ pulse to band-pass filter unit 832 in remote station 921, which filter is designed to pass $F_2$ pulses (i. e., pulses employing a frequency in the neighborhood of $f_2$), while effectively blocking the passage therethrough of pulses of other frequencies. [In designing a filter, such as filter 832, for handling pulsing signals, transient phenomena should be given due consideration, to avoid trouble from that source.] After passing through filter 832, the $F_2$ portion of said $F_2F_3$ pulse continues on to reach and activate the U3 drive unit 841 of stepping switch 840 (via 4B'$_1$). In this way, the closing of switch 701 leads to the simultaneous activation of U3 units 741 and 841, and thus, at the end of the exciting pulse, stepping switches 740 and 840 are led to advance in synchronism from their 1st- to their 2nd-step positions.

As soon as stepping switch 840 reaches its second step, U2 unit 802 is activated through the closing of a circuit from ground to the grid wire of said unit (via 3B'$_2$ and 2B'$_2$), and said activation closes a local circuit, including a battery, to light lamp L2. The steady lighting of lamp L2, which takes place only when switch 840 is at step 2, indicates to the operator of station 921 that transmitter 811 and receiver 911 are synchronized and ready for further operations.

Selective, association-determining steps

Before initiating further advance of the stepping switches, the station 921 operator determines (by reference to a prearranged schedule, or otherwise) which of the combination units 901–906 operatively associatable with receiver 911 is to be activated by coded signals to be controlled by the next reading of reader 200, and sets selector switch 844, of selector-and-control unit 845, accordingly. [Because of the abridgment of the illustration, only two selector points of switch 844 are indicated as being connected, respectively, to stepping-switch terminals 5B′₃ and 5B′₄, but in a full showing of the apparatus, four additional selector points would be similarly connected, respectively, to (the next) four additional stepping-switch terminals.]

After setting switch 844 at its properly selected position, and after noting the lighting of lamp L2, the station 921 operator closes full-pulse switch 842, to start a selecting [association-controlling] sequence of operations. The closing of switch 842 establishes operative connections between wire 791 and drive bank 4B′ (via switch 842, 5B′₂, and 4B₂), and between wire 791 and drive bank 4B (via switch 842, 5B′₂, wire 893, and 4B₂), whereby switches 740 and 840 are led to advance together to step 3 at the end of the next pulse [traversing wire 791].

The advance of switch 840 to step 3 breaks the circuit to unit 802, and this leads to the opening of the associated lamp circuit, to extinguish lamp L2.

The selecting points of switch 844 are respectively connected to successive terminals in the 5B′ bank of switch 840, starting with terminal 5B′₃; and groups of terminals covering the same step range in the 4B′ and 4B drive banks of switches 840 and 740, respectively starting with terminals 4B′₃ and 4B₃, are bridged together and connected directly to wire 791. Thus, after reaching step 3, switches 740 and 840 will advance (automatically, and in synchronism) one step at the end of each F₁ pulse, until [in the abridged illustration] step 6 is reached—stepping activations being effected through the establishment of connections between wire 791 and drive banks 4B and 4B′ via said groups of terminals. [In an unabridged showing of the transmitter used in remote station 921 of the Fig. 30 system, there would be six selecting steps following step 2-step 6 in the abridged illustration corresponding to step 9 in an unabridged showing.]

By studying the diagram, it can be seen that, as switches 740 and 840 advance through the selecting steps, an F₁ pulse from wire 791 can reach wire 893, via selector switch 844 and the particular terminal of the 5B′ bank that was selectably determined by the setting of switch 844, when the sweep arm of switch 840 is in contact with said selectably-determined terminal [i. e., at step 4 in the example illustrated in Figs. 27–28]. It can also be seen that, in the course of the advance through the selecting steps [i. e., steps, 3, 4, 5, in the abridged illusration], there is no other path over which a signal pulse can reach wire 893. [Multiple selections could be made at switch 844, if desired, by adding one, or more, independently settable selector arms to said switch.]

At step 4, with switch 844 in its indicated position, the pulse which reaches wire 893 travels along that wire to U1 unit 730, and thence (after amplification and rectification in said unit) to the grid wire of U2 unit 704 via 6B₄. Unit 704 is activated by said (rectified) pulse, and the consequent operation of the switching elements of that unit (all of which are initially open) serves to establish an operative association between receiver 911 and valve-setting control unit 900 by closing "gaps" in a plurality of circuits that extend between said receiver and unit 900.

In applying the foregoing description to the duplicate system shown in Figs. 27a and 28a, it can be seen that with switch 844a in its indicated position, unit 703a will be activated at (that system's) step 3 to establish an operative association between receiver 912 and unit 900 in a manner exactly analogous to that set forth in the preceding paragraph. Furthermore, it can be seen in Figs. 27–27a that when receivers 911 and 912 are both brought into operative association with unit 900, they automatically establish an operative association with each other (via unit 900) for cooperation in a manner that will be described later.

*Interconnecting plugs and cables, and further notes on abridgments*

It is by means of a plurality of circuits, comprising those mentioned in the second preceding paragraph, that receiver 911 is made "operatively associatable" with combination unit 901 [Fig. 30]. The wires embraced by bracket line 774 in the abridged Fig. 27 diagram form a multiple-wire cable, and correspond to certain of the wires [in the unabridged set] extending between receiver 911 and overlapping units 601—900 in Fig. 31. The wires of this same set are also represented by the single line [cable] extending from receiver 911 to unit 901 in Fig. 30.

The cable comprising the wires coming from receiver 911 that are bracketed by line 774 terminates at unit 900 in a multiple-circuit connecting plug, of which plug, line 774 is the symbolical representation. Plug 774, with its attached cable, together with U2 unit 704 (including its switching elements), relay 707′, and a switch element 747 [of U2 unit 707], form a group of associated components which is duplicated by the group composed of plug 773, with its attached cable, together with U2 unit 703 (including its switching elements), relay 707″, and a switch element 747′ [of unit 707]. Insofar as connections within receiver 911 are concerned, the two groups of components just mentioned are equivalent, except for the fact that unit 703 is activatable at step 3, via 6B₃, whereas unit 704 is activatable at step 4, via 6B₄. [While only two such groups are seen in the abridged illustration, the way in which additional duplicate groups can be added is evident in Fig. 27, where the wires, and the switch link of unit 707, that run to the lefthand edge of the figure can be extended to the left as far as necessary. In incorporating such additional groups into the receiver, their respective U2 units (corresponding to unit 704, in the group first described) are connected in such a way that they are respectively activatable via successive terminals of the 6B bank immediately following 6B₄—all of said terminals, and their respectively associated circuits and components, being represented symbolically in Fig. 27 by the single dot 6B₅.]

NOTE.—Use will be made of single stepping-switch terminal dots, or single components, to represent, symbolically, components, or groups of components, that do not appear in the abridged diagrams. In such cases, it is believed that descriptions and showings of the duplicate components, or groups of components, that do appear in the diagrams, together with the context of remarks regarding unseen items, will make clear the significance of the symbols. Since the number of steps falling into (each of) certain categories in a complete stepping-switch operating cycle is subject to arbitrary choice in design, each "abridgement symbol" is considered to represent enough sets of components in its respectively indicated category to satisfy the needs of whatever unabridged system is specified. Thus, in connection with the Fig. 30 system, dot 6B₅ [Fig. 27] stands for four sets of circuits and components, each of which is a duplicate of the set [expanded, to provide for more code-number digit places] associated with 6B₃ or 6B₄. As in the case of the transmitter, step 6 in the abridged illustration would correspond to step 9 in this particular unabridged system, and in an unabridged showing of this system, terminal 6B₆, and the terminals which come into play later in the "stepping-switch cycle," should be appropriately redesignated. However, in describing relationships between abridged illustrations and unabridged systems, such redesignations will be understood, rather than actually carried out, and in such a description, an expression like "four steps between step 4 and step 6," will be understood to mean four steps between the steps designated as "4" and "6" in the abridged system—said step "6" in the abridged system not necessarily being the 6th step in the unabridged system. Furthermore, when units of the abridged illustration are said to be used in an unabridged system, it is to be understood that such units have their unabridged form, and that they are present in sufficient quantity to meet the requirements of the unabridged system. The expression "stepping-switch cycle" means the passage, in normal operation, of a stepping-switch sweep arm once through all of the steps of the stepping switch, starting with step 1.

NOTE.—The circuits associated with plugs like plugs 773 and 774 are so arranged that any plug of any receiver like receiver 911 [e. g., in the Fig. 30 system] can be plugged into either "side" [e. g., the θ-drive (unit 601) side, or the φ-drive (unit 602) side, of unit 901, Fig. 31] of any combination unit like unit 901 [e. g., units 901–907, Fig. 30], to obtain correct interconnections within the system, provided only that the several units of the complete system are properly paired and scheduled, and that preliminary adjustments have been made appropriate to the way in which said interconnections have been arranged. Thus, plug 774 of receiver 911 [Fig. 27] is plugged into the θ-drive side of unit 901 [Figs. 30–31], while plug 773 of receiver 911 may be considered to be plugged into the φ-drive side of unit 902. In the Fig. 30 system, four more duplicate plugs of receiver 911 are plugged into the respective θ-drive sides of units 903–906; four such plugs of receiver 912 are respectively plugged into the φ-drive sides of units 901 and 903, and the θ-drive sides of units 902 and 907; two such plugs of receiver 913 are plugged into the respective φ-drive sides of units 904 and 905; and two such plugs of receiver 914 are plugged into the respective φ-drive sides of units 906 and 907. All of this interconnecting wiring is assumed to be in place throughout this description—effective operative associations between receivers and combination units being selectively controlled by the control of circuit [switch] gaps in the several receivers.

Returning now to the further description of the Fig. 27–28 illustration, the closing [at step 4] of one of the switch elements of unit 704 establishes, in effect, a connection between ground and "tentative-ground" wire 734 (via wire 735, limit switches 736 and 736' [in parallel], and comparatively low resistance 737), and at the same time, the closing of another of said switch elements [internal, in this case—see Fig. 11] connects said tentative-ground wire 734 to the lock-in wire of unit 704, whereby to hold said unit locked in [after it ceases to be activated via 6B₄] until released in a manner to be described later. In this way, as a result of setting selector switch 844 to the point connected to 5B′₄, an operative association has been established (and will be temporarily maintained) between receiver 911 and the θ-drive side of unit 901-(900) [Figs. 27, 30–31], while the switch gaps in circuits extending from receiver 911 to units 902–906 are left open [e. g., unit 703 is not activated] during this particular stepping-switch cycle. [Normally, in the next stepping-switch cycle, another similar set of switch gaps will be closed, and the formerly closed gaps left open, as a result of a different selector-switch setting.] Note that selector-switch settings must be scheduled to effect proper pairings, and that such scheduled settings need not necessarily be made in progressive order.

Turning, for the moment, to the (unit 912)-(unit 922) system shown in Figs. 27a and 28a, note that the operative association between units 900 and 912 is established at that system's step 3 in the same way that the association between units 900 and 911 is established at step 4 of the (unit 911)-(unit 921) system shown in Figs. 27 and 28.

Synchronized readings

Returning again to the description of the Fig. 27–28 illustration, assume that stepping switches 740 and 840 have passed through their selective association-establishing steps and have reached step 6, and that the switch elements of unit 704 are closed, as a result of the activation and lock-in of that unit at step 4. At step 6, both stepping switches will stop and wait for further activation, and normally, such activation will not be received as long as full-pulse push-button switch 846 [Fig. 28] remains in its illustrated open position. This provision for the normal halting of the stepping-switch cycle at this point is made to prevent the making of false target bearing-angle readings. The operator of remote station 921 first "finds" the scheduled target (associated with the setting of switch 844) with the station's direction-finding means, and only after the movements of said target are being "followed" properly by said means, does said operator close switch 846 momentarily, to continue the stepping-switch cycle.

At step 6, the brief closing of switch 846 permits the next F₁ pulse carried by wire 791 to reach stepping-switch drive-bank terminals 4B₆ and 4B′₆ (via switch 846, 5B′₆, and wire 893), and as a result, switches 740 and 840 are led to advance together to step 7 (at the end of said pulse).

As soon as switch 740 arrives at step 7, a circuit path is established between wire 792 and ground through the A. C. input side of U1 unit 777 (via 5B₇). The grid wire of U2 unit 707 is connected through the D. C. output side of unit 777 and a cut-off-biasing battery (in series) to ground, and the components of unit 777 are so arranged and adjusted that unit 707 is activated to operate its switch elements (all but one of which are initially open) by the next pulse carried by wire 792. Like units 703 and 704, unit 707 "locks in" upon activation, as the result of the connection established between its lock-in wire and tentative-ground wire 734 (via the internal switch element of unit 707).

The respective operators of each of the two currently paired remote stations (921 and 922) will seldom start following a scheduled, selected target with their respective direction-finding means at exactly the same time, so that provision is made for holding one transmitter-receiver system at step 7 until the other such [paired] system has also reached its step 7. Since a transmitter-receiver system will normally have reached its 7th step only after the remote-station operator involved has indicated (by operating a switch, such as switch 846) that his direction-finding means is following the selected target, conditions are appropriate for making simultaneous readings of target bearing angles at both remote stations of the pair as soon as step 7 is reached by whichever of the paired transmitter-receiver systems happens to be lagging.

Relay 707′, in receiver 911, is connected in series with switch 747 of unit 707, a switch element of unit 704, a battery (in unit 900), and the following components [see Fig. 27a] of receiver 912: relay 707a″, switch 747a′ of unit 707a, and a switch element of unit 703a. In the normal course of operations of these two paired receivers, a situation will eventually be reached in which all of the switch gaps in the foregoing circuit are closed, except for a gap at either switch 747 in receiver 911, or switch 747a′ in receiver 912, or gaps at both of said switches, in the cases where both receivers arrive at their 7th steps together.

Assume that receiver 911 is lagging behind, and that receiver 912 has already reached its 7th step. Then, at the end of the interval between pulses following the pulse that led to the advancement of the sweep arm of switch 740 to its step 7 position, all four stepping switches [in receivers 911 and 912 and their associated transmitters] will be in their step 7 positions, and the gap at switch 747 will be the only gap in the circuit comprising relays 707′ and 707a. The activation of unit 707 at the start of the next pulse will close switch 747, and this, in turn, will lead to simultaneous activation of relay 707′ and its paired mate 707a in receiver 912. If both receivers had reached step 7 together, or if receiver 912, instead of receiver 911, had been lagging, it can be seen that the net ultimate result would have been the same, as far as the two last-named relays are concerned.

Relays like relay 707′, and U2 units, are of the type which, upon activation, can operate in .02 second, or less, so that two such components can operate in sequence in not more than .04 second. Thus, if the active portion of each pulse lasts for .1 second, the pulse which activated unit 707 will close the switch elements of relay 707′ and its mate before said pulse is half over, and at least .06 second of said pulse will reach wire 892 from wire 792 (via 5B$_7$ and relay 707′) at the same time that a corresponding fraction of a pulse reaches a corresponding wire in receiver 912. [If, for any reason, the delivery of such a fractional pulse to wire 892 should prove undesirable at this point, the delivery could be changed to a full pulse (with less than one pulse cycle delay) by merely substituting full-pulse relays for relay 707′ and other relays playing a similar part in the system.]

At step 7, the [fraction of a] pulse which reaches wire 892 will be conveyed by that wire to filter 832, and the F$_2$ portion of the pulse will pass through said filter to reach wire 897, and then (via 3B′$_7$, 2B′$_7$, a normally-closed switch element of unit 896, and U1 unit 807) to terminal 5 of U4 unit 370. Unit 370, which is comprised in coder 821, will thus be activated to start the reading cycle in remote station 921, and at the same time, substantially duplicate operations in receiver 912 and remote station 922 will start the reading cycle in remote station 922.

It is seen that, through the use of the method and means described, the bearing angles of target T1 [Fig. 30] will be read simultaneously at stations 921 and 922 while the direction-finding means at both of those stations are following the target properly (assuming that, once an operator starts to follow a target with his direction-finding means, he continues to follow it until the bearing angle is read).

NOTE.—If, through error, the operator at station 922 had set his selector switch to a position which would lead to the establishing of an operative association between receiver 912 and any of the combination units [902–906] other than 901 at the time that receiver 911 was operatively associated with unit 901 [through the activation of unit 704], then the circuit containing relay 707′ would remain open [as unit 703a in receiver 912 would not be activated], and no reader-cycle-initiating pulse would be sent out. Thus, readings at remote stations which are not properly paired will be prevented. The activation of a combination unit by readings for an incorrect target will also be prevented, unless two remote-station operators obtain fortuitously correct pairing by setting their respective selector switches to points associated with the same incorrect target in concomitant stepping-switch cycles.

In addition to activating unit 370, the pulse which reached wire 897 at step 7 will also activate unit 841 (via 5B′$_7$, wire 893, and 4B′$_7$) and unit 741 (via 5B′$_7$, wire 893, and 4B$_7$), and at the same time, the corresponding drive units for the stepping switches in remote station 922 and receiver 912 will be similarly activated. Thus, at the end of said pulse, switches 840 and 740, and the corresponding switches in station 922 and receiver 912, will be led to advance in unison to their respective 8th steps.

Reading cycles at remote stations 921 and 922 may not take exactly the same length of time, as the motor in U4 unit 370 (in coder 821), and the corresponding motor in station 922, are not controlled by synchronizing pulses from generator unit 910. Thus, the two receiver-remote-station systems again become more or less independent of each other. However, from this point to the concluding operations in the paired stepping-switch cycles, a description of operations and means in one of said two [paired] systems would parallel a description of operations and means in the other, so that (making due allowances for slight differences in timing, and differences resulting from inequality of the bearing angles read) a description of the Fig. 27–28 system will serve for both, over the cycle range mentioned.

Activation of U4 unit 370 [at step 7] leads to a sequence of operations in coder 821 [comprising reader 200, operatively connected with unit 370] described in detail in connection with Figs. 4–5, 8–10, and 15 [see, particularly, remarks following the headings "Reader-cycling and control mechanisms," and "The U4 reader-cycling unit"]. Since the initially-closed circuit extending between terminals 3 and 4 of U4 unit 370 is opened (at the very beginning of the reading cycle) before the sweep arm of the 5B′ bank has rendered said circuit operatively effective by advancing to establish a connection with it at step 8, said circuit functions as though it were a normally-open [full-pulse] switch, insofar as the rest of the system is concerned; and this accounts for the open-switch representation in the U4 unit symbol. Rectified pulses for controlling the full-pulse reclosing of said circuit at the end of the [unsynchronized] reading cycle are obtained from U1 unit 830 (via wire 891), said U1 unit being supplied with F$_1$ pulses via wire 791.

As shown in Figs. 4, 8, and 9, reader 200 is designed to read eleven code-number digit places, and the actual presence of circuits for all eleven places is indicated schematically in Fig. 31 by the interconnections between coder 821 and transmitter 811. Since the several reader-unit coding circuits, as well as respectively associated means in transmitter 811, receiver 911, and unit 900, have substantially duplicate electrical properties [it being immaterial whether any particular coding circuit employs one, or two, contacts, or whether coded contacts are made with primary disk 210, or secondary disk 220], only two "typical" reader coding circuits, and respectively associated means, are schematically illustrated in the abridged Fig. 27–28 illustration—terminals 5B′$_{12}$ and 5B$_{12}$, and clapper magnet 712, serving as symbols for the nine non-illustrated circuits and means. [The first code-number-digit-place clapper magnet 710 (Fig. 27) is actually present on the $\theta$-drive side of unit 900, but since no corresponding first-digit-place clapper magnet is required on the $\phi$-drive side, the dotted $\phi$-side clapper magnet 710′ (corresponding to $\theta$-side magnet 710) can be omitted.]

Contact wires 260 and 261 [Fig. 9] are respectively connected to 1st- and 2nd-digit-place reader contacts in the same way that contact wire 262 is connected to contact 252, so that, in the reading operation, a momentary coded connection is established between common wire 263 and each of the wires 260 and 261. As shown in Fig. 28, wire 263 is connected to ground, wires 260 and 261 are respectively connected to the grid wires of U2 units 850 and 851 (which units are comprised in coder 821), and the lock-in wires of said U2 units are connected to ground through comparatively low resistance 837 and a normally-closed switch element of U2 unit 896. Momentary grounding of wire 260 will activate unit 850 to close and lock in its switch elements, and momentary grounding of wire 261 will activate unit 851 to close and lock in its switch elements, so that the reading operations performed by reader 200 in the course of the reading cycle of coder 821 will serve to establish respectively coded connections between wire 791 and terminals 5B′$_{10}$ and 5B′$_{11}$. As heretofore described, the direction-finding means at station 921 cooperates with reader 200 (via shaft 201) to control the settings of that reader's coding disks in accordance with the magnitude of the target bearing angle to be read, and is so arranged that the establishment of an actual connection between wire 791 and the terminal (in the 5B′ bank) that is associated with a particular code-number digit place will correspond to the reading of "1" at that place, whereas, failure to establish such a connection at the time of reading will correspond to the reading of "0" at that place.

[Note that optical reader 270 (including the associated devices and circuits indicated), described in connection with Figs. 6 and 7, could be substituted for reader 200 in the (abridged) Fig. 28 system by connecting the grid of unit 850 to the activation-controlling wire of the lowest of the devices 290, by connecting unit 851 similarly to the next to the lowest of the devices 290, by connecting wire 298 to ground, and by letting switch 297 be an additional switch element of relay 374 (Fig. 15) in unit 370. Reader 270 could also be substituted for reader 200 in the unbridged Fig. 31 system by proceeding further in the same fashion, but in that case, certain of the code-number-digit-place circuits indicated in Fig. 31 would not be utilized, since unit 270 controls only eight (instead of eleven) digit places.]

After reading operations in coder 821 have set up the appropriate [θ] code number in units such as 850 and 851, further operations of unit 370 [Figs. 15 and 28] at the end of the reading cycle reestablish connection between terminals 3 and 4 of unit 370, thereby connecting wire 897 to terminal 5B's—said connection being established on a full-pulse basis, as previously described.

Upon arrival of step 8, switches 740 and 840 wait for the completion of the reading cycle before starting the transmission of the bearing-angle code number. At the end of the reading cycle, the connection of wire 897 to 5B's permits the next $F_2$ pulse to reach drive-bank terminals 4B's and 4B8 (via wire 792, 5B8, switch-element of relay 707', wire 892, filter 832, wire 897, terminals 3 and 4 and switch means of unit 370, 5B's, and wire 893), whereby to lead stepping switches 740 and 840 to advance in synchronism to step 9 at the end of said pulse.

The ringing of the bell in unit 370 notifies the operator at station 921 that the reading cycle is in progress, and as soon as the bell stops ringing, said operator is free to reset his selector switch for the next scheduled target and start seeking that target with his direction-finding means, without waiting for the termination of the current stepping-switch cycle.

Zeroizing

At step 8, ground potential is applied to the grid of U2 unit 748 (via 3B8 and 2B8), and as the cathode of unit 748 is connected to ground via a switch element of unit 707 that was closed (and locked in) at step 7, unit 748 will thus be activated to close its initially-open external switch element. The closing of that switch element will complete a circuit from ground to ground via the switch element of unit 707 just mentioned, the switch element of unit 748, wire 778, zeroizing magnet 708, and a battery, whereby to activate said magnet. Magnet 708 remains steadily activated for most of the time that switch 740 waits at step 8, but when switch 740 advances to step 9, the opening of the unit 748 grid circuit releases that unit's switch, and thus lets said magnet return to its initially unactivated condition. [The incidental activation of any other zeroizing magnets that may happen to be connected to wire 778 at the time will lead to no untoward disturbances in the other combination units of an unabridged system, but if desired, such incidental activations could be eliminated altogether by letting the zeroizing wire in each plug pass through an additional switch element of the associated association-controlling U2 unit (such as unit 704) before reaching wire 778.]

The activation, at step 8, of magnet 708 brings about the zeroizing operations in calculator-drive unit 601 that were described in connection with Figs. 24–26 under the heading "'Zeroizing' mechanisms" [and those operations will leave the rockers in said drive unit ready to be set to positions respectively determined by the code-number digits that are about to be transmitted from station 921].

Corresponding means and operations in [paired] receiver 912 are utilized to activate magnet 708' [at step 8 of that receiver], whereby to zeroize calculator-drive unit 602 [i. e., the ϕ-drive side of combination unit 901].

"Data-transmitting" sequence

Drive-bank terminals 4B9 through 4B17 are bridged together and connected to wire 791, and drive-bank terminals 4B'9 through 4B'18 are bridged together and also connected to wire 791. Consequently, after reaching step 9 [as described], switches 740 and 840 will advance (automatically, and in synchronism) one step at the end of each $F_1$ pulse that is delivered to wire 791, until [in the abridged illustration] step 18 is reached—and switch 840 will continue on for one additional step, to bring (the alternate half of) the sweep arm of that switch to its initial position for the next stepping-switch cycle.

To provide enough time to make sure that transient effects in the zeroizing mechanism have died out before starting transmission of the code number representing the angle θ, no code-number data is transmitted at step 9.

At step 10, a coded connection is established between wire 791 and the grid of U2 unit 750 (via U2 unit 850, 5B'10, wire 893, U1 unit 730, and 6B10), so that an $F_1$ pulse in wire 791 at step 10 will lead to the activation of unit 750, provided that the switch element of unit 850 was closed by the setting up of the code-number digit "1" in unit 850 in the course of the previous reading cycle, whereas unit 750 will remain unactivated, if unit 850 was not activated [i. e., if "0" was set up therein] at the time of the previous reading.

NOTE.—The process [e. g., like that just described] of activating [or setting], or failing to activate [or set], one component of the system in accordance with the controlling, coded activation, or non-activation of a preceding component, will be termed, "transmitting a [code-number] digit" from the controlling component to the controlled component, no matter how many intermediate [or relay] units may be passed through in the process.

If unit 750 is activated [at step 10], then an initially-open switch element of that unit will close, to complete a circuit from ground to ground via said switch element, wire 760, a switch element of unit 704 that was closed (and locked in) at step 4, clapper magnet 710, and a battery, whereby to activate magnet 710, but as unit 750 does not lock in, said activations would terminate as soon as switch 740 left its step 10 position. As previously explained, such a temporary activation of magnet 710 would cause the associated rocker in unit 601 to be set to (and left in) its "1" code-number digit position. If unit 750 is not activated [at step 10], magnet 710 will not be activated, and said rocker will be left in its "0" position. In this way, the 1st-place code-number digit, that was set up in unit 850 in the course of the reading cycle, is transmitted, at step 10, to the appropriate rocker in unit 601, whereby (indirectly) to control the operation of planetary unit 644 [as described in connection with Figs. 23–26].

[Since changes in rocker settings can be made prior to the valve-setting actuation of the associated rocker shaft without affecting the position indicated by the combination unit involved, and since the rockers are zeroized shortly before any new code number is transmitted to them, it is not essential to have switch elements of the association-controlling units (like units 703 and 704) included in the clapper-magnet circuits, but if such switch elements are eliminated, rockers associated with a particular digit place in all of the combination units having plug connections with receiver 911 will be operated each time that one of said rockers is operated, with consequent increased current drain, contact sparking, and wear and tear. Such increased current drain might render impractical certain simplifying substitutions, that (for some applications) could otherwise be made (e. g., direct utilization of plate current from the triode in U2 unit 750 to activate magnet 710). If an attempt is made to use a switch element of each association-controlling U2 unit to control connection of the common wire of the clapper-magnets in each respectively associated calculator-drive unit, care should be exercised in making sure that possible feed-backs through currently ineffective clapper magnets do not introduce detrimental disturbances.]

At step 11, the 2nd-place code-number digit, that was set up in unit 851 in the course of the reading cycle, is transmitted to the appropriate rocker in unit 601 (via 5B'11, wire 893, unit 730, 6B11, U2 unit 751, wire 761, a switch element of unit 704 that was closed [and locked in] at step 4, and clapper magnet 711 [and its associated mechanism]) in a manner exactly analogous to that described in connection with the 1st-place code-number digit.

Step 12, in the abridged Fig. 27–28 illustration, is blank, but in the unabridged Fig. 31 system, a sequence of nine more code-number-digit-transmitting steps (at which events take place in a manner that is also exactly analogous to that described in connection with step 10) starts at this point—the steps in said sequence being utilized in transmitting the remaining digits of the code-number reading of the reader to the respectively associated rockers in unit 601.

Steps 13–15 will be taken up later, in connection with Fig. 29.

*Synchronization check*

At step 16, a scheme described in connection with Fig. 16 under the heading, "Position check and homing circuits," is again employed, to check the synchronization of switches 740 and 840. Terminals $1B_2$ through $1B_{18}$ are bridged together and connected to wire 766, so that, at step 16 (only), a connection from the grid wire of U2 unit 796 to ground is established via 1B, $1B_{16}$, wire 766, $2B_{16}$, $3B_{16}$, the D. C. output sides of U1 units 716 and 716' (connected in series opposition), and a cut-off biasing battery. The A. C. input wires of unit 716 are respectively connected to ground and wire 791, and the A. C. input wires of unit 716' are connected to $F_3$ band-pass filter 733, and the components of said two U1 units are so arranged and adjusted that the voltage appearing across the output terminals of unit 716, when that unit is activated by the receipt of an $F_1$ pulse (via wire 791), will [at step 16] activate unit 796 to close its switch elements, unless opposing voltage appears at the same time across the output terminals of unit 716'.

If, as here assumed, switches 740 and 840 reach step 16 in synchronism, unit 716' will be activated [at that step] by an $F_3$ pulse (via wire 792, 5B, $5B_{16}$, wire 892, $5B'_{16}$, wire 893, and $F_3$ band-pass filter 733), and said activation will produce the "opposing voltage" mentioned in the preceding paragraph, and thus prevent the closing of the switches of unit 796. [Except that it is designed to pass $F_3$ instead of $F_2$ pulses, the characteristics of filter 733 correspond to those of filter 832, and similar remarks apply.] If switch 840 is at any step other than step 16 when switch 740 is at step 16, unit 716' will not be activated at step 16, and unit 796 will be activated, to start a sequence of operations that will be described later. [The frequency ($f_3$) used in the synchronization-check $F_3$ pulses is made different from the frequencies used for any other operative pulses to eliminate the possibility of obtaining an extraneous "check," no matter what the (incorrect) relationships between switches 740 and 840 may be.]

Except for the stepping operations themselves, step 17 has been left blank.

*Unlocking and final actuating circuits*

At step 18 (only), a closed circuit is established from ground through $2B'_{18}$, $3B'_{18}$, and a cut-off biasing battery, to lock-in wire 858, whereby cut-off potential is applied to said wire to unlock units 850 and 851 [and any other units that may be locked in by virtue of connection of their lock-in wires to wire 858], thus returning said units to their initial condition.

At step 18, U2 unit 758 [in unit 900] is normally activated to close its switch elements by a [rectified] pulse which reaches the grid wire of said unit via a switch element of unit 704 that was closed (and locked in) at step 4, a switch element 758" of unit 707 that was closed (and locked in) at step 7, $6B_{18}$, unit 730, wire 893, 5B', $5B'_{18}$, and wire 791. Said activation of unit 758 closes one of two initially-open switch gaps in an otherwise closed circuit comprising a switch element of unit 758, a battery, a magnet in shaft-actuating unit 718, a switch element of U2 unit 758', and a magnet in shaft-actuating unit 718', connected in series. The respective lock-in wires of units 758 and 758' are connected through respective, initially-open [internal] switch elements of those units, and a switch element of unit 704 that was closed (and locked in) at step 4, to tentative-ground wire 734, so that either of said units will lock in as soon as it is activated [the normal potential of wire 734 being nearly (or effectively) equivalent to ground potential at the time].

With the pairing here being studied, unit 758' is normally activated to close the other of the two switch gaps just mentioned when the stepping switch in receiver 912 has reached its 18th step—said activation being effected by operations and means exactly analogous to those described in connection with unit 758. Since the stepping switches in receivers 911 and 912 may not reach their respective 18th steps at exactly the same time, units 758 and 758' may not be activated at exactly the same time, but no matter which unit lags, there will be no activation of units 718 and 718' until the slower of the two paired receiver-remote-station systems has completed its data-transmitting and synchronization-check operations—and then (only), the closing of the second gap in the unit 718—718' circuit will activate those units simultaneously.

The activation [at step 18] of shaft-actuating units 718 and 718' leads to the actuation of the associated rocker shafts (e. g., shaft 686), as described in connection with Figs. 23–26, under the heading, "Hydraulic valve-setting mechanism," and such an actuation of said shafts serves to set the valves in calculator-drive units 601 and 602 in accordance with the code numbers read at stations 921 and 922, respectively, and finally, such a setting of said valves leads to a controlled driving of auxiliary calculator unit 570 [Fig. 20] and final calculator 500 [Fig. 17], whereby the light-spot projector 514 in calculator 500 is so positioned that it projects a light spot onto chart 503 at a chart point corresponding to the actual position of target T1 at the time that [T1] bearing-angle readings were made at paired stations 921 and 922, as previously explained.

In unit 602, the activation of unit 718' leads shaft 686 to move to the right [Fig. 26], and just before said shaft reaches the righthand limit of its travel, a flange portion 686' of said shaft cooperates with an initially-closed limit switch 736' to open said switch, and in an exactly analogous fashion, the activation of unit 718 leads to the opening of an initially-closed limit switch 736 in unit 601 just before the rocker shaft of unit 601 reaches the righthand [Fig. 26] limit of its travel. [In Fig. 26, the shaft-flange and limit switch in unit 601 lie directly behind the corresponding parts in unit 602, so that the single illustration serves for both sets of components in that figure. The limit switches are illustrated separately in Fig. 27].

As the two rocker shafts mentioned may not move at exactly the same speed, and as it is important that both rocker shafts travel to the ends of their strokes before they return to their initial positions, the control circuits are so designed that, upon activation, units 718 and 718' both continue to be activated until the slower of the two associated rocker shafts reaches the end of its stroke. Thus, in Fig. 27, it can be seen that switches 736 and 736' are connected in parallel, so that as long as either of said switches remains closed, tentative-ground wire 735 remains connected to ground through comparatively low resistance 737, but when both of said switches are open, the connection of wire 735 to ground through resistance 737 is broken, and all units that were previously locked in through connections between their lock-in wires and tentative-ground wires 734 or 734a (which latter wires were at tentative-ground potential by virtue of respective connections to wire 735 via switch elements of units 704 and 703a) are then unlocked. Specifically, in the abridged Figs. 27–27a illustration, and in the particular cycle being studied, the opening of both of the switches 736 and 736' will unlock U2 units 704, 707, 758, 758', 703a, and 707a. Such unlockings will open switch gaps in the circuit containing relays 707 and 707a whereby to return the switches of those relays to their initial open positions. Such unlockings will also open switch gaps in the circuit containing units 718 and 718', whereby to cut off the power supply for the magnets in those units, and the deactivation of said magnets will allow the return springs 719 and 719a [Fig. 27] of the respectively associated valves to return said valves to their initial settings— thereby causing the rocker shafts in units 601 and 602 to be driven to their initial, lefthand [Fig. 26] limit positions.

Finally, at step 18, the reclosing of an initially-closed switch element of unit 707 [that was opened (and locked open) at step 7] establishes a connection between wire 792 and terminal 4B18, and an exciting pulse in wire 792 will thus be enabled to activate unit 741, whereby to advance switch 740 one step, to bring (the alternate half of) the sweep arm of that stepping switch to its initial position for the next stepping-switch cycle. Similar, paired means in receiver 912 behave in a similar fashion, and as switch 840, and the corresponding stepping switch in remote station 922, have already completed their cycles [as previously described], all of the normal operations involved in indicating the chart-position of target T1 on chart 503 have now been concluded. Furthermore, assuming that switches 701, 842, and 846 were closed only briefly during the cycle, it can be seen that the whole system has been left in such a condition that it is ready to go through another cycle of the same general type, to indicate the next target position.

[Note that, if home-station control is not desired, the receiver units could be made substantially fully automatic by leaving switch 701, and corresponding switches in other receivers, constantly closed, but in that case, unit 707, and corresponding units in other receivers, should unlock on a full-pulse basis, since the movements of the rocker shafts (and consequently, the openings of the limit switches) are not synchronized by generator-unit pulses. If, in practice, it is found that selector switches like switch 844 can always be reset (for the next cycle) in the interval covered by steps 6–18 of the current cycle, or if automatic schedule-controlling means (not herein disclosed) are substituted for such selector switches, then the transmitter units can be made more automatic by leaving switches like switch 842 constantly closed. If, moreover, it is found possible to carry out scheduled operations with sufficient speed and accuracy, then (in certain systems), even push-button switch 846 (and corresponding switches) could be left constantly closed.]

[Note that if a number of successive position indications are to be obtained for a single target by maintaining constant (for a number of consecutive stepping-switch cycles) the associations of units in a set like that shown in Fig. 31, then the selector switches in the Fig. 31 system remain in a fixed position, and the automatic features mentioned in the preceding paragraph can be put into effect reliably. The remote station operators could then devote their whole time to following the target with their direction-finding means, as the rest of the system would be fully automatic.]

Homing circuits

The homing means and operations that will now be described in connection with the abridged Fig. 27–28 illustration typify the homing means and operations employed in all of the corresponding units in the Fig. 30 system, so that a description of the Fig. 27–28 homing circuits will suffice for the complete unabridged system.

The 1B bank of stepping switch 740, in which terminals 1B2 through 1B18 are bridged together and connected to wire 766, is the homing bank of that switch—the 1B bank terminal being connected to grid wire of U2 unit 796. The 1B' bank of stepping switch 840, in which terminals 1B'2 through 1B'18 are bridged together and connected to the grid wire of U2 unit 896, is the homing bank of that switch.

Homing circuits provide means for preventing the final actuation of a combination unit [at step 18] in the event that either of the pair of receivers then currently associated with said unit reaches its 16th step out of synchronism with its respectively associated transmitter. Thus, if an extraneous pulse, momentary transmission line failure, or other fault, leads switch 740 to reach step 16 at the same time that switch 840 reaches any step other than step 16, then the "opposing voltage" discussed under the heading "Synchronization check" will not appear across the output terminals of U1 unit 716' at step 16, and consequently, U2 unit 796 will then be activated (in the manner described under the heading just mentioned).

Any activation of unit 796 will lead to the closing of that unit's normally-open switch elements, to establish a connection between the grid wire of that unit and ground (via 1B, 1B2 through 1B18 bridged together, wire 766, and one of said switch elements), and this connection will be maintained [effectively], to lock in unit 796, as long as a sweep arm of switch 740 is in the range covered by the bridged terminals in the 1B bank. [Sweep arms for homing banks are equipped with bridging contacts, whereas sweep arms for all other banks are equipped with non-bridging contacts—as in the Fig. 16 system.] Closing of the unit 796 switch elements also establishes a connection (via a second of said switch elements) between ground and the wire that runs to the self-interrupter switch in U3 unit 741, so that switch 740 will step on a self-interrupting [homing] basis as long as unit 796 remains activated. When the [alternative] 1B bank sweep arm reaches step 1 [of the next cycle], the connection between ground and the grid wire of unit 796 is broken at the 1B bank, and this leads to a deactivation of unit 796, with consequent [effective] unlocking of that unit through the opening of its switches.

At step 16, an activation of unit 796 would lead to the placing of cut-off biasing potential on tentative—ground wire 734, as the result of the establishment of a [comparatively very low-resistance] connection between that wire and ground through a cut-off biasing battery, wire 767, and a third switch element of unit 796; and units that were locked in through connections established between their lock-in wires and wire 734 will thus be unlocked. [To make doubly sure that no unit remains locked in through wire 734 at the start of a new stepping-switch cycle, cut-off biasing potential is also applied to said wire at step 1, by connecting said wire to ground through 3B1, 2B1, wire 767, and the cut-off biasing battery last mentioned.] If unit 707 unlocks (in the described fashion) as the result of a faulty synchronization check at step 16, the opening of switch 758" (which would normally have been closed, and locked in, at step 7) will prevent the activation, at step 18, of U2 unit 758 (or any corresponding U2 unit that would otherwise be activatable at step 18 via switch 758"). Thus, if the synchronization check at the 16th step of any receiver is faulty, that receiver will home to its step 1 for the next cycle, while leaving associated combination-unit light-spot projectors undisturbed, and units which were locked in in the course of the cycle will be unlocked and allowed to return to their initial condition, in readiness for the next cycle.

Any activation of U2 unit 796 will lead to the activation of slow-release, full-pulse relay 797, as the result of the closing of a fourth switch element of unit 796, to complete a circuit from ground to ground through said switch element, the coil of relay 797, and a battery. Such activation will lead to the opening of the normally-closed switch elements of relay 797, to stop the transmission of $F_1$ pulses from wire 991 to wire 791 (via one of said elements), to stop the transmission of $F_2$ and $F_3$ pulses from wire 992 to wire 792 (via a second of said elements), and to break the connection (normally established through a third of said elements) between U3 unit 741 and drive-bank terminal 4B—whereby to avoid any false, or abortive, operations while homing is in progress, and to cause switch 840 to home also, in a manner now to be described.

The switch elements of slow-release relay 801 will remain "operated" during the normal interval between pulses, but if one, or more, pulses are missed, said switch elements will be released, to extinguish lamp L1 (as a result of the breaking the lamp circuit by the opening of one of said elements), and to establish a connection between ground and homing-bank terminal 1B' (via one of said elements, which closes only when relay 801 is inactivated). At any step other than step 1 [of switch 840], such a grounding of the 1B' bank terminal will lead to the activation of U2 unit 896, to operate that unit's switches, one of which switches, on operation, breaks the normal connection between ground and the A. C. input side of the U1 unit in U3 unit 841 and establishes a connection between ground and the self-interrupting switch wire of unit 841, with the result that switch 840 is led to advance on a self-interrupting [homing] basis as long as unit 896 remains activated. Thus, if relay 801 is left inactivated for a sufficient time, switch 840 will home to its [alternative] step 1 position, and in the process, the operation of a second unit 896 switch will break the normally-established connection between ground and wire 858 (via resistance 837), whereby to unlock any units, such as units 850 and 851, which may have been locked in through connection of their lock-in wires to wire 858.

In addition to automatic homing resulting from a faulty synchronization check at step 16, homing operations, similar to those described, can be inaugurated at any step (except step 1) by closing push-button 799 momentarily. Such a closing activates unit 796 by establishing a connection between ground and the grid wire of that unit (via switch 799, wire 766, and terminals $1B_2$ through $1B_{18}$ bridged together), and from there on, a train of operations takes place in a manner already explained. Note that such a closing of switch 799 also serves to home switch 840 (in the described fashion) to its step 1, as the time delay in the release of the switch elements of slow-release relay 797 (after the deactivation of that relay) is made sufficiently great to permit switch 840 to complete its homing operations (even from its step 2) before relay 801 is reactivated as the result of reestablishment of $F_1$ pulses in wire 791. An appropriate time delay may be obtained in relay unit 797 by employing a conventional vibrating-reed-type relay. Relay unit 797 is modified by the inclusion of a full-pulse release means in order to insure the proper initiation of a new stepping-switch cycle (at the end of homing operations) in the event that switch 701 happens to be closed at the conclusion of said homing operations.

Thus, at any time, and without disturbing previous settings of light projectors in the combination units, a home-station operator can fully prepare both a receiver and its associated remote station for a new stepping-switch cycle (including all necessary unlocking) by merely giving a push-button switch, such as switch 799, a brief push, and the [temporary] extinguishing of lamp L1 will apprize the remote-station operator that preparatory operations are probably in progress.

The remote-station operator may sometimes want to home switch 840 to its step 1 without waiting for a cessation of $F_1$ pulses in wire 791, and for this purpose, the switch elements of relay 801 are made operable by means of a hand key (in addition to being operable by the relay magnet). To effect homing of switch 840 under such circumstances, the operator would throw said key to its righthand [Fig. 28] limiting position and hold it there (in opposition to the pull of the relay magnet) until homing operations stopped. The breaking of the connection between terminal $2B'_7$ and unit 807 (by means of the opening of a switch element of unit 896) practically eliminates the possibility of making a false reading [with reader 200] in the course of such a homing.

Data-transmission verifying means

Figure 29 shows how the system illustrated in Fig. 28 can be expanded (still in abridged form) to include means for verifying the transmission [from a transmitter to a receiver] of code-number "digits," and for preventing final actuation of the associated calculator-drive unit, in the event that errors are present; said means acting in cooperation with the additional receiver means shown dotted in the lower portion of Fig. 27, for this purpose. The inclusion of data-transmission-verifying ("checkback") means is effected without altering the means, circuits, connections, or mode of operation, of the Fig. 27–28 system, except for the addition of new circuits, units, and elements, and a modification of the circuit (and, abnormally, the operation) at step 16.

Stepping switch 840' [Fig. 29] is switch 840 [Fig. 28] with one additional [6B'] bank: U2 unit 850' is unit 850 with an additional single-pole-double-throw set of switch elements: and U2 unit 851' is unit 851 with an additional single-pole-double-throw set of switch elements. The grid wires of two new U2 units, 853 and 854, are respectively connected to terminals $6B'_{13}$ and $6B'_{14}$, and the lock-in wires of those units are connected to wire 858. Each of the units 853 and 854 has an external single-pole-double-throw set of switch elements—the double-throw terminals of the unit 853 set being respectively connected to the corresponding double-throw terminals of the unit 850' set, and the double-throw terminals of the unit 854 set being respectively connected to the corresponding double-throw terminals of the unit 851' set. Thus, if units 850' and 853 are either both activated, or both unactivated, a connection is established between the single-pole terminals of said sets of switch elements (in units 850' and 853), whereas no such connection is established if one of said units is activated while the other is not. Similarly, a connection is established between the single-pole terminals of said sets of switch elements in units 851' and 854 if those units are either both activated, or both unactivated, but not if one of those units is activated while the other is not.

The single-pole terminals mentioned in the preceding paragraph are connected as follows: wire 892 is connected to the terminal in unit 850', the terminals in units 853 and 854 are connected together, and the terminal in unit 851' is connected to terminal $5B'_{16}$—the former [Fig. 28] direct connection of wire 892 to terminal $5B'_{16}$ being omitted.

The 6B' bank terminal is connected through the D. C. output side of U1 unit 833 and a cut-off biasing battery (in series) to ground; the A. C. input terminals of unit 833 are respectively connected to wire 897 and to ground; and the components of unit 833 are so arranged and adjusted that when that unit is activated by the receipt of an $F_2$ pulse, the potential of terminal 6B' rises more than enough to reach the potential required to activate a U2 unit.

The grid wires of U2 units 750' and 751' [Fig. 27] are respectively connected to terminals $6B_{10}$ and $6B_{11}$; terminals $5B_{13}$ and $5B_{14}$ are connected through respective initially-open switch elements of those units to wire 892; and the lock-in wires of those units are connected to tentative-ground wire 734.

Operation of the check-back means will now be explained in connection with the normal stepping-switch cycle for the Fig. 27–28 system previously described. Normally, all previously outlined operations will take place exactly as they did before, but a few additional units may also be operated in the course of the cycle. Thus, at step 10, if unit 850' was previously activated (and locked in) by reading operations, unit 750' will be activated [to close its switches] at the same time that [previously described] unit 750 is activated, but whereas the activation of unit 750 would be momentary, unit 750' would lock in. If unit 850' was not activated at the time of reading, then units 750 and 750' would both remain unactivated. In this way, the code-number digit that was set up in unit 850' is transmitted to, and set up (and held) in, unit 750', at the same time that the appropriate rocker [in unit 601] is set to a position corresponding to the same digit. Similarly, at step 11, the digit that was set up in unit 851' is transmitted to, and set up (and held) in, unit 751', at the same time that another appropriate rocker [in unit 601] is set to a position corresponding to that digit.

At step 13, if unit 750' was activated at step 10, a rectified $F_2$ pulse will [normally] reach, and activate, unit 853 (via wire 792, 5B, 5B$_{13}$, a unit 750' switch, wire 892 [Figs. 27–28], filter 832 [Fig. 28], wire 897 [Figs. 28–29] (the broken-away connection to wire 897 that immediately follows filter 832 in Fig. 28 represents the wire-897-connection to the input of unit 833 in Fig. 29)], U1 unit 833, 6B', and 6B'$_{13}$), but if unit 750' was not activated at step 10, unit 853 will not be activated at step 13. Upon activation, unit 853 will lock in, and it can be seen that the switch settings then held by units 850' and 853 should be in agreement [as both settings correspond to the code-number digit transmitted to units 750, 750', and the associated rocker], if transmission (both ways) has been normal.

At step 14, by a process exactly analagous to that just set forth (but involving terminals 5B$_{14}$ and 6B'$_{14}$, and a unit 751' switch, instead of terminals 5B$_{13}$ and 6B'$_{13}$, and a unit 750' switch), the switch setting of unit 854 will be made to agree with the switch setting of unit 851' [both settings corresponding to the code-number digit transmitted to units 751, 751', and the associated rocker], if transmission has been normal.

By the time step 16 is reached, a normal connection will have been established between wire 892 and terminal 5B'$_{16}$ (via switch elements of units 850', 853, 854, and 851' in series), and normally, such a connection will serve as a complete substitute for the direct connection between wire 892 and terminal 5B'$_{16}$ shown in Fig. 28—leaving the normal stepping-switch cycle unaffected by the substitution. However, if unit 853 fails to agree with unit 850' [at step 16], or if unit 854 fails to agree with unit 851', or if there is lack of agreement in both cases, there will be no connection between wire 892 and terminal 5B'$_{16}$ at step 16, and consequently, U1 unit 716' will receive no rectified $F_3$ pulse at that step. Lack of activation of unit 716' at step 16 will lead to a sequence of events that has already been described in connection with faulty synchronization, under the headings, "Synchronization check," and "Homing circuits," and as a result, the presumably false data transmitted will not be utilized to disturb the light-spot projector in the then associated combination unit.

U2 units employed in the check-back circuits are unlocked, in transmitter 811, in the same way, and at the same time, that unit 850' is unlocked; and in receiver 911, in the same way, and at the same time, that unit 707 is unlocked; either in the course of a normal stepping-switch cycle, or in the course of homing operations—as previously described.

The check-back scheme illustrated in Figs. 27 and 29, can evidently be extended to cover any desired number of code-number digit places. In the unabridged Fig. 31 system, nine check-circuit steps, in addition to steps 13 and 14 [Figs. 27 and 29], are included in the stepping-switch cycle, and these nine step terminals, together with the respectively associated U2 units and appropriate connections, are all symbolized, insofar as receiver 911 is concerned, by terminal 5B$_{15}$. Similarly, in Fig. 29, terminal 6B'$_{15}$ symbolizes the respectively related nine step terminals, together with the respectively associated U2 units and appropriate connections, in the transmitter—the dotted break in the wire extending from unit 851' to terminal 5B'$_{16}$ being used to indicate that, after weaving through the two pairs of interconnected single-pole-double-throw switches illustrated, the circuit path from wire 892 also weaves, in an analagous fashion, through the remaining nine pairs of single-pole-double-throw switches, all in series, before reaching terminal 5B'$_{16}$.

If the apparatus is in good working order, the chance of getting a fortuitous check through the check-back circuits at step 16 (as a result of two offsetting errors in the same stepping-switch cycle) would appear to be very small indeed—it being remembered that, in addition to the requirement of agreement between the settings of the two U2 units associated with each code-number digit place in the transmitter, switches 740 and 840 must reach step 16 in synchronism, in order to prevent homing.

[While the check-back features specifically illustrated in the figures herein are substantially limited to the checking of data transmission from the transmitter to the receiver (and back), the repeat-back principle could be extended further toward the initial and/or final components of the system (in certain applications) by using units substantially equivalent to those disclosed herein.]

*Miscellaneous notes*

Stepping-switch contact life should be comparatively very long, as the currents carried by said contacts are, in nearly every case, practically negligible.

As the data transmitted between transmitters and receivers in the systems described in connection with Figs. 27–31 are of the type which can be sent over ordinary telephone lines (including repeaters), the remote stations can be placed at any desired distance from the home station, and the number of lines extending from a remote station to the associated home-station receiver could be reduced to one, by one skilled in the art, by employing additional, substantially conventional filters and hybrid circuits, and by making minor circuit changes.

Light spots projected onto chart 503 by the projectors in the several combination units could be distinguished from one another through the use of different colors, by giving the spots identifying shapes, or by causing the spots to pulse in some individually characteristic way. Even though the ultimate change in a light-spot position may be small, in shifting from one "calculated" position to the next, the nature of the calculator-drive units is such that the spot involved may move about rapidly, and through substantial distances, during the brief time that such a shift is being effected. This may be advantageous, in that it calls attention to the particular spot that is being shifted, but otherwise, means can be added, which will turn off, for the duration of the shifting interval, the lamp in any projector that is being shifted.

In practice, it would probably be helpful to incorporate certain testing means directly into the systems.

A few signal lamps and alarms are indicated in the illustrative figures, but others can be added easily, if found desirable. Since a normal stepping-switch cycle lasts only a few seconds, operators would soon know that something was wrong if two associated stepping switches waited (for example) at step 7 because of a faulty selector-switch setting, but conventional time-delay-alarm means (which would operate after a predetermined number of seconds of such waiting) could be added, to give definite notice of such a fault. A home-station operator could then "home" the transmitters and receivers involved, to prepare them for a new cycle, by briefly closing a switch like switch 799. Time-delay means could also be employed to institute homing operations automatically, in the event of excessive waiting at any predetermined points in the cycle.

Summary of events taking place in the course of a normal stepping-switch cycle in a base-and-two-bearing-angle system.

NOTE.—The cycle here outlined is abridged to fit the operation of units shown in Figs. 27, 28, and 29, and comprises only one of a plurality of cycles utilized in the operation of unabridged systems like those shown in Figs. 30-31. Figure 28 will be considered to be extended and modified in accordance with Fig. 29. Operations in the units shown in Figs. 27a and 28a so closely parallel operations in the corresponding units shown in Figs. 27 and 28 that no useful purpose would appear to be served by making more than very brief clarifying references to a few of the operations of the former units that take place at certain points in the cycle.

*Notation.*—$Cm$=Combination unit [e. g., unit 901—see Figs. 17, 20, 23-31]; $F_1$, $F_2$, $F_3$=Pulses of three different frequencies; FP=Full-pulse; $Hm$=Home station; L=Lamp; $Mg$=Rocker-setting, or valve-setting, magnet unit; $Rc$=Receiver [e. g., receiver 911, at $Hm$]; $Rm$=Remote station [e. g., station 921]; $Tm$=Transmitter [e. g., transmitter 811, at $Rm$]; U1=U1 unit, etc.; $>$=Sent out by $Rc$ and received by $Tm$; $<$=Returned by $Tm$ to $Rc$; *=The impulse that leads to stepping; ?=Contingent signal, dependent on code-number digit. "Activate" is here used to mean "rendered active," or "put into operation," and will be used in a sense broad enough to cover an indirect activation: "actuate" may be used in a similar sense, where physical motion is involved.

*Initial conditions.*—It will be assumed that all switches, and other components [except the symbolic switches in units 370, Figs. 28 and 28a], are in the positions illustrated in Figs. 27-29, and that the switches of relays 797 [Figs. 27 and 27a] have just closed (on a full-pulse basis) [as at the end of previous homing operations].

| Step No. | Home Station—$Hm$ [Figs. 27—27a+] | Step No. | Remote Station—$Rm$ [Figs. 28—29+] |
|---|---|---|---|
| 1 | $F_1>$. | 1 | $F_1>$ activates slow-release relay 801 to light L1=$Hm$ on line. [801 remains activated as long as $F_1$ pulses are received normally.] $F_2>$*. |
| 2 | $F_2+F_3>$* by FP switch 701=$Hm$ ready. $F_1>$. $F_1<$*. | 2 | $F_1>$. L2 lights [by local $Tm$ circuit, at step 2 only] to show "$Hm$ ready." $F_1<$* by FP switch 842 starts sequence of steps in which $Rc$ is brought into operative association with the particular $Cm$ for which selector switch 844 is set. |
| 3 | $F_1>$*. [No $F_1<$, because of switch 844 setting. (Note, however, that in the system shown in Figs 27a and 28a, $F_1<$ activates U2 703a to "connect" $Rc$ 912 to the phi-drive side of unit 900 in $Cm$ 901, and to place "lock-in potential" on wire 734a.)] | 3 | $F_1>$*. [No $F_1<$, because of switch 844 setting. (Note, however, that in the system shown in Fig. 28a, $F_1<$ here, via selector switch 844a, as set by $Rm$ operator.)] |
| 4 | $F_1>$*. $F_1<$ activates U2 704 to "connect" $Rc$ 911 to the $\theta$-drive side of unit 900 in $Cm$ 901, and to place "lock-in potential" on wire 734. | 4 | $F_1>$*. $F_1<$ via selector switch 844, as set by $Rm$ operator. |
| 5 | $F_1>$*. | 5 | $F_1>$*. |

[In an unabridged system, (four) more selecting steps, like steps 3 and 4, are introduced here.]

| Step No. | Home Station—$Hm$ | Step No. | Remote Station—$Rm$ |
|---|---|---|---|
| 6 | $F_1>$. $F_1<$*. | 6 | $F_1>$. Pause here, until $Rm$ operator is following target steadily with his direction-finding means: then $F_1<$* by FP switch 846. |
| 7 | $F_1>$. $F_2+F_3$ operates U2 707 (locally), but no $F_2+F_3>$ until paired mate of U2 707 in cooperating paired receiver [i. e., U2 707a (Fig. 27a)] has operated: then relay 707' operates, and $F_2+F_3>$ (via 5B$_7$, 707', wire 892). $F_2<$*. [Analogous operations take place in the paired receiver.] | 7 | $F_1>$. $F_2>$ [after slower of two paired $Tm$-$Rc$ systems has reached its 7th step] activates U4 370 to start reading cycle in coder 821 (via filter 832, 3B'$_7$, 2B'$_7$, U1 807); and $F_2<$* (via 5B'$_7$). Bell rings in U4=reading cycle in progress. In the reading cycle, which may cover several pulses, a "bearing-angle code number" is "set up" in U2 850', U2 851' . . ., [Fig. 29]. [Analogous operations take place at this tim,e in the paired $Rm$.] |
| 8 | $F_1>$. $F_2+F_3>$. $F_2<$*. U2 748 activated (via 3B$_8$—2B$_8$ local circuit) at this step only, to zeroize $\theta$-side of $Cm$ 901 (via activation of magnet 708). [The phi-side of $Cm$ 901 is similarly zeroized (via activation of magnet 708').]. | 8 | $F_1>$. $F_2>$. No $F_2<$ till end of reading cycle: then $F_2<$* [FP] (via U4 370, 5B$_8$'). |
| 9 | $F_1>$*. | 9 | $F_1>$*. |
| 10 | $F_1>$*. $F_1<$? determines the setting of 1st-digit rocker in $\theta$-drive side of $Cm$ 901 (via U2 750, $Mg$ 710), and also the setting of check-back U2 750'. | 10 | $F_1>$*: $F_1<$? [$F_1<$, if 1st code-number digit set up in U2 850', is "1": No $F_1<$, if that digit is "0".] |
| 11 | $F_1>$*. $F_1<$? determines the settings of the 2nd-digit rocker, and U2 751'. | 11 | $F_1>$*: $F_1<$? [$F_1<$, if 2nd code-number digit, set up in U2 851', is "1".] |
| 12 | $F_1>$*. | 12 | $F_1>$*. |

[In an unabridged system, (nine) more data-transmitting steps, like step 10, are introduced here.]

| Step No. | Home Station—$Hm$ | Step No. | Remote Station—$Rm$ |
|---|---|---|---|
| 13 | $F_1>$*. $F_2+F_3>$? [$F_2+F_3>$, if "1" is set up in U2 750': otherwise, no $F_2+F_3>$.] | 13 | $F_1>$*. $F_2>$? [$F_2>$ would activate (i. e. set up "1" in) U2 853 (Fig. 29), via filter 832 (Fig. 28).] |
| 14 | $F_1>$*. $F_2+F_3>$? [$F_2+F_3>$, if "1" is set up in U2 751'.] | 14 | $F_1>$*. $F_2>$? [$F_2>$ would set up "1" in U2 854.] |
| 15 | $F_1>$*. | 15 | $F_1>$*. |

[In an unabridged system, (nine) more check-back steps, like step 13, are introduced here.]

| Step No. | Home Station—$Hm$ | Step No. | Remote Station—$Rm$ |
|---|---|---|---|
| 16 | $F_1>$* would activate U2 796 ("via" U1 716, 3B$_{16}$, 2B$_{16}$, 1B$_{16}$) to lead to homing, unless U1 716' is activated at the same time. $F_2+F_3>$ (via 5B$_{16}$). Check Step. If synchronization and transmission have been normal, then $F_3<$ to activate U1 716' (via filter 733): otherwise U1 716' will not be activated, and homing operations will ensue. | 16 | $F_1>$*. [Remember that the Fig. 29 extension and modification of Fig. 28 is being considered here.] $F_2+F_3>$: and $F_2+F_3<$ (via 5B'$_{16}$ [Fig. 29]) if, and only if, switch 840' is at step 16 and there is agreement between the settings of coder U2 units [e. g., U2 850' and U2 851'] and respectively matched check-back U2 units [e. g., U2 853 and U2 854.] |
| 17 | $F_1>$*. | 17 | $F_1>$*. |
| 18 | $F_1>$. $F_1<$ activates U2 758 (via 6B$_{18}$, U1 730), but does not cause switch 740 to step. When the cooperating (paired) receiver (normally) reaches its 18th step, U2 758' will also be activated, and this will lead to activation of shaft-actuating units 718 and 718', to bring about operation of $Cm$, and cause $Cm$ to Indicate the New Target Position. Switches 736 and 736' are opened by the respectively associated valve-setting mechanisms (controlled by U2 718 and U2 718') after the respectively associated valves have been set, and as soon as both of said switches are opened, wires 735, 734, and 734a are no longer connected to ground through resistor 737, and all U2 units locked-in via those wires are unlocked. As a result, many units are allowed (at least, in effect) to return to their initial conditions, and release of U2 707 and 707a permits a local $F_2$ pulse (via 4B$_{18}$) to cause each of the switches 740 [Figs. 27 and 27a] to make its final step—leaving $Cm$—$Rc$—$Rm$ ready for the next cycle. | 18 | $F_1$*: $F_1<$. Final step of this switch. All locked-in U2 units are unlocked at this step by placing cut-off bias on wire 858 (via local circuit through 2B'$_{18}$—3B'$_{18}$). |

Based on the foregoing disclosures, I claim:

1. A selective, multiple-unit, remote-control and calculating system, comprising, in combination: a pulse generator for continually generating control pulses for use throughout said system; a plurality of adjustable coding means for respectively setting up within said system coded representations of the magnitudes of primary quantities of arbitrarily preselected character; pulse-controlled receiving means; means, operatively connected to said pulse generator and controlled by said coding means, for transferring said coded representations in the form of coded pulse sequences from said coding means to said receiving means; a plurality of calculating means, controlled by said receiving means; a plurality of movable terminal devices, the position of each terminal device being independently establishable by one of said calculating means in accordance with a predetermined mathematical function of the magnitudes of two of said primary quantities; selecting means, controlling the circuit paths between said coding means and said calculating means, for establishing alterable effective associations between selected ones of said calculating means and respective preselected pairs of said coding means; pulse-controlled check-back means, partly comprised in said coding means and partly comprised in said receiving means, for testing the accuracy of said transferrals of said coded representations; and activating means, controlled by said check-back means, for activating said calculating means to shift said terminal devices to said defined positions in the event that the testing performed by said check-back means indicates that said transferrals are accurate, but not otherwise—the verified activations respectively related to the shiftings of the several terminal devices being independent of each other.

2. In apparatus comprising two prime movers, and a terminal device to be positioned in predetermined relation to the positions simultaneously occupied by said prime movers at a particular instant, the combination comprising: a pulse generator; two activatable reader units, operatively connected to said generator and respectively operatively connected to said prime movers, each comprising a plurality of coding switch means and a plurality of coding circuits respectively controlled thereby, and each reader unit comprising prime-mover driven coding-switch control means for closing selectively, at substantially the instant of reader-unit activation, such only of said switch means as will establish within said reader unit a coded representation of the position then occupied by the prime mover with which the reader unit is associated; activating means, operatively connected to both of said reader units, for activating both of said reader units simultaneously; terminal-device positioning means, operatively connected to said reader units and to said terminal device; transmitter means, comprised in said reader units and comprising said coding circuits and switch means, for conveying from said generator, via said coding circuits and switch means, to said positioning means, respective sets of pulses coded at said two reader units by the settings of said coding switch means to correspond, respectively, with the said coded representations of prime mover positions; and calculator-and-drive means, comprised in said positioning means and controlled by said coded sets of pulses from both of said reader units, for moving said terminal device according to said predetermined relation.

3. In an automatic remote control system including a home station and a remote prime mover, the combination comprising: an activatable reader unit, operatively connected to said prime mover, including coding means for setting up within said reader unit a binary-number-coded representation of the position occupied by said prime mover at the time of activation of said reader unit; receiving means in said home station, including a plurality of pulse-responsive control units respectively settable to represent the values of the digits in the several digit places of a binary number; a pulse generator in said home station, for generating periodic pulses continually; transmitting means, operatively connected to said generator and said control units, and connected to, and controlled by, said coding means, adapted to transmit pulses from said generator to said coding means and to return and selectively direct to said control units certain only of said pulses in a code controlled by said coding means to set up within said receiving means a binary-number-coded representation of said prime mover position; a decoding-and-drive device, in said home station, comprising a plurality of hydraulic units and a source of hydraulic power therefor, each hydraulic unit being operatively associated with one of said control units and thus with a specific binary-number digit place in said coded representation, and each hydraulic unit including a cylinder, a piston movable therein, and a control valve therefor settably controlled by the control unit associated therewith to drive the piston to one end or the other of its cylinder, depending upon the setting of said control unit; a cumulative drive mechanism, also comprised in said device, comprising a plurality of interconnected planetary-gear units respectively associated with said hydraulic units, each of said planetary-gear units comprising (a) a primary drive member driven by the piston of the hydraulic unit associated therewith, (b) a secondary drive member driven by the next preceding planetary-gear unit, except in the case of the first unit, where the secondary drive gear is held stationary, and (c) a driven member, driven independently by each of the drive members (a) and (b), said driven member being connected to drive the secondary drive member of the next following planetary-gear unit except that the last driven member is the ultimate driven member—the gear ratios and piston strokes being predetermined to make the stroke of each piston half as effective to produce motion of said ultimate member as the stroke of the next following piston, thus to make conditions appropriate for the decoding of a binary-number-coded representation, and said control units being properly associated with said hydraulic units in the appropriate binary-number-digit-place order to effect such decoding; whereby to cause said ultimate driven member to move to a position corresponding to the position that was occupied by said prime mover at the time the latter position was read.

4. In a target-tracking-and-positioning-indicating system in combination: first, second, and third tracking instrumentalities arranged to determine successive bearings of selected targets, each instrumentality including a transmitter arranged to pass along bearing information; first, second, and third computer-indicators, each arranged to indicate the position of a selected target from bearing information furnished by two of said instrumentalities taking simultaneous bearings on the same target; connections joining the first of said computer-indicators to the first and second of said instrumentalities, the second of said computer-indicators to the first and third of said instrumentalities, and the third of said computer-indicators to the second and third of said instrumentalities; and selector means, at, and operatively associated with, each instrumentality, arranged to selectively direct signals, in each case, from one of said instrumentalities to either of the computer-indicators to which such instrumentality is connected.

5. A system comprising first and second signal-coding stations, each including means for transmitting coded signals; a plurality of terminal devices; a plurality of control units, respectively operatively associated with said terminal devices, and also respectively operatively associated with both of said signal-coding stations and responsive to signals from said signal-coding stations, each operative to position the terminal device with which it is associated in response to the combined effect of coded signals received from both of said signal-coding stations; first selector means, associated with said first signal-coding station, selectively settable to direct signals from that station to any selected one of said control units; second selector means, associated with said second signal-coding station, selectively settable to direct signals from that station to any selected one of said control units; and a plurality of circuit means, respectively partly included in said control units, each operatively associated with, and responsive to, both of said signal-coding stations, and each including first and second circuit-closing elements respectively controlled by said first and second selector means, for rendering effective, to perform its terminal-device-positioning function, only the control unit selected by respective settings of both of said selector means.

6. In a system comprising a home station; first and second activatable signal-coding-and-transmitting units, each adapted to transmit coded signals representing a "reading" of a variable quantity to said home station on being activated; and a terminal device in said home station, movable under the control of such coded signals received from said units to positions representing, in the case of each such position, combined effects of such coded signals from both of said units; the combination of: a first manually operable signal-controlling means associated with said first unit for transmitting to said home station a "ready" signal upon operation of said first signal-controlling means by the operator thereof to signify that said first unit is ready to be activated to start a cycle of operations; a second manually operable signal-controlling means associated with said second unit for transmitting to said home station a "ready" signal upon operation of said second signal-controlling means by the operator thereof to signify that said second unit is ready to be activated to start a cycle of operations; activation-synchronizing means in said home station, operated in part in response to one of said "ready" signals and in part in response to the other of said "ready" signals, for transmitting activating signals simultaneously to both of said units upon, but not before, receipt of both such "ready" signals indicating that said units are both ready to be activated; and cycle-controllers respectively included in said first and second units for initiating respective cycles of operation in said first and second units in response to receipt of such activating signals.

7. A target-tracking-and-position-indicating system, comprising, in combination: three tracking instrumentalities, A, B, and C, each arranged to determine successive bearings of selected targets, and each including an automatic transmitter arranged to pass along signals comprising bearing information; two preadjustable automatic computer-indicators, X, and Y, each automatically controlled by bearing-information signals representing simultaneously obtained bearings on a selected target received from a preselected pair of said instrumentalities, and each adapted to indicate automatically, after being appropriately preadjusted for cooperation with the specific pair of instrumentalities by which it is controlled, the position of such selected target; interchangeable plug-in connecting means, respectively joining each of said computer-indicators to any preselected pair of said instrumentalities, computer-indicator X being joined to, and preadjusted to cooperate with, instrumentalities A and B, and computer-indicator Y being joined to, and preadjusted to cooperate with, instrumentalities A and C; and selector means, at, and operatively associated with, a said instrumentality (A) that is connected to both of said computer-indicators, arranged to selectively direct signals from said instrumentality (A) to either of said computer-indicators without altering the joinings effected by said interchangeable plug-in connecting means.

8. In apparatus comprising a movable prime mover: coding means, including at least one movable coding member carrying a coding pattern; intermediate means, driven by said prime mover, adapted to drive said coding member to positions normally bearing a precisely predetermined relationship to respectively corresponding positions of said prime mover; resilient coupling means, included in said intermediate means, sufficiently yielding to permit momentary halting of the movement of said coding member without halting the movement of said prime mover; activatable reading means, operatively associated with said coding member, including (a) means adapted to halt momentarily the movement of said coding member upon activation of said reading means, (b) a plurality of coding-switch means selectively settable to represent the particular portion of said coding pattern associated with the position in which said coding member is halted, and (c) a plurality of coding-switch control means adapted to read said coding-pattern portion upon activation of said reading means and to selectively set said coding-switch means under the control of such reading; and activating means, operatively associated with said reading means, operable to cause said reading means to make a reading; whereby to establish within said reading means a coded representation of the position occupied by said prime mover at the time a reading is made, without interrupting the movement of the prime mover.

9. In automatic registering apparatus, the combination comprising: two relatively movable members, registerable in any selected one of a plurality of predetermined relative positions; braking means, operatively associated with said members, activatable to reduce the speed of relative movement of said members; registering means, operatively associated with said members, activatable to bring said members from the relative position that they occupy at the time of activation into one of said predetermined relative positions near said previously occupied relative position; registration-assuring means, forming part of said registering means, for shifting said members out of relative positions where jamming might prevent proper registration in the absence of such shifting; and activating and sequence controlling means, operatively associated with said braking means, said registering means, and said registration-assuring means, for first activating said braking means, then activating said registering means, and releasing said braking means, then activating said registration-assuring means, then releasing said registration-assuring means, and finally releasing said registering means.

10. In a control system, including light-responsive means, and light-projecting means for directing light toward said light-responsive means along a predetermined path, the combination comprising: a primary member, disposed in said light path and divided into light-passing and light-blocking coding sections, a secondary member, and reading means, comprising said light-responsive and light-projecting means, said primary and secondary members being movable relative to said reading means at different predeterminedly-related velocities; means, comprised in said reading means, for reading the code of the primary-member section that is in effective alignment with said reading means at the time of reading; and prismatic means, operatively associated with said secondary member and controlled thereby for movement into said light path to produce deflections thereof when said secondary member is in certain predetermined positions, for abruptly blocking the reading of one section and for abruptly rendering the next section readably effective as the boundary between these two sections passes through the effective alignment position.

11. In a circuit controlling system, the combination comprising: a plurality of circuits to be controlled; circuit-selecting means, divided into a plurality of circuit-controlling sections having predetermined circuit-controlling characteristics; circuit-controlling means, comprising two sets of circuit-controlling elements, said elements being connected together in pairs, each of said pairs including one element from each set, and the elements in each of said pairs being operatively associated with a respective one of said circuits, said circuit-controlling means being operatively associatable with any selected one of said 17. In a remote control system comprising a plurality of operatively associated stations, the combination comprising: pulse-generating means for continually sending out a succession of discrete periodic pulses of the type in which each pulse in said succession is separated from the next by an effectively inactive interval having substantial length relative to the length of time that each pulse is actively sent out; coding-and-transmitting means, including pulse-controlled progression-controlling means, in one of said stations for receiving said periodic pulses from said generating means and for progressively and selectively passing on to another of said stations, under the coordinating control of said progression-controlling means, only certain individually selected ones of said pulses in the form of a digital-type coded sequence wherein each pulse passed on has a predetermined effective operative significance dependent upon the position of the pulse in the sequence, the progression of said progression-controlling means being subject to the control of pulses from said succession of pulses sent out by said pulse-generating means; and pulse-responsive means in said latter station controllable, at least in part, by said coded sequence of pulses.

18. In the operation of a remote control system, comprising a home station and at least one remote station, in which pulses are to transfer operation-controlling signals from one station to another, the method which comprises: continually sending out from the home station discrete periodic master pulses for use throughout the entire system, said master pulses being of the type in which each pulse sent out is separated from the next by an effectively inactive interval having substantial length relative to the length of time that each pulse is actively sent out; transmitting said master pulses to a remote station; utilizing said master pulses to coordinate signal-transmitting and signal-receiving operations performed at said stations; coding said pulses at said remote station by progressively and selectively returning to the home station only certain individually selected ones of said pulses in the form of a code-number-defining sequence of predetermined length in which a particular code number is characterized by the presence or absence of one of said master pulses at each digit place therein, such presence-or-absence being separately determined at each digit place; and operating a coded-pulse-sequence-responsive home-station device under the control of, and in accordance with the coded information contained in, said sequence.

19. In a control system, including a terminal device movable to an arbitrarily selectable position defined in terms of polar coordinates, the combination comprising: a pulse generator for generating control pulses continually; a plurality of coding circuits, divided into an *r*-set and a *θ*-set, connected to said generator; settable circuit-continuity controlling means in each of said coding circuits; means for selectively setting the circuit-continuity controlling means for said *r*-set of coding circuits to form, collectively, a coded representation of the length of an arbitrarily selectable radius vector in said polar coordinates; means for selectively setting the circuit-continuity controlling means for said *θ*-set of coding circuits to form, collectively, a coded representation of the polar-coordinate bearing angle of said radius vector; a plurality of pulse-responsive intermediate lock-in relay units respectively corresponding to said coding circuits; two stepping switches with respective pulse-responsive stepping drives adapted to be automatically advanced in synchronism through a predetermined sequence of steps in response to pulses from said generator; connecting means, including said coding circuits and stepping switches, for progressively connecting each of said coding circuits to its corresponding intermediate relay unit, and thus for causing said intermediate relay units to assume settings respectively corresponding to the settings of said circuit-continuity controlling means by conveying pulses from said generator to said intermediate relay units under the control of said circuit-continuity controlling means; a plurality of ultimate lock-in relay units respectively corresponding to, and controllable by, said intermediate relay units, said ultimate units thus making up an *r*-set and a *θ*-set indirectly and respectively corresponding to the *r*-set and *θ*-set of coding circuits; terminal-device positioning means, including *r*-drive means controlled by said *r*-set of ultimate relay units and *θ*-drive means controlled by said *θ*-set of ultimate relay units, for moving said terminal device to respective *r* and *θ* polar-coordinate positions determined by the settings of said ultimate relay units; position-check means, including two pulse-responsive position-check control units therefor each connectable to said generator, one via a circuit extending through one of said stepping switches at a predetermined position-check step and the other via a circuit path extending through the other of said stepping switches at a corresponding predetermined position-check step of said other stepping switch, said position-check units being connected in opposition and so balanced as to cause said position-check means to remain passive at said position-check step if, and only if, both of said position-check units are pulse activated at the same time at the predetermined position-check step; transfer means, comprising, and controlled by, three circuits respectively passing through three different step positions of at least one of said stepping switches, for first unlocking said ultimate relay units, then transferring the settings of said intermediate units to said ultimate units, and then unlocking said intermediate units, as said stepping switch progresses through a portion of its stepping cycle subsequent to its position-check step; and means, comprised in said position-check means, for rendering said transfer means inoperative in the event that said position-check means did not remain passive at said position-check step.

20. In a remote control system including a first station, a second station, and a device, in said second station, to be set to a position corresponding to the magnitude of an arbitrarily selectable binary number, the combination comprising: a first plurality of switch means, in said first station, selectively settable to form a coded representation of such a binary number, each switch means being associated with a predetermined digit place in such number, and each switch means being settable to either of two positions to represent the appropriate "0" or "1" in its digit place; a second plurality of switch means, in said second station, respectively corresponding to and controlled by the several switch means in said first plurality of switch means; a third plurality of switch means, in said first station, respectively corresponding to and controlled by the several switch means in said second plurality of switch means, and consequently, also respectively corresponding to the several switch means in said first plurality of switch means; a plurality of checking-switch units respectively associated with and controlled by the switch means in said first and third pluralities of switch means, each unit associated with a particular switch means in said first plurality of switch means being connected by an "0" circuit and a "1" circuit to the unit associated with the switch means at the same binary-number digit place in said third plurality of switch means, and the checking switch in each unit being settable in conformity with the setting of its associated switch means to connect to one or the other of said circuits; an over-all check circuit including said interconnected pairs of checking-switch units and connecting all of such pairs of units together in series to form a circuit in which there will be continuity if, and only if, the setting of each switch means in said first plurality of switch means respectively corresponds to the setting of the switch means at the same binary-number digit place in said third plurality of switch means; and drive means, controlled at least in part by said over-all check circuit, and operable only in the event that continuity has been established in said over-all check circuit, for driving said device to the position defined by said binary number.

circuit-controlling sections to control said circuits in accordance with the characteristics of said selected section; settable association-controlling means, operatively associated with said circuit-selecting means and said circuit-controlling means, for establishing an association between any selected one of said circuit-controlling sections and one of said sets of elements over a predetermined portion of the setting range of said association-controlling means and between said selected section and the other of said sets of elements over another predetermined portion of the setting range of said association-controlling means; and means, comprised in said association-controlling means, adapted to cause the abrupt discontinuance of the association between one section of said circuit-selecting means and one of said sets of elements and at the same time to cause the abrupt initiation of an association between an adjacent section and the other of said sets at predetermined points in the setting range of said association-controlling means.

12. In a remote control system comprising at least two operatively connected stations, the combination of: a pulse generator adapted to generate periodic, alternating-current pulses continually, each "pulse" consisting of more than one full alternating-current cycle; two operatively connected stepping-switch means, respectively comprised in said two stations, synchronously advanceable through a range of steps to progressively establish a plurality of effectively independent circuit paths between said two stations; two pulse-controlled stepping means, operatively connected to said generator and respectively comprised in said two stepping-switch means, adapted to advance both of said stepping-switch means synchronously through said range of steps at the rate of one step for each pulse generated by said generator; selectively settable coding-and-transmitting means in one of said two stations, operatively connected to said generator, adapted to receive said periodic pulses from said generator and to pass on to the other of said two stations, via said circuit paths, certain only of said pulses in the form of a coded sequence; and pulse-responsive means in said latter station, controllable, at least in part, by said coded sequence of pulses.

13. In a remote control system comprising a plurality of remote stations and a home station operatively associated therewith, the combination of: a pulse generator for continually generating periodic pulses; distributing means for conveying said periodic pulses from said generator to said remote stations; first and second coding-and-transmitting means in a first and a second of said remote stations respectively, each for receiving said periodic pulses from said generator and for selectively passing on to said home station, in the form of a digital-type coded sequence representing the selected magnitude of a mathematically independent variable of predetermined character, pulses individually selected from such received pulses, each pulse passed on having a predetermined effective operative significance dependent upon the position of the pulse in the sequence; and an operable terminal device in said home station, including a single element that is controllable in part by such a coded pulse sequence received from said first coding-and-transmitting means and in part by such a coded pulse sequence received from said second coding-and-transmitting means in accordance with a predetermined mathematical function of the two independent variables whose magnitudes are respectively represented by said coded pulse sequences respectively received from said first and second coding-and-transmitting means.

14. In the operation of a system including a first station, a second station, and a pulse signal generator, the method comprising: generating at said generator a series of signal pulses for use throughout the system; transmitting to said first station and to said second station a set of pulses from said series; utilizing pulses from said set individually to define, progressively and synchronously at both of said stations, the digit places in a code number composed of a predetermined number of digits; coding said set of pulses at said second station by selectively allowing to pass along from said generator through said second station to said first station only certain individually selected ones of said pulses in the form of a code-number-defining sequence; and reading at said first station the code number defined by said code-number-defining sequence by appropriately relating the occurrences and absences of individual pulses in said sequence received from said second station to the respectively appropriate code-number digit places defined by said code-number-digit-place-defining pulses from said set of pulses received from said generator by said first station.

15. In the operation of a remote control system, comprising a home station and a plurality of remote stations, in which pulses are to be used to transfer operation-controlling signals from one station to another, the method which comprises continually generating at one point periodic master pulses for use throughout the entire system, transmitting said master pulses to said remote stations, coding said master pulses at said remote stations by selectively passing on to the home station only certain individually selected ones of said master pulses in the form of code-number-defining sequences of predetermined length in which each code number thus defined is characterized by the separately determined presence or absence of a pulse at each digit place therein, and positioning a single member in a home-station device in accordance with the coded information contained in a plurality of said sequences respectively received from a plurality of said remote stations, each sequence in said plurality of sequences representing the magnitude of an indepedent mathematical variable associated with the station that coded it, and the information contained in such sequences being combined to yield such unified end result in accordance with a predetermined mathematical function of at least two different independent variables respectively represented by at least two of such sequences.

16. In the operation of a system in which information representable by a code number composed of digits of only two different kinds is to be transferred from a first station to a second station through the use of a coded set of pulse signals corresponding to such a code number, the method comprising: progressively generating at one point in said system a sequence of pulses, each pulse in said sequence comprising a plurality of full oscillatory cycles; progressively transmitting from said point to both of said stations the pulses of said sequence to define, progressively and synchronously at both of said stations, digit places respectively corresponding to those in said code number; also, as each digit place is thus progressively defined, selectively transmitting a digit-defining pulse from said first station to said second station, over a circuit path at least effectively different from the circuit path followed by the digit-place-defining pulse at that digit place, whenever, and only whenever, the code-number digit associated with the digit place thus defined is a predetermined one of said two kinds of digits, the frequency of oscillations comprised in such a digit-defining pulse being different from the frequency used in the associated digit-place-defining pulse at at least one digit place, and such frequency difference being used at at least said one digit place to differentiate the respective circuit paths to be followed by the digit-defining pulse and the digit-place-defining pulse at that digit place; and reading at said second station the coded information thus transferred from said first station—the presence of a digit-defining pulse at a digit place defined by a digit-place-defining pulse corresponding to the presence at that digit place of said predetermined one of said two kinds of digits in said code number, and the absence of a digit-defining pulse at a digit place defined by a digit-place-defining pulse corresponding to the presence at that digit place of the other of said two kinds of digits in said code number.

21. In the operation of a system in which information representable by a code number composed of digits of only two different kinds is to be transferred from a first station to a second station through the use of pulse signals coded to represent the digits in such a code number, each of said pulse signals comprising a plurality of successive oscillatory waves, the method comprising: transmitting from said first station to said second station a first set of said pulse signals coded in accordance with, and thus to represent, the kinds and arrangement of digits in a preselected code number of the type here specified, and also storing a first reprsentation of said code number at said first station; utilizing said coded first set of pulse signals to set up at said second station a second representation of said code number, and also storing said second representation at said second station; transmitting back to said first station from said second station a second set of pulse signals coded in correspondence with, and thus to represent, the kinds and arrangement of digits in said second representation of said code number; utilizing said second set of pulse signals to set up at said first station a third representation of said code number, and also storing said third representation at said first station; comparing the respectively corresponding digits in the several digit places in said first and third representations of said code number; and transmitting from said first station to said second station a pluse signal comprising a plurality of successive oscillatory waves of a frequency distinguishably different from any frequency used in any of the transmissions previously recited in this claim if, and only if, each digit in said third representation agrees in kind with the respectively corresponding digit in said first representation; whereby to send to said second station information regarding the accuracy of the transmission to it of said code number representation, and whereby to minimize the possibility of accidental improper verification of the accuracy of such transmission.

22. In the operation of a system in which information representable by a code number composed of digits of only two different kinds is to be progressively transferred, within a predetermined cycle of progression, from a first station to a second station through the use of pulse signals coded to represent the digits in such a code number, each of said pulse signals comprising a plurality of successive oscillatory waves, the method comprising: progressively transmitting from said first station, within said cycle of progression, and synchronously receiving at said second station, a first set of said pulse signals coded in accordance with, and to represent, the kinds and arrangement of digits in a preselected code number of the type here specified, and also storing a first representation of said code number at said first station; utilizing said first set of pulse signals to set up at said second station a second representation of said code number, and also storing said second representation at said second station; also within said cycle of progression, progressively transmitting from said second station, and synchronously receiving at said first station, a second set of said pulse signals coded in accordance with, and to represent, the kinds and arrangement of digits in said second representation of said code number; utilizing said second set of pulse signals to set up at said first station a third representation of said code number, and storing said third representation at said first station; comparing the respectively corresponding digits in the several digit places in said first and third representations of said code number; and later, at a check step in said cycle of progression, transmitting from said first station, and synchronously receiving at said second station, an accuracy-check pulse signal comprising a plurality of successive oscillatory waves of a frequency distinguishably different from any frequency used in any of the transmissions previously recited in the claim if, and only if, each digit in said third representation agrees in kind with the respectively corresponding digit in said first representation, and in addition, if, and only if, said check step in said cycle of progression has actually been reached at said first station and at said second station at the same time.

23. In a control system, the combination comprising: a pulse generator for generating control pulses continually; two stepping switches, and respective stepping drive units therefor, and a circuit path extending from said generator to said drive units, said drive units being adapted to advance said stepping switches in synchronism one step each time that said drive units receive a pulse from said generator over said circuit path; an automatic device for performing a predetermined, non-pulse-controlled operation; means, associated with said stepping switches, for causing said device to start performing said predetermined operation at a predetermined step in the advancement of said stepping switches; control means, in said device, for maintaining a discontinuity in said circuit path during the performance of said operation of said device; full-pulse means, operatively associated with said control means and said generator, for maintaining said discontinuity, regardless of the operation of said control means, during such time as a pulse is being received by said full-pulse means from said generator; and means, included in said full-pulse means, for rendering said full-pulse means ineffective by itself to reestablish said discontinuity once said discontinuity has been eliminated; whereby to halt the advancement of said stepping switches while said device is performing said predetermined, non-pulse-controlled operation, and whereby to insure synchronized reestablishment of pulse-controlled stepping of said switches at substantially the end of said operation.

24. In a control system, the combination comprising: a pulse generator for independently generating control pulses for use throughout the system; first and second pulse-controllable devices adapted to progress in synchronism through a predetermined series of steps upon being activated by control pulses of the type independently produced by said generator without regard to the operation of said devices, each control pulse received by said devices leading said devices to progress from one step to the next in said series of steps; operable connecting means for connecting said generator to said devices, said connecting means being selectively settable to either permit or block the flow of control pulses from said generator to said devices; control means, operable at least part of the time free from the control of said control pulses, for initiating a change in the setting of said connecting means; and full-pulse means for preventing at least one of the possible changes in the setting of said connecting means initiatable at a non-pulse-synchronized time by said control means from actually taking place during such time as a pulse is being sent out by said generator; whereby to avoid the possibility of faulty synchronization of said devices as the result of receipt by them of parts of pulses too small to insure reliable step progression.

25. In a control system, the combination comprising: a pulse generator for independently generating control pulses for use throughout the system; first and second pulse-controllable devices adapted to progress in synchronism through a predetermined series of steps upon being activated by control pulses of the type independently produced by said generator without regard to the operation of said devices, each control pulse received by said devices leading said devices to progress from one step to the next in said series of steps; operable connecting means for connecting said generator to said devices, said connecting means being selectively settable to either permit or block the flow of control pulses from said generator to said devices; control means, operable at least part of the time free from the control of said control pulses, for initiating a change in the setting of said connecting means; and pulse-controlled full-pulse means operatively connected to said generator for preventing at least one of the possible changes in the setting of said connecting means initiatable at a non-pulse-synchronized time by said control means from actually taking place during such time as a pulse is being received by said full-pulse means from said generator, said full-pulse means including means for rendering said full-pulse means ineffective to bring about any change in the setting of said connecting means in the absence of initiating action on the part of said control means.

26. In a control system, the combination comprising: a plurality of independently settable devices, and a plurality of two-branched arms respectively carried thereby and movable therewith, each of said devices being rotatable about a separate predetermined axis for setting to either one of two predetermined positions, the branches of the arm carried by each device being disposed on opposite sides of the device's axis; preselecting means, comprising a shaft, movable relative to said devices, and a plurality of preselecting units carried thereby and movable therewith in the direction of the axis of said shaft, each of said preselecting units being associated with a respective one of said devices, and each of said preselecting units being independently and selectively presettable to either one of two predetermined positions; path-determining mounting means and drive means, operatively associated with said shaft and said devices, for driving such of said preselecting means as do not already have settings which correspond, according to a predetermined relationship, with the settings of their respectively associated devices against one or the other of the branches of the arm of their respectively associated devices, whereby to turn the non-corresponding devices, the particular one of the two branches involved in each such cooperation, and consequently the direction of turning of the device involved, being determined by the pre-setting of the co-operating preselecting unit; and means for limiting the effective driving action of said drive means; whereby to bring the settings of said devices into correspondence, in accordance with said predetermined relationship, with the selective presettings of said preselecting units.

27. The combination according to claim 26, wherein certain of said predetermined setting positions of said preselecting units are designated "zero" setting positions, and further including: zeroizing means for bringing said preselecting units to said zero positions; setting means for selectively setting said preselecting units; and sequence-controlling means, operatively connected to said zeroizing means and said setting means, for first activating said zeroizing means to wipe out the effects of previous settings by positioning said units in their zero positions, and then rendering said setting means effective to perform its preselecting function.

28. In a system containing a movable element to be moved to a position defined in terms of polar coordinates by a radius and an angle, the combination comprising: a mounting device; a rotatable member mounted for rotation about an axis which is fixed relative to said device; radius-slide means, including a rack portion, carried on said rotatable member, for carrying said element and for guiding the movement of said element along a line that intersects said axis, which line occupies a fixed position relative to said rotatable member; a shaft, including a round rack portion, slidably mounted for longitudinal movement along said axis; a gear, rotatably mounted on said rotatable member in such position as to mesh and properly cooperate with the respective rack portions of said radius-slide means and of said shaft; settable angle-determining means, for rotating said rotatable member relative to said mounting device to an angular position determined by the setting of said angle-determining means; and settable radius-determining means, for longitudinally moving said shaft, and thus for moving, via said shaft, gear, and radius-slide means said element to a radial distance from said axis determined by the setting of said radius-determining means.

29. The combination according to claim 28, further including a chart characterized by a mapping-coordinate system lying in a plane perpendicular to the fixed axis mentioned in claim 28; projection means for indicating on said chart, relative to a preselected polar-coordinate pole-and-initial-line position at said chart, a true polar-coordinate position corresponding to the polar-coordinate position occupied by the movable element mentioned in claim 28; and means for effectively shifting the position of said polar-coordinate pole-and-initial-line position at said chart while maintaining constant polar-coordinate positions measured relative thereto and while maintaining constant the position of said axis relative to said chart.

References Cited in the file of this patent

UNITED STATES PATENTS

| Number | Name | Date |
|---|---|---|
| 423,398 | Snyder | Mar. 11, 1890 |
| 497,171 | Dumke | May 9, 1893 |
| 614,977 | Pottin | Nov. 29, 1898 |
| 791,957 | Van Sant | June 6, 1905 |
| 792,020 | Gray | June 13, 1905 |
| 1,070,835 | Nowak | Aug. 19, 1913 |
| 1,215,815 | Kaminski et al. | Feb. 13, 1917 |
| 1,437,400 | Conners | Dec. 5, 1922 |
| 1,551,393 | Hewlett et al. | Aug. 25, 1925 |
| 1,597,487 | St. Clair | Aug. 24, 1926 |
| 1,740,556 | White | Dec. 24, 1929 |
| 1,747,821 | Field | Feb. 18, 1930 |
| 1,750,207 | Wood | Mar. 11, 1930 |
| 1,751,649 | Nieman | Mar. 25, 1930 |
| 1,753,781 | Ford | Apr. 8, 1930 |
| 1,786,780 | Shepherd | Dec. 30, 1930 |
| 1,930,525 | Levy | Oct. 17, 1933 |
| 2,007,306 | Peuker | July 9, 1935 |
| 2,018,420 | Robinson et al. | Oct. 22, 1935 |
| 2,018,858 | Landolt | Oct. 29, 1935 |
| 2,027,077 | Von Pein | Jan. 7, 1936 |
| 2,036,026 | Doty | Mar. 31, 1936 |
| 2,040,073 | Brendel | May 12, 1936 |
| 2,046,977 | Sortore et al. | July 7, 1936 |
| 2,049,375 | Henderson | July 28, 1936 |
| 2,065,960 | Bauml | Dec. 29, 1936 |
| 2,077,523 | Hug | Apr. 20, 1937 |
| 2,077,962 | Smith | Apr. 20, 1937 |
| 2,098,654 | Carter | Nov. 9, 1937 |
| 2,107,039 | Leventhal et al. | Feb. 1, 1938 |
| 2,121,227 | Haegele | June 21, 1938 |
| 2,142,251 | Nunan | Jan. 3, 1939 |
| 2,181,401 | Hawthorne | Nov. 28, 1939 |
| 2,186,007 | Chamberlain | Jan. 9, 1940 |
| 2,189,270 | Pineo | Feb. 6, 1940 |
| 2,192,421 | Wallace | Mar. 5, 1940 |
| 2,207,743 | Larson et al. | July 16, 1940 |
| 2,207,996 | Basquin | July 16, 1940 |
| 2,211,020 | Marrison | Aug. 13, 1940 |
| 2,244,500 | Nyquist | June 3, 1941 |
| 2,258,859 | Mitelman | Oct. 14, 1941 |
| 2,264,370 | Harrison | Dec. 2, 1941 |
| 2,317,191 | Hollbrook | Apr. 20, 1943 |
| 2,318,591 | Couffignal | May 11, 1943 |
| 2,341,736 | Moore | Feb. 15, 1944 |
| 2,342,938 | Hopkins | Feb. 29, 1944 |
| 2,349,129 | Albert | May 16, 1944 |
| 2,359,661 | Moody | Oct. 3, 1944 |
| 2,364,771 | Bascom et al. | Dec. 12, 1944 |
| 2,367,522 | Pfleger | Jan. 16, 1945 |
| 2,372,613 | Svoboda | Mar. 27, 1945 |
| 2,397,202 | Potts | Mar. 26, 1946 |
| 2,397,604 | Hartley et al. | Apr. 2, 1946 |
| 2,399,671 | Gage | May 7, 1946 |
| 2,406,384 | Kinkead et al. | Aug. 27, 1946 |
| 2,406,953 | Lewis | Sept. 3, 1946 |
| 2,409,448 | Rost et al. | Oct. 15, 1946 |
| 2,413,300 | Dunn et al. | Dec. 31, 1946 |

(Other references on following page)

UNITED STATES PATENTS

| | | |
|---|---|---|
| 2,414,819 | Lakatos | Jan. 28, 1947 |
| 2,438,908 | Goodall | Apr. 6, 1948 |
| 2,444,549 | Anderson | July 6, 1948 |
| 2,448,965 | Drayer | Sept. 7, 1948 |
| 2,449,467 | Goodall | Sept. 14, 1948 |
| 2,450,516 | Kinkead et al. | Oct. 5, 1948 |
| 2,481,648 | Dehn | Sept. 13, 1949 |

FOREIGN PATENTS

| | | |
|---|---|---|
| 23,872 | Great Britain | A. D. 1904 |
| 124,466 | Great Britain | Apr. 3, 1919 |
| 314,112 | Great Britain | June 24, 1929 |
| 692,678 | France | Aug. 5, 1930 |
| 176,067 | Switzerland | June 17, 1935 |
| 819,835 | France | July 19, 1937 |
| 702,225 | Germany | Feb. 1, 1941 |